(12) United States Patent
Hies et al.

(10) Patent No.: US 11,333,676 B2
(45) Date of Patent: *May 17, 2022

(54) BEAM SHAPING ACOUSTIC SIGNAL TRAVEL TIME FLOW METER

(71) Applicant: GWF MessSysteme AG, Lucerne (CH)

(72) Inventors: Thomas Werner Hies, Singapore (SG); Juergen Heinz-Friedrich Skripalle, Irsee (DE); Trung Dung Luong, Singapore (SG); Claus-Dieter Ohl, Magedeburg (DE)

(73) Assignee: GWF MessSysteme AG, Lucerne (CH)

( * ) Notice: Subject to any disclaimer, the term of this patent is extended or adjusted under 35 U.S.C. 154(b) by 184 days.

This patent is subject to a terminal disclaimer.

(21) Appl. No.: 16/790,214

(22) Filed: Feb. 13, 2020

(65) Prior Publication Data
US 2020/0182900 A1 Jun. 11, 2020

Related U.S. Application Data

(63) Continuation of application No. 16/041,052, filed on Jul. 20, 2018, now Pat. No. 10,598,684, which is a
(Continued)

(51) Int. Cl.
*G01P 5/24* (2006.01)
*G01F 1/66* (2022.01)
(Continued)

(52) U.S. Cl.
CPC .............. *G01P 5/244* (2013.01); *G01F 1/662* (2013.01); *G01P 5/245* (2013.01); *G01S 15/58* (2013.01);
(Continued)

(58) Field of Classification Search
None
See application file for complete search history.

(56) References Cited

U.S. PATENT DOCUMENTS

| | | |
|---|---|---|
| 5,040,415 A | 8/1991 | Barkhoudarian |
| 6,490,469 B2 | 12/2002 | Candy |

(Continued)

FOREIGN PATENT DOCUMENTS

| | | |
|---|---|---|
| EP | 1 097 355 A1 | 5/2001 |
| FR | 2781047 A1 | 1/2000 |

(Continued)

OTHER PUBLICATIONS

International Search Report with Written Opinion, dated Oct. 17, 2016, for corresponding international application PCT/IB2016/050218.
(Continued)

*Primary Examiner* — Harshad R Patel
(74) *Attorney, Agent, or Firm* — Myers Wolin, LLC

(57) ABSTRACT

A method and corresponding device are provided for determining a flow speed in a fluid conduit. The fluid conduit is provided with first, second and third ultrasonic wet transducers, wherein respective connection lines between transducers extend outside of a direction of average flow of the fluid conduit. First and second measuring signals are applied to the first ultrasonic wet transducer and received at the second and the third ultrasonic wet transducer, respectively. The measuring signals comprise a respective reversed signal portion with respect to time of a response signal. Respective first and second response signals are measured and the flow speed is derived from at least one of the first and second response signals.

19 Claims, 31 Drawing Sheets

Related U.S. Application Data continuation of application No. 15/843,552, filed on Dec. 15, 2017, now Pat. No. 10,036,763, which is a continuation of application No. PCT/IB2016/050218, filed on Jan. 18, 2016.

(51) Int. Cl.
  *G01S 15/58* (2006.01)
  *G01F 1/667* (2022.01)
  *G01F 25/10* (2022.01)

(52) U.S. Cl.
  CPC .............. *G01F 1/667* (2013.01); *G01F 1/668* (2013.01); *G01F 25/10* (2022.01)

(56) References Cited

U.S. PATENT DOCUMENTS

| | | | |
|---|---|---|---|
| 6,877,387 | B1 | 4/2005 | Certon et al. |
| 10,036,763 | B2 * | 7/2018 | Hies .................. G01P 5/244 |
| 10,598,684 | B2 * | 3/2020 | Hies .................. G01P 5/245 |
| 2005/0007877 | A1 | 1/2005 | Martin et al. |
| 2008/0156107 | A1 | 7/2008 | Ao et al. |
| 2009/0007625 | A1 | 1/2009 | Ao et al. |
| 2014/0012518 | A1 | 1/2014 | Ramamurthy et al. |
| 2017/0082650 | A1 | 3/2017 | Hies et al. |
| 2017/0227568 | A1 | 8/2017 | Hies et al. |
| 2017/0307424 | A1 | 10/2017 | Hies et al. |

FOREIGN PATENT DOCUMENTS

| | | | |
|---|---|---|---|
| JP | 2002-520583 | A | 7/2002 |
| WO | 0003206 | A1 | 1/2000 |
| WO | 2007012506 | A1 | 2/2007 |
| WO | 2011051006 | A1 | 5/2011 |
| WO | 2013164805 | A1 | 11/2013 |

OTHER PUBLICATIONS

A L Zimmermann, N Pērez and J C Adamowski; "Flow rate estimation using acoustic field distortions caused by turbulent flows: time-reversal approach"; Published under licence by IOP Publishing Ltd; Journal of Physics: Conference Series, vol. 296, No. 1; (2011); doi: 10.1088/1742-6596/296/1/012010.

Mathias Fink; Time Reversal of Ultrasonic Fields-Part I: Basic Principles; IEEE Transactions on Ultrasonics, Ferroelectrics, and Frequency Control ( vol. 39, Issue: 5, Sep. 1992 ); DOI: 10.1109/58.156174.

M. Fink, Time Reversed Acoustics, Scientific American, 91-97 (Nov. 1999).

Festo; Flow Sensors; Characteristics; www.festo.com/catalogue . . . ; Mar. 2009; Durchflussmessung Verfahren; English translation of Durchflusssensoren; Sensoren / Bildverarbeitungssysteme; Internet: www.festo.com/catalogue/ . . . —Änderungen vorbehalten—Mar. 2009.

Extended European search report including the European search opinion issued for corresponding European Patent Application No. EP16886184, dated Feb. 20, 2018, for corresponding international application PCT/IB2016/050218.

Office Action issued by Eurasian Patent Organization for corresponding Eurasian Patent Application No. 201891250, dated Apr. 29, 2019, with a concise English explanation.

Official Examination Report issued by the Patent Office of The Gulf Cooperation Council for Patent Application No. GCC 2017-32792, dated Jan. 22, 2019 with an English Translation.

Office Action issued by INAPI Ministerio de Economia, Fomento y Turismo of the Government of Chile for corresponding Chilean Patent Application No. 201801821, dated Apr. 29, 2019, with a partial English translation.

Office Action issued by INAPI Ministerio de Economia, Fomento y Turismo of the Government of Chile for corresponding Chilean Patent Application No. 201801821, dated Sep. 30, 2019, with a partial English translation.

Notification of Reasons for Refusal issued by the Japanese Patent Office for corresponding Japanese Patent Application No. 2018-553648, dated Nov. 28, 2019, with full English translation attached.

Office Action issued by the Brazilian National Institute of Industrial Property for corresponding Brazilian Patent Application No. BR112018009412-9, dated May 21, 2020, with English translation attached.

Official Communication No. 70021 (Office Action) issued by the Mexican Institute of Industrial Property(IMPI) for corresponding International Patent Application No. PCT/IB2016/050218 dated Jul. 29, 2021, with Machine-generated English translation.

Office Action issued by the Eurasian Patent Office for corresponding Eurasian Patent Application No. 201891250/31, dated Mar. 10, 2020, with full English translation attached.

The First Office Action issued by the China National Intellectual Property Administration for corresponding Chinese Patent Application No. 201680069532.8, dated May 6, 2020, with English translation attached.

Technical Report issued by the Egyptian Patent Office for corresponding Egyptian Patent Application No. 2018040714, dated Sep. 3, 2020.

The Second Office Action issued by the China National Intellectual Property Administration for corresponding Chinese Patent Application No. 201680069532.8, dated Nov. 6, 2020.

Examination Report No. 1 issued by the Australian Intellectual Property Office for corresponding Australian Patent Application No. 2016387414, dated Nov. 30, 2020.

The Third Office Action issued by the China National Intellectual Property Administration for corresponding Chinese Patent Application No. 201680069532.8, dated Apr. 2, 2021, with English translation attached.

Conclusion on patentability of invention issued by the Eurasian Patent Office for corresponding Eurasian Patent Application No. 201891250/31, dated Mar. 24, 2021, with full English translation attached.

Technical report issued by the Egyptian Patent Office for corresponding Egyptian Patent Application No. 2018040714, dated Nov. 30, 2020, with full English translation attached.

First Substantive Examination report issued by the Israeli Patent Office for corresponding Israeli Patent Application No. 258825, dated Dec. 13, 2020, with English summary of office action attached.

Examination Report issued by the Patent Office of India for corresponding Indian Patent Application No. 201847014504, dated Feb. 12, 2021, with English translation.

Conclusion on patentability of invention issued by The Eurasian Patent Office for corresponding Eurasian Patent Application No. 201891250/31, mailed on Oct. 25, 2021, with an English translation.

Official Notification of the Substantive Examination report issued by the Ministry of Industry, Trade and Supply of Jordan for corresponding Jordanian Patent Application No. AK/2018/0045/, and dated Sep. 9, 2021, with an English translation.

* cited by examiner

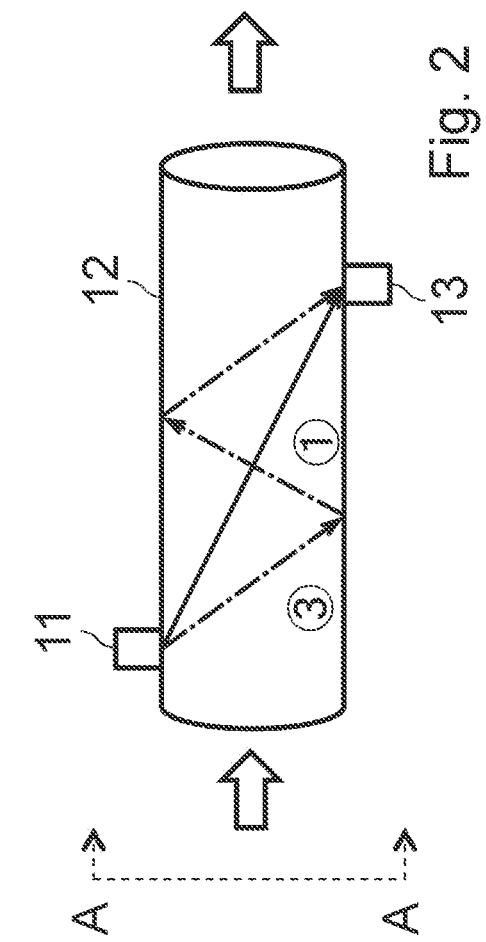
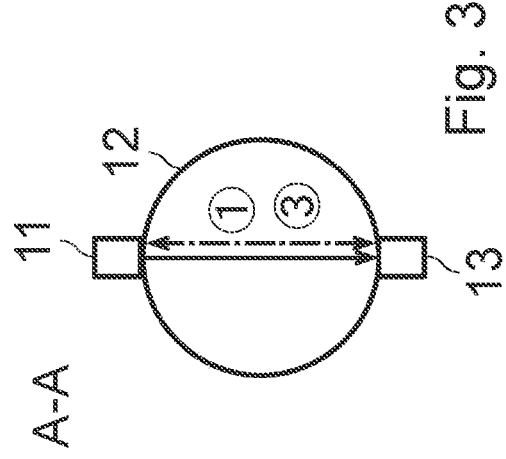
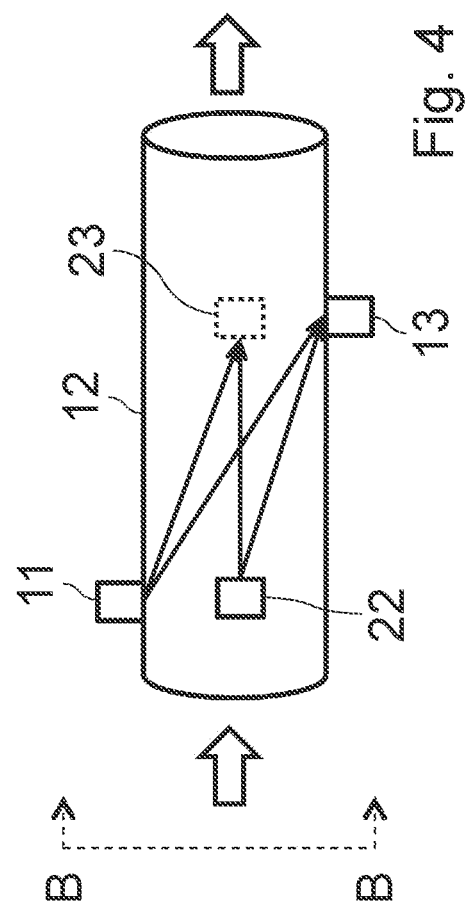
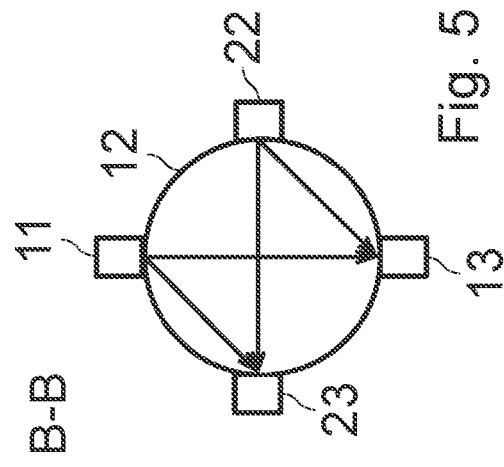

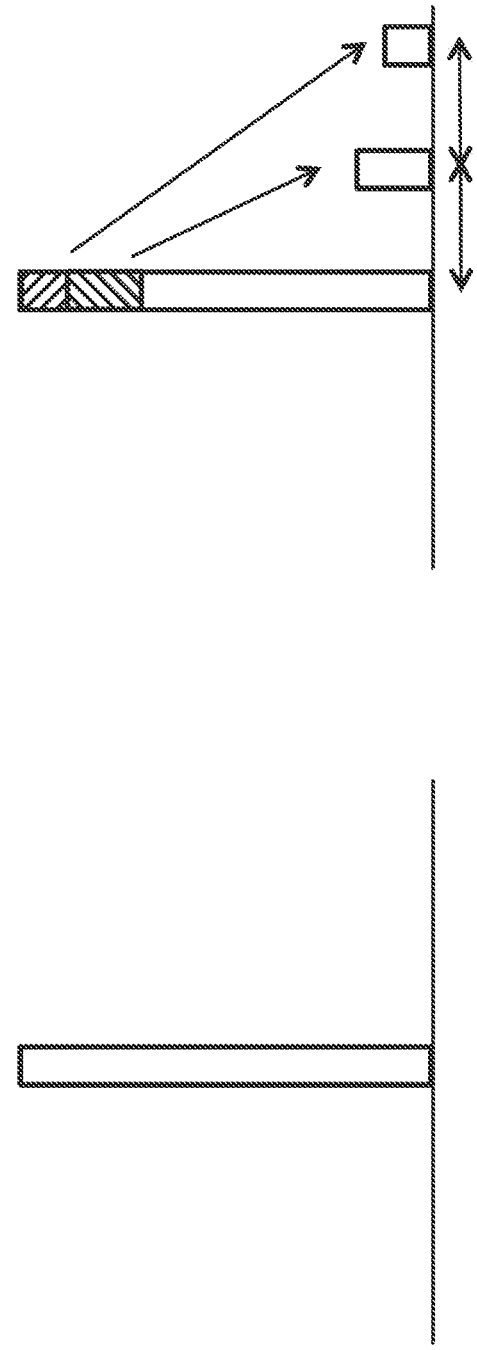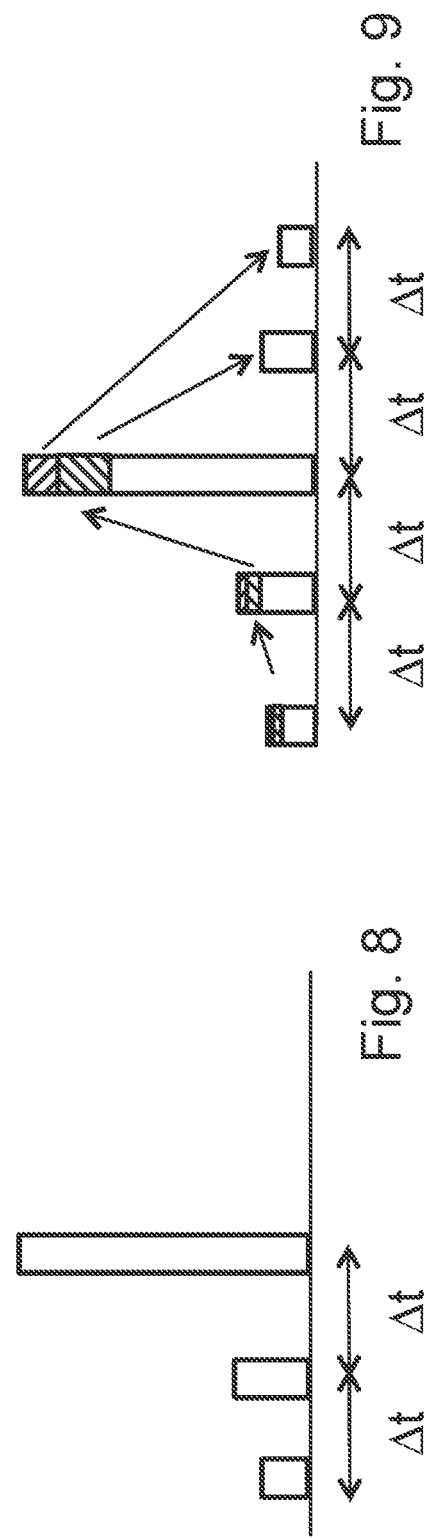

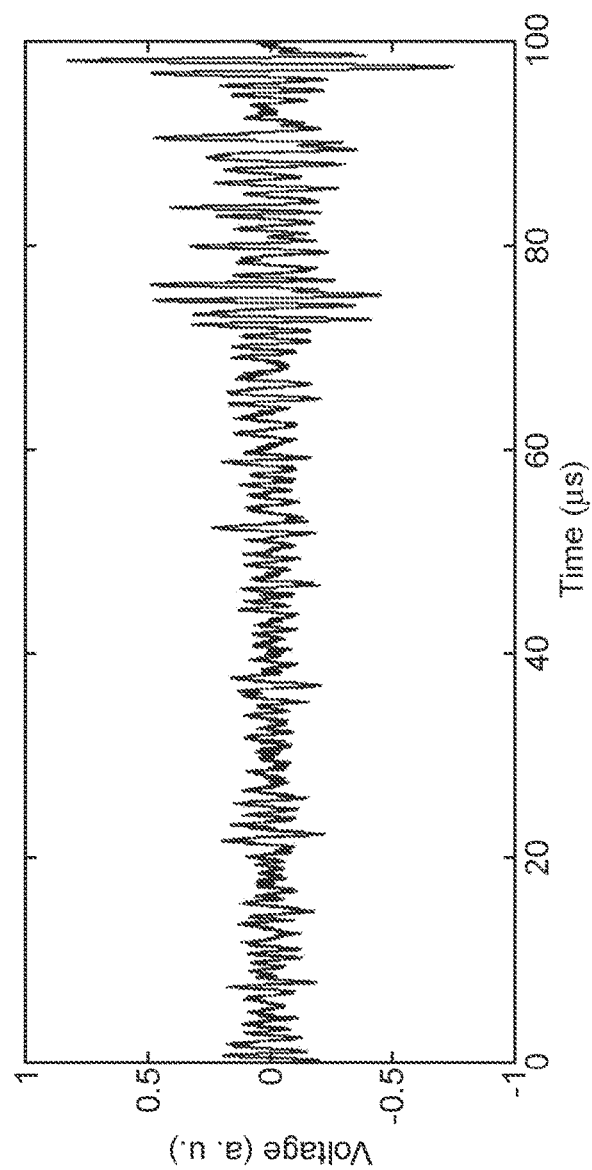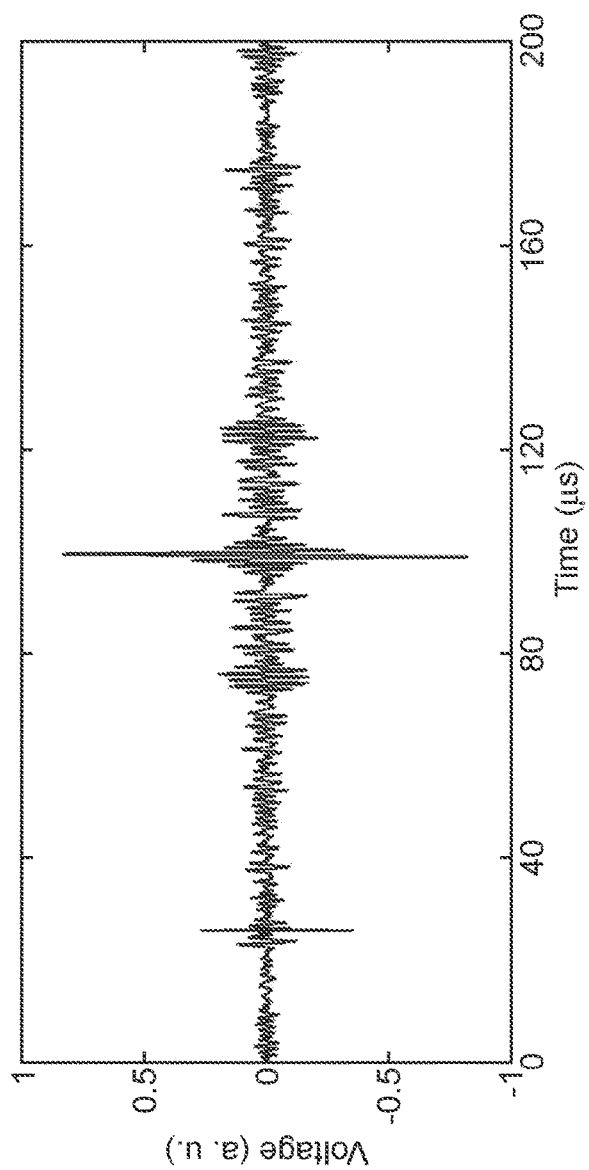

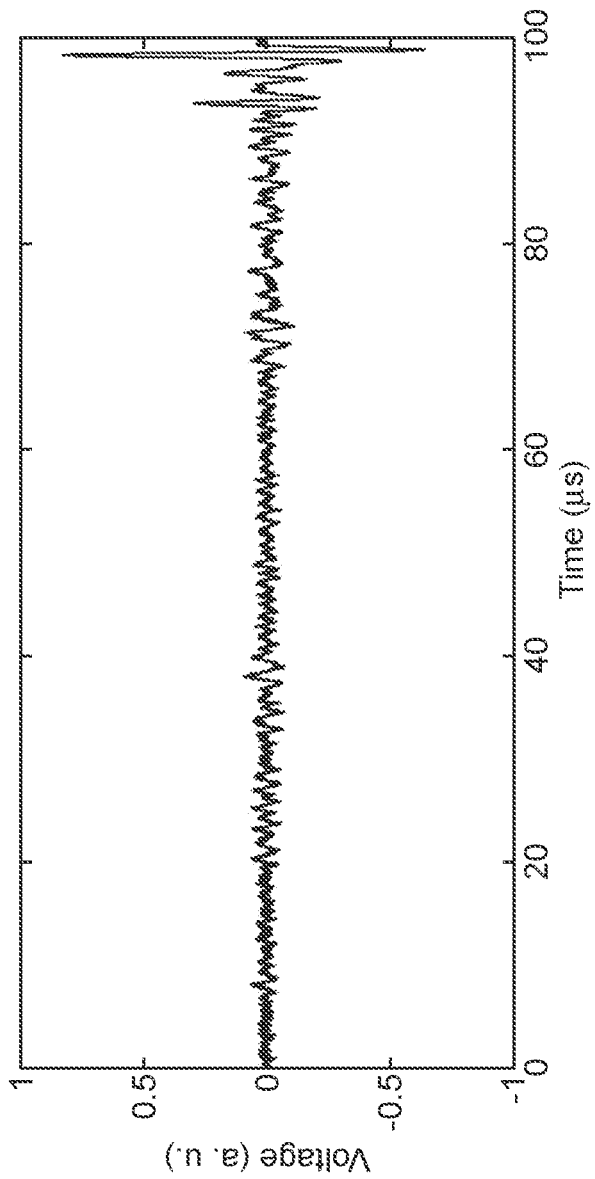
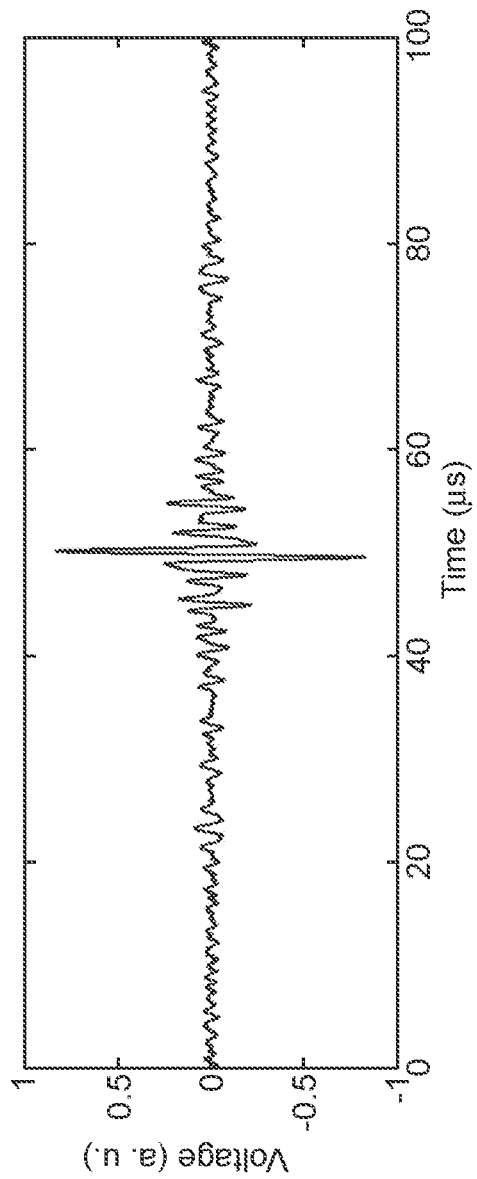
Fig. 22
Fig. 23

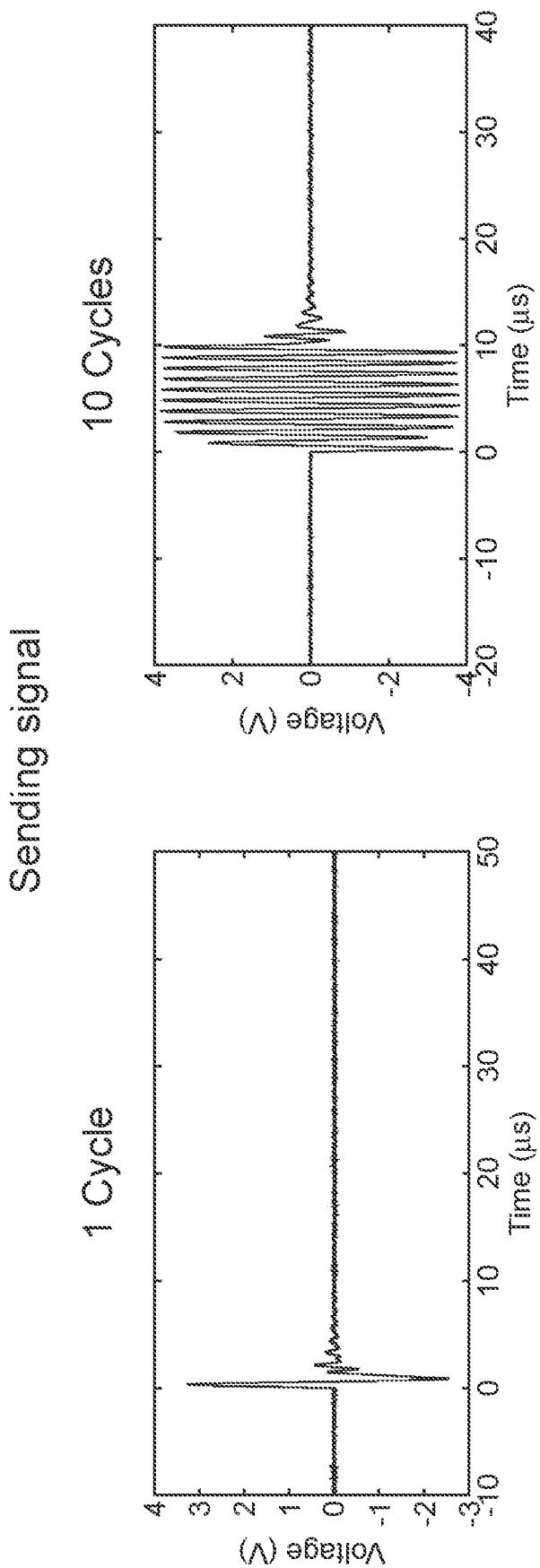

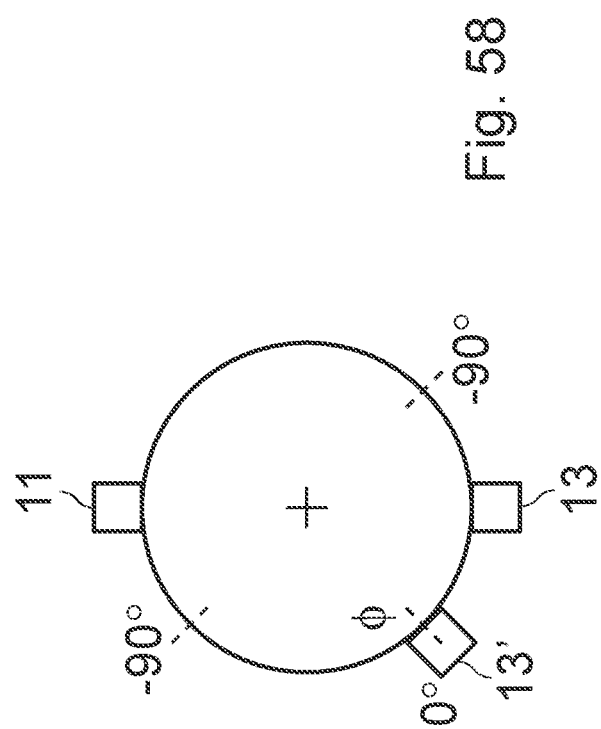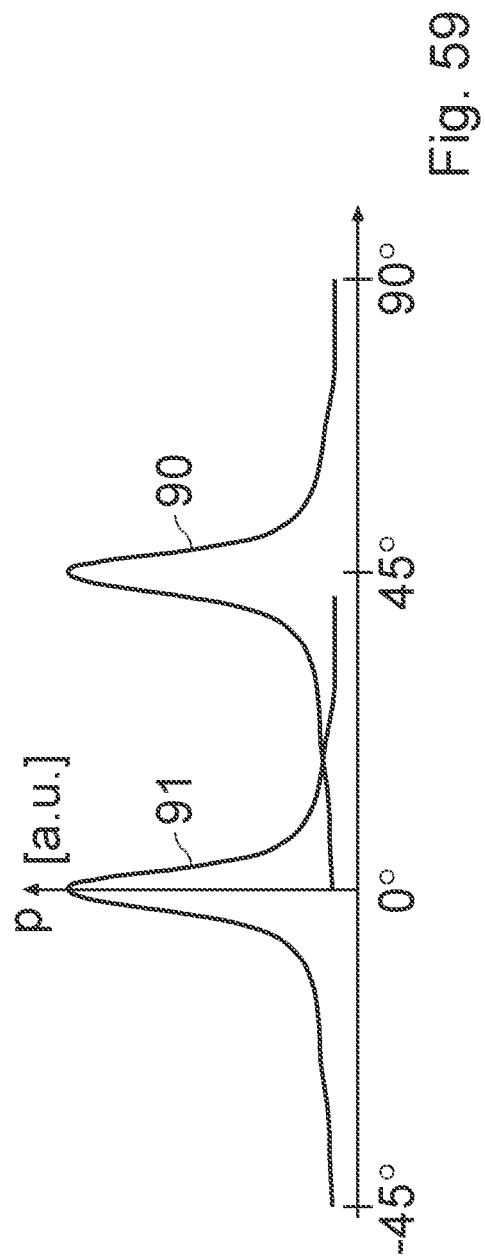

BEAM SHAPING ACOUSTIC SIGNAL TRAVEL TIME FLOW METER

CROSS-REFERENCE TO RELATED APPLICATIONS

This application is a continuation of U.S. patent application Ser. No. 16/041,052, filed Jul. 20, 2018, which is a continuation of U.S. patent application Ser. No. 15/843,552, filed Dec. 15, 2017, which is a continuation under 35 U.S.C. § 120 of International Application No. PCT/IB2016/050218, filed Jan. 18, 2016, the contents of each are hereby incorporated by reference in their entirety.

FIELD OF THE INVENTION

The current application relates to flow meters, and in particular to ultrasound travel time flow meters.

BACKGROUND

Various types of flow meters are currently in use for measuring a volume flow of a fluid, such as a liquid or a gas, through a pipe. Ultrasonic flow meters are either Doppler flow meters, which make use of the acoustic Doppler effect, or travel time flow meters, sometimes also called transmission flow meters, which make use of a propagation time difference caused by the relative motion of source and medium. The travel time is also referred to as time of flight or transit time.

An ultrasonic travel time flow meter evaluates the difference of propagation time of ultrasonic pulses propagating in and against flow direction. Ultrasonic flow meters are provided as in-line flow meters, also known as intrusive or wetted flow meters, or as clamp-on flow meters, also known as non-intrusive flow meters. Other forms of flow meters include Venturi channels, overflow sills, radar flow meters, Coriolis flow meters, differential pressure flow meters, magnetic inductive flow meters, and other types of flow meters.

When there are irregular flow profiles or open channels, more than one propagation path may be necessary to determine the average flow speed. Among others, multipath procedures are described in hydrometric standards such as IEC 41 or EN ISO 6416. As a further application, ultrasonic flow meters are also used to measure flow profiles, for example with an acoustic Doppler current profiler (ADCP). The ADCP is also suitable for measuring water velocity and discharge in rivers and open waters.

SUMMARY OF INVENTION

It is an object of the present specification to provide an improved transit time flow meter and a corresponding computer-implemented method for measuring an average flow speed or a flow profile of a fluid in general, and in particular for liquids such as water or for gases.

In a flow measurement device according to the present specification, sound transducers, e.g. in the form of piezoelectric elements, also known as piezoelectric transducers, are used to generate and to receive a test signal and a measuring signal.

Alternative sound transmitters comprise lasers that excite a metal membrane or other light absorbing surface to vibrations, or coil driven loudspeakers. One can also produce pressure waves in other ways. The receiver side can also be represented by other means that are different from piezoelectric transducers, but detect ultrasonic waves.

Although the term "piezoelectric transducer" is used often in the present description, it stands also for other sound wave transducers that produce or detect ultrasonic waves.

A measuring signal according to the present specification can be modelled by a matched filter. If a sharply peaked impulse is used as a probe or test signal, the received signal at the transducer is the impulse response of a conduit or channel of the fluid. According to the present application, an inverted version of the impulse response with respect to time is sent back through the same channel as a measuring signal, either in the reverse direction or in the same direction. This results in a signal with a peak at the origin, where the original source was, or in a signal with a peak at the original receiver, respectively.

The inversion with respect to time can be achieved in several ways. If analogue means are used for recording the response signal, one could play the recorded response signal in a reverse mode. If digital means are used for recording samples of the response signal, then the order of the recorded samples is reversed in order to obtain the inverted signal. This can be achieved by inverting the values of the time stamps of each recorded sample, by multiplying the respective time value with (−1). If played according to an ascending order of the time stamp values, the recorded samples are played in a reverse order. In other words, the inverted response signal is the recorded response signal, but played backwards.

An ultrasonic flow meter according to the present specification provides a focusing property by using the above mentioned inverted signal, or a similarly shaped signal, for an ultrasonic flow meter to form a response signal, which is both concentrated in space and time. This in turn leads to a higher amplitude at a receiving piezoelectric element and a better signal to noise ratio.

With an ultrasonic flow meter according to the present specification, focusing and beam forming properties can be obtained under very general conditions. For example, a focusing property is obtained even when only one ultrasound transmitter is excited and even when the inverted signal is reduced to a signal that is only coarsely digitized in the amplitude range, if the time resolution of the inverted signal is sufficient. Furthermore, a flow meter according to the present specification can be used with clamp-on transducers, which are easy to position on a pipe and do not require modifications of the pipe.

In an ultrasonic flow meter according to the present specification, technical features that ensure a good coupling and directionality of clamp-on transducers and to reduce scattering may not be necessary or, on the contrary, it may even improve the beam forming characteristic to omit them. In order to provide an increased scattering, a coupling material may be selected that is adapted to a refractive index of the liquid or transducers and transducer couplings may be used, which provide more shear waves.

Preferentially, the frequency of sound waves that are used in a flow meter according to the specification is between >20 kHz and 2 MHz, which corresponds to an oscillation period of 0.5 microseconds (µs) but it may even be as high as 800 MHz. In many cases, ultrasonic flow meters operate far above the hearing threshold with frequencies of several hundred kHz or higher. The frequency of transit time ultrasonic flow meters is typically in the kHz or in the MHz range.

According to one aspect, the current specification discloses a computer implemented method for determining a flow speed of a fluid in a fluid conduit or channel, in particular in a pipe or tube, using a transmission time ultrasonic flow meter. In a preferred embodiment, "computer implemented" refers to an execution on small scale electronic components such as microprocessors, ASICs, FPGAs and the like, which can be used in portable or in compact stationary digital signal processing devices, which are generally of a smaller size than workstations or mainframe computers and which can be placed at a required location along a fluid pipe.

In the following, the terms "channel", "conduit", "passage", etc. are used as synonyms. The subject matter of the application can be applied to all types of conduits for fluids independent of their respective shape and independent of whether they are open or closed. The subject matter of the application can also be applied to all types of fluids or gases, whether they are gases or liquids, or a mixture of both.

Throughout the application, the term "computer" is often used. Although a computer includes devices such as a laptop or a desktop computer, the signal transmission and receiving can also be done by microcontrollers, ASICs, FPGAs, etc.

Furthermore, a connection line between the transducers may be offset with respect to a center of the fluid conduit in order to obtain a flow speed in a predetermined layer and there may be more than one pair of transducers. Furthermore, the measuring signal may be provided by more than one transducer and/or the response signal to the measuring signal may be measured by more than one transducer.

A signal energy E of a signal s(t) in a time interval may be defined in terms of the expression $E=\int_{T1}^{T2} dt |s(t)|^2$ or its discrete version $E=\Sigma_{i=m}^{n} |s(i)|^2$, wherein the time interval is given by [T1, T2] or [m*Δt, n*Δt], respectively.

The leading portion of the measuring signal may contribute significantly to the production of a signal, which is peaked in space and time.

In some specific embodiments, the measuring signal or the response signal can be provided by an amplitude-modulated oscillating signal, which is digitized with respect to amplitude, e.g. with a resolution between 1 and 12 bit. This may provide benefits in terms of computation velocity and memory space and can even lead to an increased signal peak. In particular, the data shown in the Figures of the present specification have been obtained with 12 bit resolution, except for FIGS. 30-35, which have been obtained with a coarser resolution than 12 bit.

According to a further embodiment, the measuring signal that is applied to a transducer can comprise an oscillating signal that is modulated according to a 0-1 modulation providing either a predetermined amplitude or no amplitude, or, in other words a zero amplitude.

According to a further aspect, a device for measuring a flow speed in a travel time ultrasonic flow meter is disclosed. The device comprises a first connector for connecting a first piezoelectric element, a second connector for connecting a second piezoelectric element, an optional digital to analog converter (DAC), which is connected to the first connector and an optional analog to digital converter (ADC), which is connected to the second connector.

Furthermore, the device comprises a computer readable memory, an electronic timer or oscillator, a transmitting unit for sending an impulse signal to the first connector and a receiving unit for receiving a response signal to the impulse signal from the second connector.

The terms velocity of flow, flow velocity and flow speed are used as synonyms in the present application.

While the device can be provided as an analog device without A/D and D/A converters and without a computer readable memory unit, it is also possible to provide the device or parts of it with a digital computer system.

In particular, the various signal processing units, such as the velocity-processing unit, the selection unit and the inverting unit may be provided entirely or partially by an application specific electronic component or by a program memory with a computer readable instruction set. Similarly, the measuring signal generator and an impulse signal generator of the transmitting unit may be provided entirely or partially by an application specific electronic component, which may comprise a computer readable instruction set.

According to a further embodiment, the device comprises a direct digital signal synthesizer (DDS) that comprises the abovementioned ADC. The DDS comprises a frequency control register, a reference oscillator, a numerically controlled oscillator and a reconstruction low pass filter. Furthermore, the ADC is connectable to the first and to the second connector over the reconstruction low pass filter.

Furthermore, the current specification discloses a flow measurement device with a first piezoelectric transducer that is connected to the first connector, and with a second ultrasonic transducer, such as piezoelectric transducer, that is connected to the second connector. In particular, the ultrasonic transducers, such as piezoelectric transducers may be provided with attachment regions, such as a clamping mechanism for attaching them to a pipe.

Furthermore, the current specification discloses a flow measurement device with a pipe portion. The first ultrasonic transducer, such as piezoelectric transducer is mounted to the pipe portion at a first location and the second ultrasonic transducer, such as piezoelectric transducer is mounted to the pipe portion at a second location. In particular, the transducers may be clamped to the pipe portion. Providing the device with a pipe portion may provide benefits when the device is pre-calibrated with respect to the pipe portion.

The device can be made compact and portable. A portable device according to the present specification, which is equipped with surface mountable transducers, such as clamp-on transducers, can be used to check a pipe on any accessible location. In general, the device may be stationary or portable. Preferentially, the device is sufficiently compact to be placed at a required location and sufficiently protected against environmental conditions, such as humidity, heat and corrosive substances.

Moreover, the current specification discloses a computer readable code for executing a flow measurement method according to the present specification, a computer readable memory comprising the computer readable code and an application specific electronic component, which is operable to execute the method steps of a method according to the current specification.

In particular, the application specific electronic component may be provided by an electronic component comprising the abovementioned computer readable memory, such as an EPROM, an EEPROM a flash memory or the like. According to other embodiments, the application specific electronic component is provided by a component with a hard-wired or with a configurable circuitry such as an application specific integrated circuit (ASIC) or a field programmable gate array (FPGA).

In a further embodiment, an application specific electronic component according to the current specification is provided by a plurality of interconnected electronic components, for example by an FPGA, which is connected to a suitably programmed EPROM in a multi-die arrangement. Further examples of an application specific electronic component are programmable integrated circuits such as programmable logic arrays (PLAs) and complex programmable logic devices (CPLDs).

It is helpful to determine whether an off-the-shelf test device is measuring a flow speed of a fluid in a fluid conduit according to present application. To this purpose, one provides the fluid conduit with a fluid that has a pre-determined velocity with respect to the fluid conduit. A test impulse signal is applied to a first ultrasonic transducer, such as piezoelectric transducer of the test device, the first piezoelectric transducer being mounted to the fluid conduit at a first location, followed by receiving a test response signal of the test impulse signal at a second piezoelectric transducer of the test device, the second ultrasonic transducer, such as piezoelectric transducer being mounted to the fluid conduit at a second location.

Furthermore, the present specification discloses a computer-implemented method for determining a flow speed of a fluid in a fluid conduit using pre-determined measurement signals in an arrangement with three or more ultrasonic transducers. The pre-determined signals comprise a first measuring signal and a second measuring signal.

A fluid conduit is provided with a fluid that has a predetermined velocity with respect to the fluid conduit. Furthermore, the fluid conduit is provided with a first ultrasonic transducer, a second ultrasonic transducer and a third ultrasonic transducer. In particular, the second transducer and the third transducer can be placed at a distance with respect to the first transducer and with respect to a longitudinal direction of the conduit.

The transducers are arranged such that respective connection lines between the first ultrasonic transducer, the second ultrasonic transducer and the third ultrasonic transducer extend outside of a symmetry axis of the fluid conduit. In particular, the connection line can be offset by 5% or more or by 10% or more with respect to a mean diameter of the conduit or with respect to a mean radius of the conduit.

For example, a mean radius of the conduit can be defined with respect to a reference point on the symmetry axis as $$\frac{1}{2\pi}\int_0^{2\pi} |r|d\varphi \text{ or as } \sqrt{\frac{1}{2\pi}\int_0^{2\pi} r^2 d\varphi} \text{ etc.}$$

A first pre-determined measuring signal is applied to the first ultrasonic transducer, and a first response signal of the first pre-determined measuring signal received at the second ultrasonic transducer is measured, for example by detecting a voltage emitted by the second ultrasonic transducer.

Likewise, a second pre-determined measuring signal is applied to the first ultrasonic transducer and a second response signal of the second pre-determined measuring signal received at the third ultrasonic transducer is measured.

The first pre-determined measuring signal and the second pre-determined measuring signal respectively comprise a reversed signal portion with respect to time of a response signal of a corresponding impulse signal or of a signal derived therefrom.

In particular, the respective measurement signal can be generated from an impulse signal which is sent between the same pair of transducers as the measurement signal. The generation of the measurement signal can be carried out by an actual measurement, by a simulation or by a combination of both.

The measurement signal can be sent in the same direction or in the reverse direction as the impulse signal from which it is generated. In particular, if the fluid is moving with respect to the conduit during the calibration process by which the measurement signal is generated from the impulse signal, it can be advantageous for reasons of stability to send the measurement signal in the same direction as the impulse signal.

In other words, in a measurement phase the sequence of sending transducer and receiving transducer can be the same as in a preceding calibration phase for generating the measurement signal or, alternatively, it can be reversed by using the previously sending transducer as a receiving transducer and the previously receiving transducer as a sending transducer.

In general, the first measuring signal is adapted to a transmission channel or path that is different from a transmission channel of the second measuring signal. Thereby, the first measuring signal and the second measuring signal are in general different from each other. Furthermore, a measurement signal obtained by sending an impulse signal from a first transducer to a second transducer is in general different from a measurement signal obtained by sending the impulse signal in the reverse direction from the second transducer to the first transducer.

In general the signal propagation of the pressure signal between the sending and the receiving transducer does not only comprise a straight propagation, but may also comprise one or more reflections at a conduit wall and/or scattering processes within the pipe wall.

In particular, the abovementioned method can be used in a time of flight (TOF) flow measurement. For the TOF measurement, the steps of applying the first measuring signal and measuring a corresponding response signal and of applying the second measuring signal and measuring a corresponding response signal are repeated in a reverse direction to obtain corresponding first reverse direction and second reverse direction response signals.

As explained above, performing the measurement "in reverse direction" refers to carrying out the measurement steps such that the roles of the respective transducers are exchanged, or in other words, such that the previously sending transducer is used as a receiving transducer and the previously receiving transducer is used as a sending transducer.

Thus, if a first measurement comprises sending a measurement signal in a flow direction of the fluid in the sense that the measurement signal has a velocity component in direction of the fluid flow then the corresponding measurement "in reverse direction" comprises sending the measurement signal against the flow direction of the fluid.

The first response signal and the second response signal to the respective first measurement signal and second measurement signal are used to derive one or more flow speeds of the fluid. In particular, the first response signal can be used to determine a flow speed in a fluid layer which comprises the connection line between the first transducer and the second transducer, and the second response signal can be used to determine a flow speed in a fluid layer which comprises the connection line between the first transducer and the third transducer.

According to a further embodiment, which is suitable for a time of flight measurement a first predetermined reverse direction measuring signal is applied to the second ultrasonic transducer, and a first reverse direction response signal of the first reverse direction measuring signal at the second ultrasonic transducer is measured.

Similarly, a second reverse direction measuring signal is applied to the third ultrasonic transducer and a second reverse direction response signal of the second measuring signal received at the first ultrasonic transducer is measured.

The first reverse direction measuring signal and the second reverse direction measuring signal respectively comprise a reversed signal portion with respect to time of a response signal of a corresponding impulse signal or of a signal derived therefrom. 'Corresponding impulse signal' refers to an impulse signal that is sent between the same pair of transducers as the corresponding measurement signal.

A flow speed of the fluid is derived from at least one of the first response signal, the first reverse direction response signal, the second response signal and the second reverse direction response signal. In particular, the first response signal and the first reverse direction response signal can be used to derive a flow speed using a time of flight method. Similarly, the second response signal and the second reverse direction response signal can be used to derive a flow speed using a time of flight method.

In a further embodiment, which also uses a measurement signal traveling from the second transducer to third transducer in the abovementioned arrangement of three transducers, the measurement comprises furthermore the following steps.

A third measuring signal is applied to the second ultrasonic transducer and a third response signal of the second measuring signal at the third ultrasonic transducer is measured.

Similar to the abovementioned embodiments, the third predetermined measuring signal comprises a reversed signal portion with respect to time of a response signal of a corresponding impulse signal or of a signal derived therefrom.

At least one flow speed of the fluid is derived from the third response signal. For the purpose of determining the at least one flow speed, the first response signal, the first reverse direction response signal, the second response signal and the second reverse direction response signal may be used as well.

In a further embodiment, which is suitable for determining a flow speed in fluid layer between the second transducer and the third transducer using a time of flight method, the method comprises furthermore the following steps.

A third reverse direction measuring signal is applied to the third ultrasonic transducer and a third reverse direction response signal of the third reverse direction measuring signal received at the second ultrasonic transducer is measured.

Similarly to the abovementioned embodiments, the third reverse direction measuring signal comprises a reversed signal portion with respect to time of a response signal of a corresponding impulse signal or of a signal derived therefrom.

At least one flow speed of the fluid from is derived from the third response signal and the third reverse direction response signal. For the purpose of determining the at least one flow speed, the first response signal, the first reverse direction response signal, the second response signal and the second reverse direction response signal may be used as well.

According to a further computer implemented method, which is suitable for determining a flow speed in a fluid conduit with an arrangement of at least two clamp-on transducers, the fluid conduit is provided with a fluid that has a predetermined velocity with respect to the fluid conduit.

Furthermore, the fluid conduit is provided with a first ultrasonic clamp-on transducer and a second ultrasonic clamp-on transducer. Preferentially, the second ultrasonic clamp-on transducer is offset with respect to the first ultrasonic clamp-on transducer in a longitudinal direction of the conduit.

The clamp-on transducers are arranged such that a straight connection line between the first ultrasonic clamp-on transducer and the second ultrasonic clamp-on transducer extends outside of a symmetry axis of the fluid conduit. In particular, the connection line may be offset with respect to the symmetry axis by 5% or more, or by 10% or more relative to a mean diameter or relative to a mean radius of the conduit.

A predetermined measuring signal is applied to the first ultrasonic clamp-on transducer and a response signal of the measuring signal received at the second ultrasonic clamp-on transducer is measured.

Similar to the abovementioned embodiment the pre-determined measuring signal comprises a reversed signal portion with respect to time of a response signal of a corresponding impulse signal or of a signal derived therefrom. A flow speed of the fluid is derived from the response signal.

Similar to the abovementioned embodiments, the measurement phase can also comprise sending measurement signals in the reverse direction. In particular, the method may comprise applying a pre-determined reverse direction measuring signal to the second ultrasonic clamp-on transducer and measuring a reverse direction response signal of the reverse direction measuring signal at the second ultrasonic clamp-on transducer.

Similar to the abovementioned embodiment the reverse direction measuring signal comprises a reversed signal portion with respect to time of a response signal of a corresponding impulse signal or of a signal derived therefrom. A flow speed of the fluid is derived from the response signal and from the reverse direction response signal, in particular by using a time of flight method.

The measurement methods for the abovementioned arrangement of at least three ultrasonic transducers, which may be provided as wet transducers or as clamp-on transducers, apply in likewise manner also to corresponding arrangements of clamp-on transducers.

Clamp-on transducers may provide particular advantages in the context of concentrating an acoustic signal at a specific location on the conduit, which is also referred to as "beam shaping". By making use of an interaction with the conduit and, optionally, also with coupling pieces the sound waves of the clamp-on transducers can be spread to a wider angle or in more directions as compared to wet transducers. The coupling pieces allow to direct the acoustic waves in accordance with Snell's law but also help to generate more modes and scattering.

An inversion with respect to time according to the present specification can then be used to generate a measuring signal that adds the various signal components traveling along different paths by superposition, and thereby leads to a higher signal amplitude at a specific location of the conduit where a receiving transducer can be placed.

The below mentioned modifications relating to repeated measurements and a digitization step in the generation of the measurement signal can be applied to all arrangements of transducers according to the present specification.

In the abovementioned embodiments, the steps of applying an impulse signal and receiving a corresponding response signal are repeated multiple times and a plurality of response signals is obtained. In particular, the repeated measurements may refer to a given combination of two transducers. The respective measuring signal, such as the first and the second measurement signal, is then derived from an average of the received response signals.

In particular, the derivation of the respective measuring signal in the abovementioned embodiments may comprise digitizing the corresponding response signal or a signal derived therefrom with respect to amplitude. According to one embodiment, steps of varying a bit resolution of the respective measuring signal and measuring a response signal to that measuring signal are repeated until a measuring signal is found which generates the response signal with the highest maximum amplitude. The measuring signal with the corresponding bit resolution is then selected as measuring signal.

According to one particular embodiment, the bit-resolution of the digitized signal is increased for increasing an amplitude of a response signal to the respective measuring signal, such as the first and second measuring signal. By way of example, the bit resolution is increased in pre-determined steps, and the bit resolution which produces the response signal with the highest amplitude is selected and a corresponding representation of a measurement signal is stored in computer memory.

According to another particular embodiment, the bit-resolution of the digitized signal is decreased or reduced for increasing an amplitude of a response signal to the respective measuring signal. By way of example, the bit resolution is decreased in pre-determined steps, the bit resolution which produces the response signal with the highest amplitude is selected and a corresponding representation of a measurement signal is stored in computer memory.

In particular, the bit resolution of the digitized signal with respect to the amplitude can be chosen as a low bit resolution. For example, the low resolution may be between a 1 bit and an 8 bit resolution or it may be between a 1 bit resolution and a 64 bit resolution.

According to one specific embodiment, at least one of the response signals to the measurement signals is processed for determining a change in the wall thickness of the conduit or for determining material characteristics of the conduit walls by determining longitudinal and transversal sound wave characteristics. For example, the transverse and longitudinal waves characteristics may be derived from corresponding portions of the receiving or response signal, which corresponds to different times of arrival of the acoustic waves.

According to a further embodiment, the method comprises a prior calibration, in which the respective measuring signals are generated from the response signal to an impulse signal. The calibration may be carried out in a factory setting or also during operation of the method. The below mentioned calibration can be applied in likewise manner to all combinations of pairs of two transducers and the calibration may be carried out in one direction only with respect to a pair of transducers or in both directions with respect to the pair of transducers. In the former case, one measurement signal is obtained for the pair of transducers and in the latter case, two measurement signals are obtained for the pair of transducers.

During the calibration phase, the fluid conduit is provided with a fluid which is at rest relative to the fluid conduit or which is moving with a predetermined velocity relative to the fluid conduit.

A first impulse signal is applied to the second ultrasonic transducer, and a first response signal of the first impulse signal is received at the first ultrasonic transducer.

Similarly, a second impulse signal is applied to the third ultrasonic transducer and a second response signal of the at least one impulse signal is received at the first ultrasonic transducer.

The first measuring signal is derived from the first response signal and the second measuring signal is derived from the second response signal.

The derivation of the respective first and second measuring signals comprises selecting a signal portion of the respective first and second response signals or of a signal derived therefrom and reversing the signal portion with respect to time.

In other words, a portion of the first response signal is selected and is inverted or reversed with respect to time and the first measurement signal is generated using the inverted signal portion. Similarly, a portion of the second response signal is selected and is inverted or reversed with respect to time and the second measurement signal is generated using the inverted signal portion.

The first pre-determined measuring signal and the second pre-determined measuring signal for later use. As mentioned above, the same calibration process can be used for every combination of two transducers.

In general, the calibration is carried out in the reverse direction as well to avoid or compensate for instabilities. Depending on whether the calibration is performed under zero flow or non-zero flow conditions it can be advantageous to provide the calibration in both directions and to use each of the two generated measurement signals in either direction.

In other words, if during the measurement process a first transducer is the sending transducer and a second transducer is the receiving transducer then the measurement signal may have been generated by sending an impulse signal from the first transducer to the second transducer or by sending the impulse signal from the second transducer to the first transducer.

A similar calibration process can be carried out for every pair of two transducers. In particular, the calibration process can be carried out in a similar manner for every pair of transducers of the abovementioned three-transducer arrangement comprising a first, second and third transducer.

In the specific case of an arrangement of two or more clamp-on transducers, a calibration can be carried out by the following steps. A fluid conduit is provided with a fluid. The fluid has a predetermined velocity with respect to the fluid conduit in particular.

An impulse signal is provided to the first ultrasonic clamp-on transducer or to the second ultrasonic clamp-on transducer. Then, a response signal of the impulse signal is received at the other one of the two ultrasonic transducers and the measuring signal is derived from the response signal. Similarly, the impulse signal can be provided at the second ultrasonic clamp-on transducer and the response signal can be received at the first ultrasonic clamp-on transducer.

Herein, the derivation of the measuring signal comprising selecting a signal portion of the respective response signal or of a signal derived therefrom and reversing the signal portion with respect to time. The measuring signal is stored for later use during a measuring process, in particular for determining a flow velocity of the fluid.

An impulse signal according to the present specification may refer to a single impulse signal. In general, an impulse signal refers to a signal, which has a signal energy that is concentrated over a short period of time. In a specific embodiment, the impulse signal extends over only a few oscillation periods of a carrier, such as 10-20 oscillation periods or less.

In particular, an envelope of the impulse signal may have a rectangular shape, but other shapes are possible as well. For example, the impulse signal may correspond to a one-time peak or a single impulse, a short rectangular burst or to any other signal shape, such as a triangular saw-tooth shape, a rectangular wave, a chirp, a sine wave or a pre-determined noise burst, such as a white noise or a pink noise, which is also known as 1/f noise. The calibration method works with almost any signal shape of the impulse signal.

In a further embodiment, a corresponding response signal is sent and received multiple times, thereby obtaining a plurality of response signals and the respective measuring signal is derived from an average of the received response signals.

In particular the derivation of the respective measuring signal may comprise digitizing the corresponding response signal or a signal derived therefrom with respect to amplitude.

As mentioned further above, the bit-resolution of the digitized signal is increased for increasing an amplitude of a response signal to the respective measuring signal. In one particular embodiment, an amplitude of the response signal to the generated measuring signal is measured at a pre-determined location of the conduit for measurement signals corresponding to different bit-resolutions. The measurement signal with the highest amplitude is then selected and stored in memory for later use.

A similar procedure can also be provided by decreasing the bit-resolution of the digitized signal until a response signal of the measurement signal is detected which has a high amplitude and the corresponding measurement signal is then stored in memory for later use.

In particular, the bit resolution of the digitized signal with respect to the amplitude can be chosen as a low bit resolution such as a resolution between 1 and 10 bit.

Furthermore, the present specification discloses a computer readable program code with computer readable instructions for executing one of the abovementioned flow measurement methods. Moreover, the present specification also discloses a computer readable memory with the computer readable program code and an application specific electronic component, which is operable to execute the abovementioned flow measurement method.

Furthermore, the present specification discloses a device for measuring a flow speed of a fluid in a conduit having a three transducer arrangement. The device is operative to perform a travel time or time of flight flow measurement.

The device comprises a first connector for connecting a first ultrasonic element, a second connector for connecting a second ultrasonic element, and a third connector for connecting a third ultrasonic element.

Furthermore, the device comprises a transmitting unit for sending impulse signals and for sending measuring signals, a receiving unit for receiving response signals, and a processing unit. The transmitting unit, the receiving unit and the processing unit are provided for deriving a first measuring signal from a first inverted signal, for deriving a second measuring signal from a second inverted signal and for storing the first measuring signal and the second measuring signal.

Similar to the abovementioned embodiments, the derivation of the inverted signal comprises reversing a signal portion of a response signal of a corresponding impulse signal or of a signal derived therefrom with respect to time.

The processing unit, the transmitting unit and the receiving unit are operative to apply the first pre-determined measuring signal to the first connector, and to receive a first response signal of the first measuring signal at the second connector.

Furthermore, the processing unit, the transmitting unit and the receiving unit are operative to apply a second measuring signal to the first connector and to receive a second response signal of the second measuring signal at the third connector, and to derive a flow speed of the fluid from at least one of the first response signal and the second response signal.

Furthermore, the processing unit, the transmitting unit and the receiving unit can be operative to perform any of the other measurement and calibration methods that are described above with respect to a three transducer arrangement of three transducers, which may be wet transducers or clamp-on transducers.

The application of a signal can comprise in particular retrieving a stored signal from computer memory and generate a corresponding electric signal which is then transmitted to the transducer, in general by means of a cable. Furthermore, the processing unit is operative to derive a flow speed of the fluid from at least one of the first response signal and the second response signal.

In particular, the connectors, the transmitting unit, the receiving unit and the processing unit can be provided by a travel time ultrasonic flow meter or a portion thereof, and in particular by a portable travel time ultrasonic flow meter or a portion thereof.

In a further aspect, the present specification discloses a device for measuring a flow speed of a fluid in a conduit in an arrangement with at least two clamp-on transducers. In particular, The device comprises a first connector, a first ultrasonic clamp-on transducer which is connected to the first connector. Similarly, the device comprises a second connector and a second ultrasonic clamp-on transducer which is connected to the second connector.

Furthermore, the device comprises a portion of a conduit, the first ultrasonic clamp-on transducer being mounted to the conduit portion at a first location and the second ultrasonic clamp-on transducer being mounted to the conduit portion at a second location.

The clamp-on transducers are arranged such that respective connection lines between the first ultrasonic transducer, and the second ultrasonic transducer extend outside of a symmetry axis of the fluid conduit.

Similar to the abovementioned device, the device comprises a transmitting unit for sending impulse signals and for sending measuring signals, a receiving unit for receiving response signals and a processing unit for deriving a measuring signal from an inverted signal.

Similar to the abovementioned embodiments, the inverted signal comprises a reversed signal portion with respect to time of a response signal of a corresponding impulse signal or of a signal derived therefrom.

The processing unit, the transmitting unit and the receiving unit are operative to apply the measuring signal to the first connector, to receive a response signal of the first (pre-determined) measuring signal at the second connector and to derive a flow speed of the fluid from the response signal.

Furthermore, the processing unit, the transmitting unit and the receiving unit of the device can be operative to perform any of the other measurement and calibration methods that are described above with respect to an arrangement with a first clamp-on transducer and a second clamp-on transducer.

In a further embodiment, the device comprises a D/A converter, which is connected to the respective connectors, and an A/D converter, which is connected to the respective connectors. Furthermore, the device comprises a computer readable memory for storing the at least one measuring signal.

According to a further embodiment, the device comprises a direct digital signal synthesizer, which comprises the ADC, a frequency control register, a reference oscillator, a numerically controlled oscillator and a reconstruction low pass filter. The ADC is connectable to the respective connectors over the reconstruction low pass filter.

According to a further aspect, the current specification discloses a computer-implemented method for determining whether a given test device or device under test is measuring a flow speed of a fluid in a fluid conduit according to the abovementioned measurement method. The test method does not provide a mathematical proof that the same method is used but a likelihood, which is sufficient for practical purposes.

According to this method, the fluid conduit is provided with a fluid that has a pre-determined velocity with respect to the fluid conduit.

The fluid conduit is provided with a first ultrasonic transducer and a second ultrasonic transducer, which are mounted at respective first and second locations.

A test impulse signal is applied to the first ultrasonic transducer of the test device, and a test response signal of the test impulse signal is received at the second ultrasonic transducer of the test device.

A first test measuring signal is derived from the first response signal, wherein the derivation of the first measuring signal comprises reversing the respective first or second response signal, or a portion thereof, with respect to time.

The first test measuring signal is compared with a first measuring signal that is emitted at a transducer of the test device. It is determined that the test device is using a method to determine a flow speed of a fluid in a fluid conduit according to one of the claims, if the first test measuring signal and the first measuring signal are similar.

In particular, this method can be performed for every pair of transducers mentioned in one of the claims and it is detected that the corresponding method is used if the obtained measuring signals are similar for every such pair of transducers.

Specifically, with respect to the method of some of the claims the corresponding test method can further comprise providing the fluid conduit with a third ultrasonic transducer, applying a test impulse signal to the first ultrasonic transducer of the test device or to the second ultrasonic transducer of the test device, receiving a second test response signal of the test impulse signal at the at the third ultrasonic transducer of the test device, deriving a second test measuring signal from the second test response signal, and comparing the second test measuring signal with a second measuring signal that is emitted at a transducer of the test device.

It is determined that the test device is using a method to determine a flow speed of a fluid in a fluid conduit according to the claims, if the first test measuring signal and the first measuring signal are similar.

BRIEF DESCRIPTION OF THE DRAWINGS

The subject matter of the present specification is now explained in further detail with respect to the following Figures, wherein FIG. 2 shows the flow meter arrangement of FIG. 1, one direct signal and two scattered signals, FIG. 3 shows the flow meter arrangement of FIG. 1 when viewed in the direction of flow, FIG. 4 shows a second flow meter arrangement with four piezoelectric elements and four direct signals, FIG. 5 shows the flow meter arrangement of FIG. 4 when viewed in the direction of flow, FIG. 6 shows a schematic diagram of a test signal, FIG. 7 shows a schematic diagram of a test signal response, FIG. 8 shows a schematic diagram of an inverted signal, FIG. 9 shows a schematic diagram of a response from the inverted signal, FIG. 20 shows a further inverted signal in high resolution, FIG. 21 shows a response of the inverted signal of FIG. 20, FIG. 22 shows a further inverted signal in high resolution, FIG. 23 shows a response of the inverted signal of FIG. 22, FIG. 50 shows a one cycle measuring signal of a time of flight measurement, FIG. 51 shows a ten cycle measuring signal of a time of flight measurement, FIG. 52 show a measuring signal that is derived from a time reversed signal, FIG. 58 shows two different arrangements of two transducers on a conduit, FIG. 59 shows pressure distributions of measuring signals obtained in the arrangement of FIG. 58.

DETAILED DESCRIPTION OF THE PREFERRED EMBODIMENTS

In the following description, details are provided to describe the embodiments of the present specification. It shall be apparent to one skilled in the art, however, that the embodiments may be practiced without such details.

Some parts of the embodiments, which are shown in the FIGS., have similar parts. The similar parts have the same names or similar part numbers with a prime symbol or with an alphabetic symbol. The description of such similar parts also applies by reference to other similar parts, where appropriate, thereby reducing repetition of text without limiting the disclosure.

Figure 1:
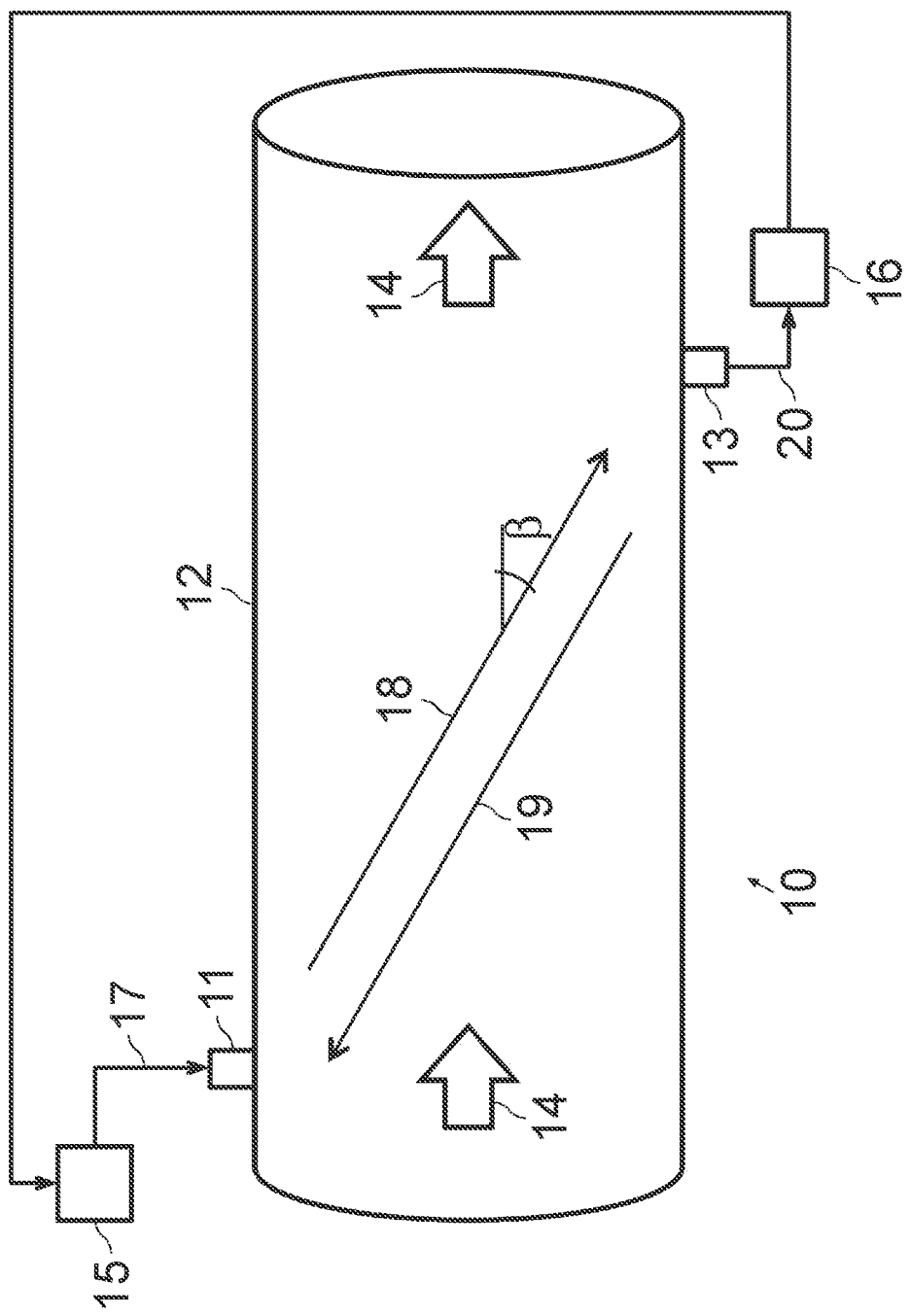
FIG. 1 shows a first flow meter arrangement with two piezoelectric elements.
Figure 10:
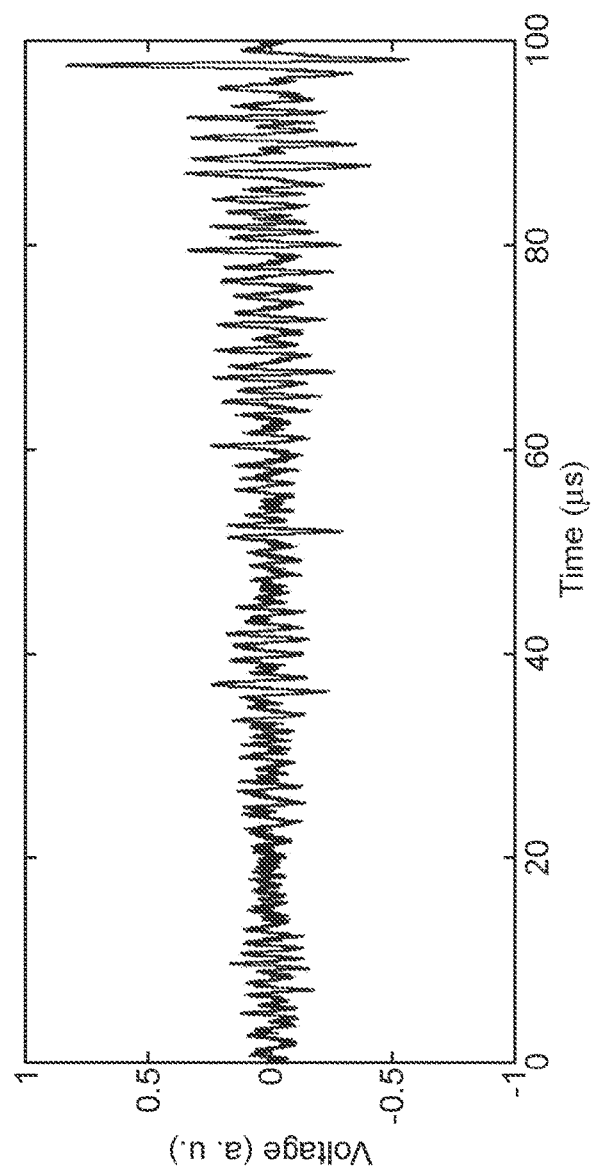
FIG. 10 shows a first inverted signal in high resolution.
Figure 11:
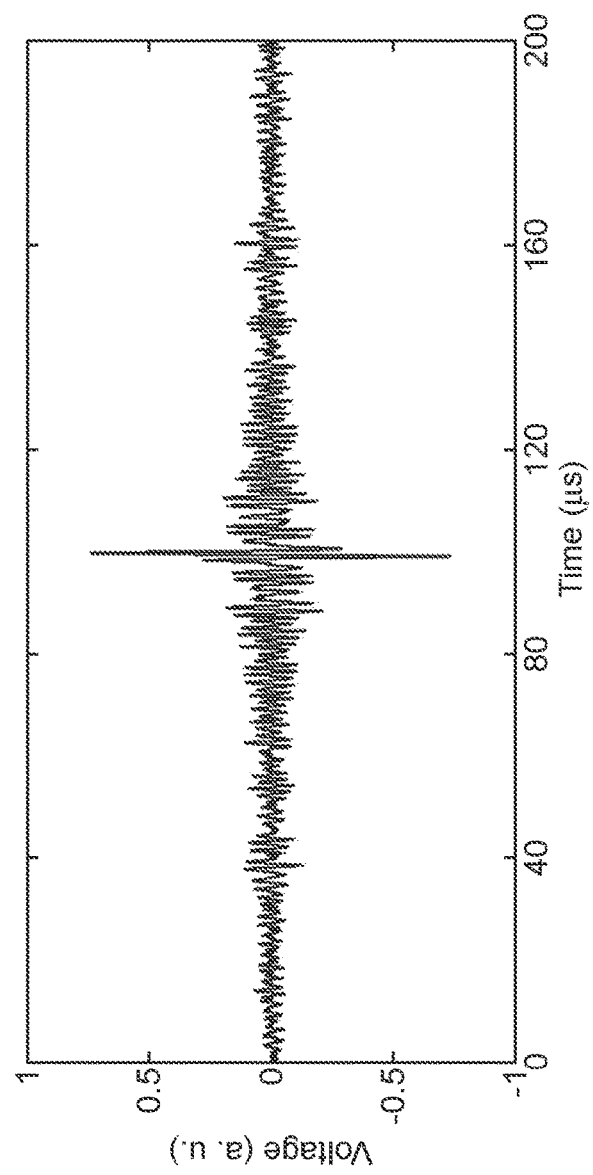
FIG. 11 shows a response of the inverted signal of FIG. 10.
Figure 12:
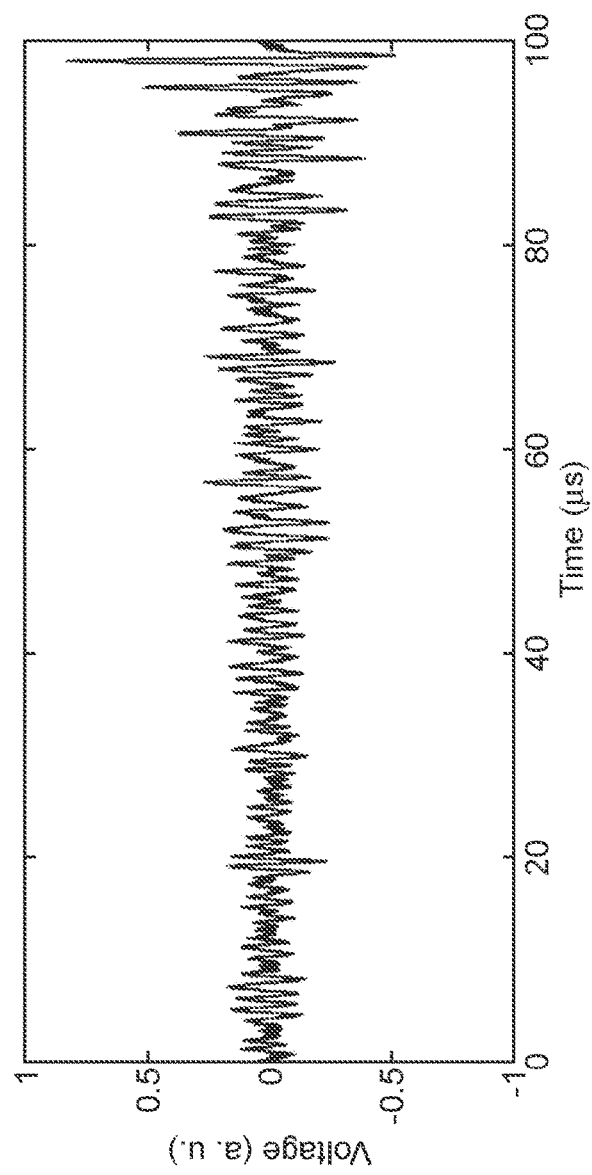
FIG. 12 shows a further inverted signal in high resolution.
Figure 13:
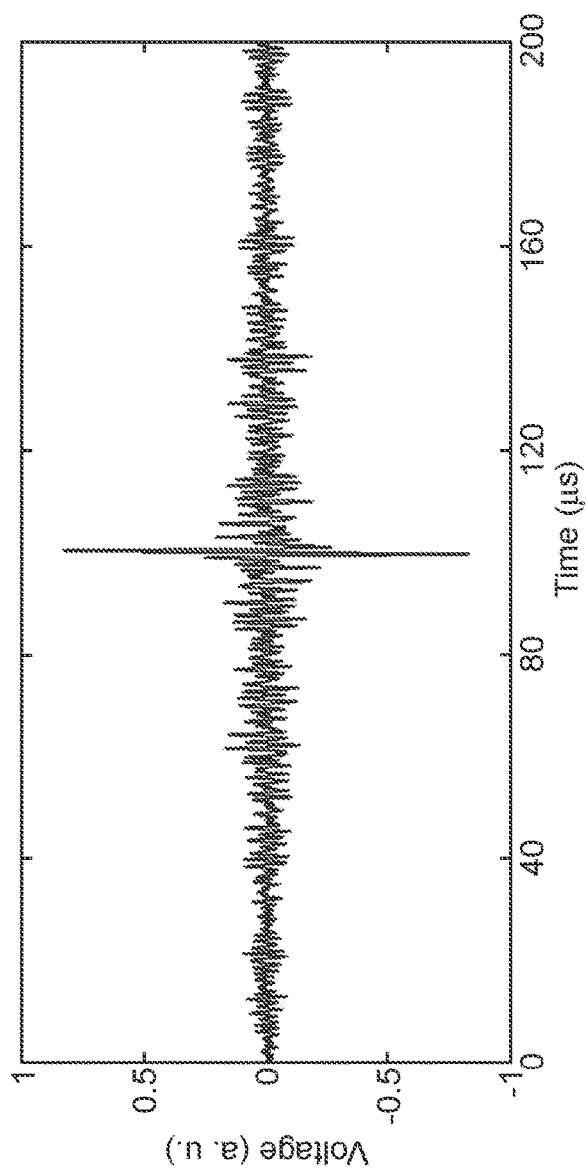
FIG. 13 shows a response of the inverted signal of FIG. 12.
Figure 14:
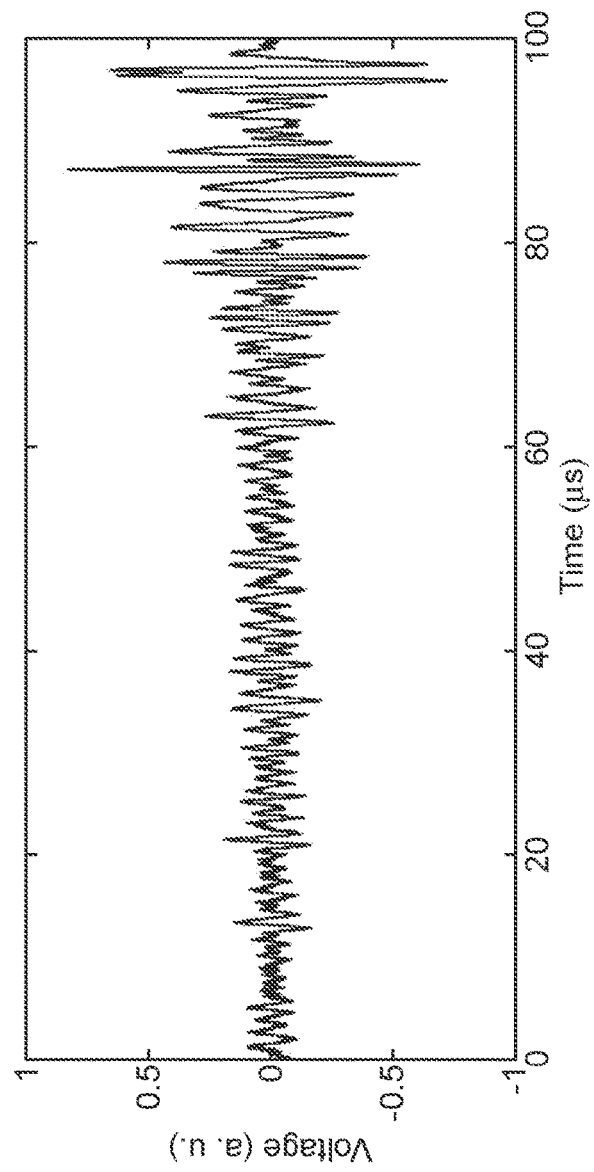
FIG. 14 shows a further inverted signal in high resolution.
Figure 15:
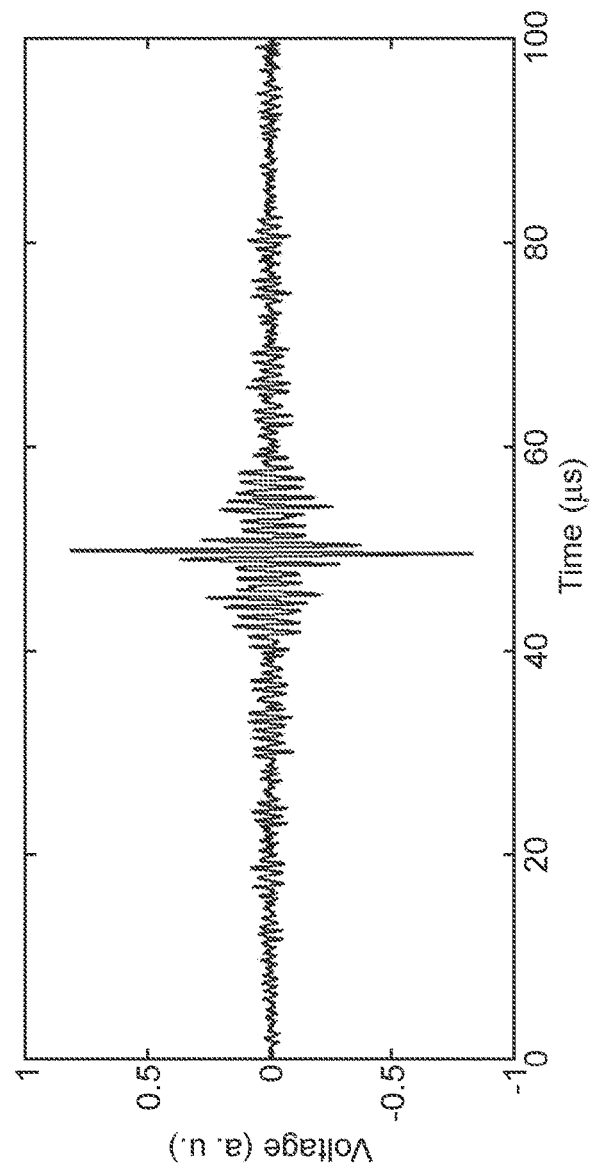
FIG. 15 shows a response of the inverted signal of FIG. 14.
Figure 16:
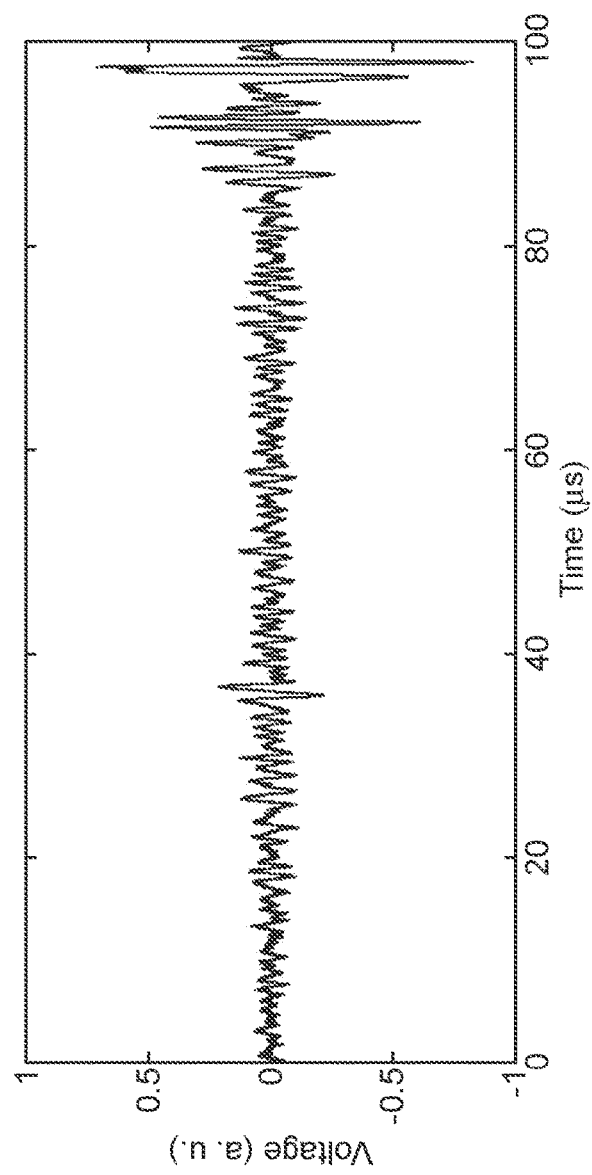
FIG. 16 shows a further inverted signal in high resolution.
Figure 17:
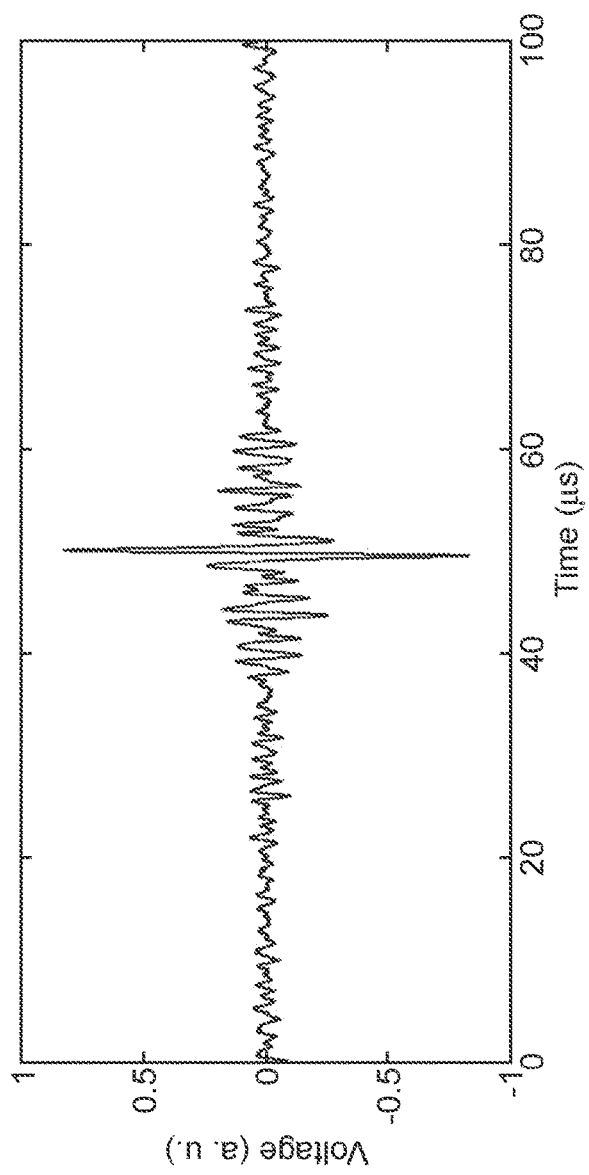
FIG. 17 shows a response of the inverted signal of FIG. 16.
Figure 18:
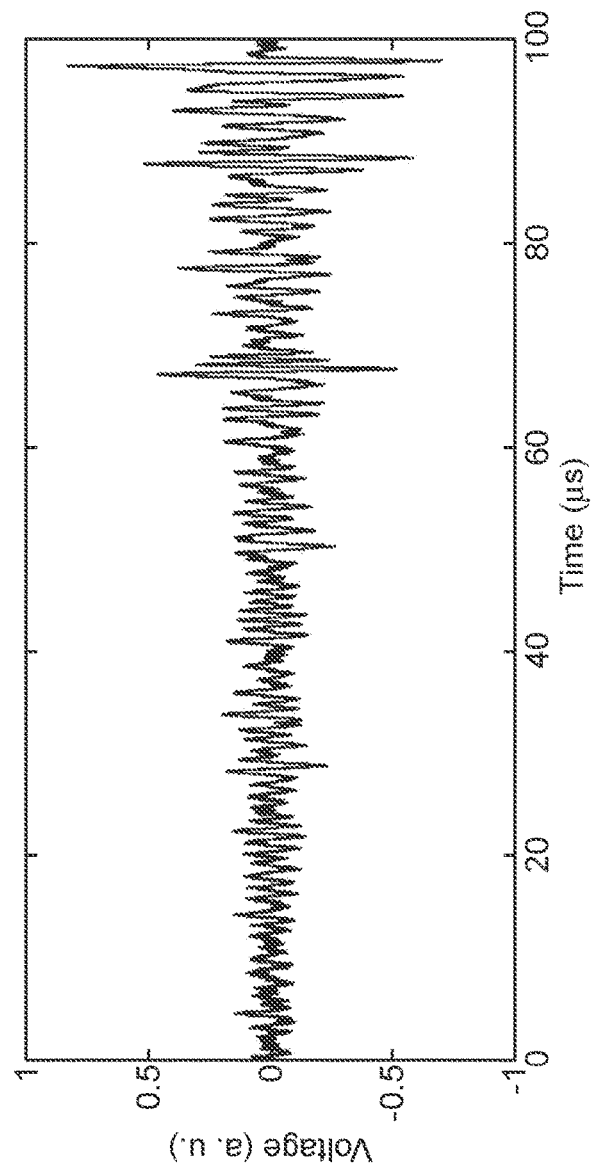
FIG. 18 shows a further inverted signal in high resolution.
Figure 19:
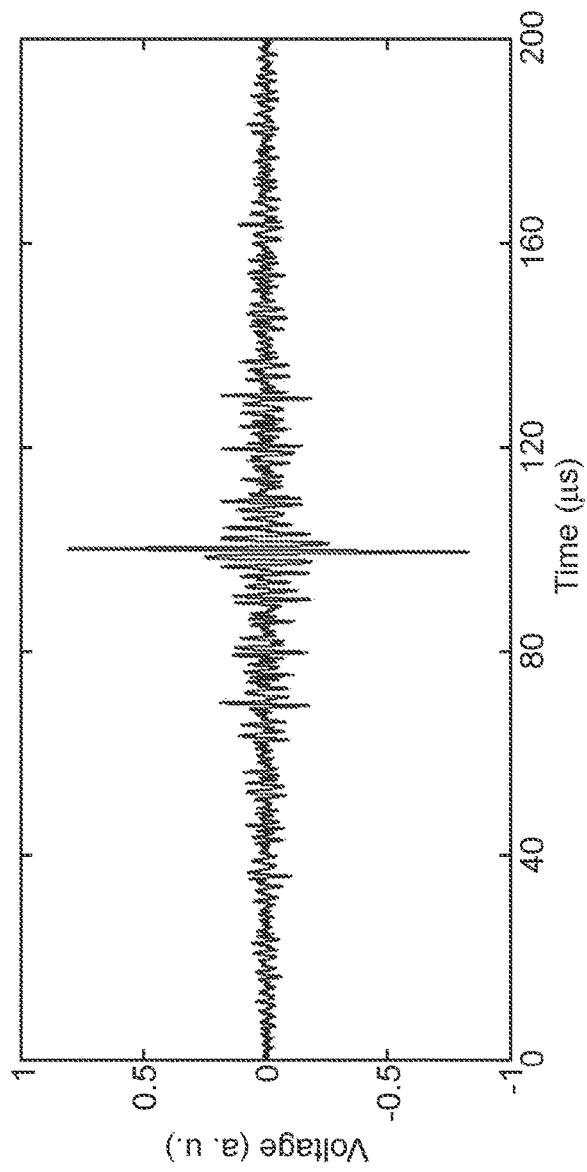
FIG. 19 shows a response of the inverted signal of FIG. 18.
Figure 24:
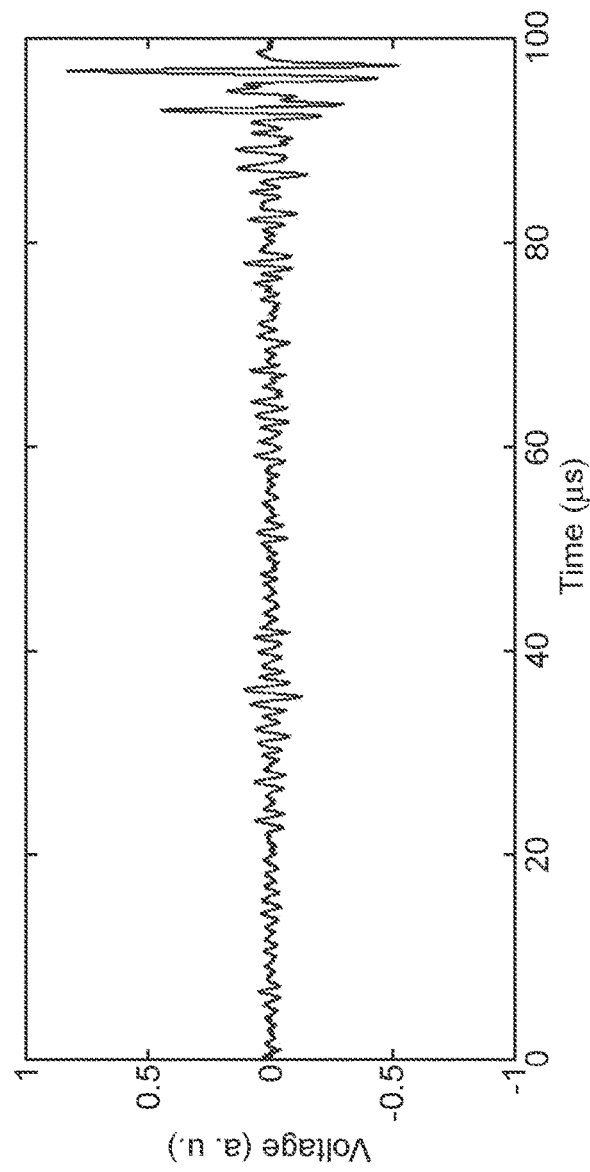
FIG. 24 shows a further inverted signal in high resolution.
Figure 25:
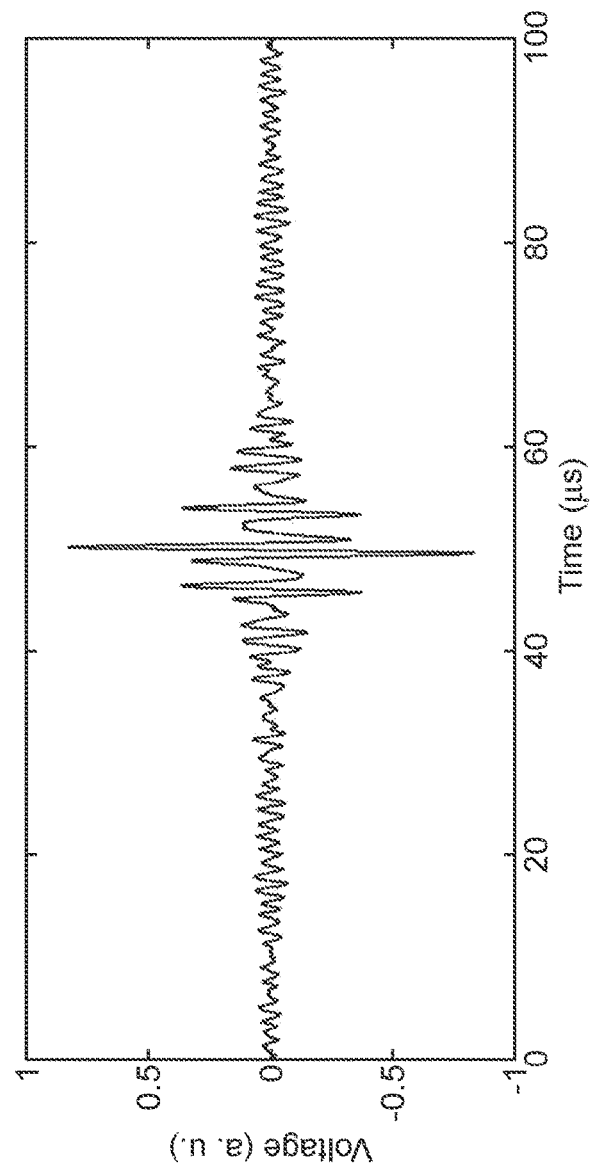
FIG. 25 shows a response of the inverted signal of FIG. 24.
Figure 26:
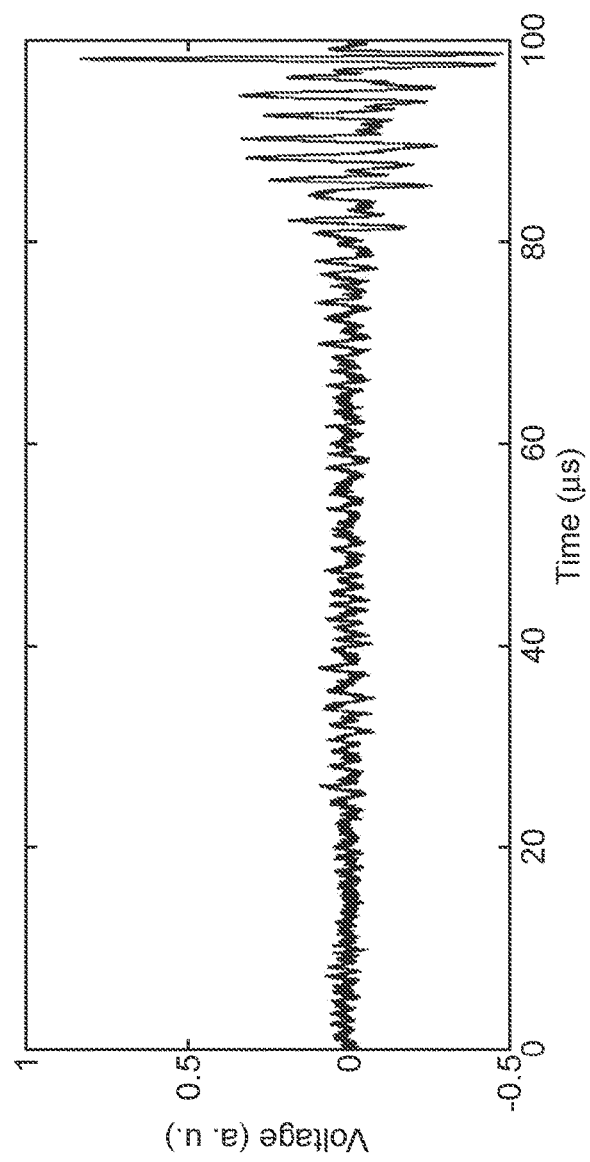
FIG. 26 shows a further inverted signal in high resolution.
Figure 27:
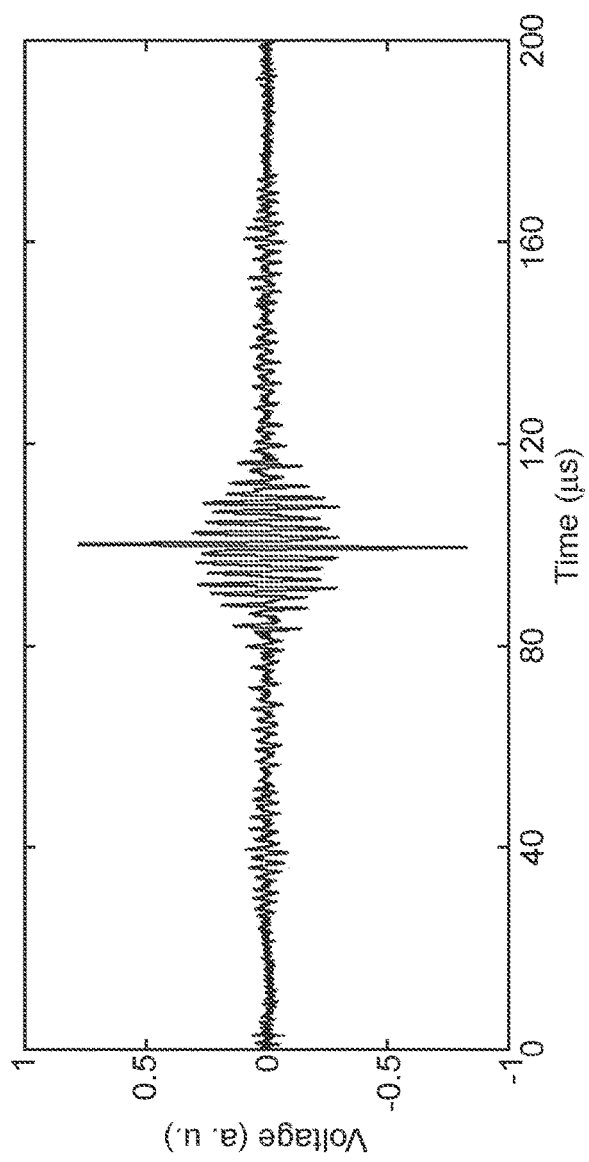
FIG. 27 shows a response of the inverted signal of FIG. 26.
Figure 28:
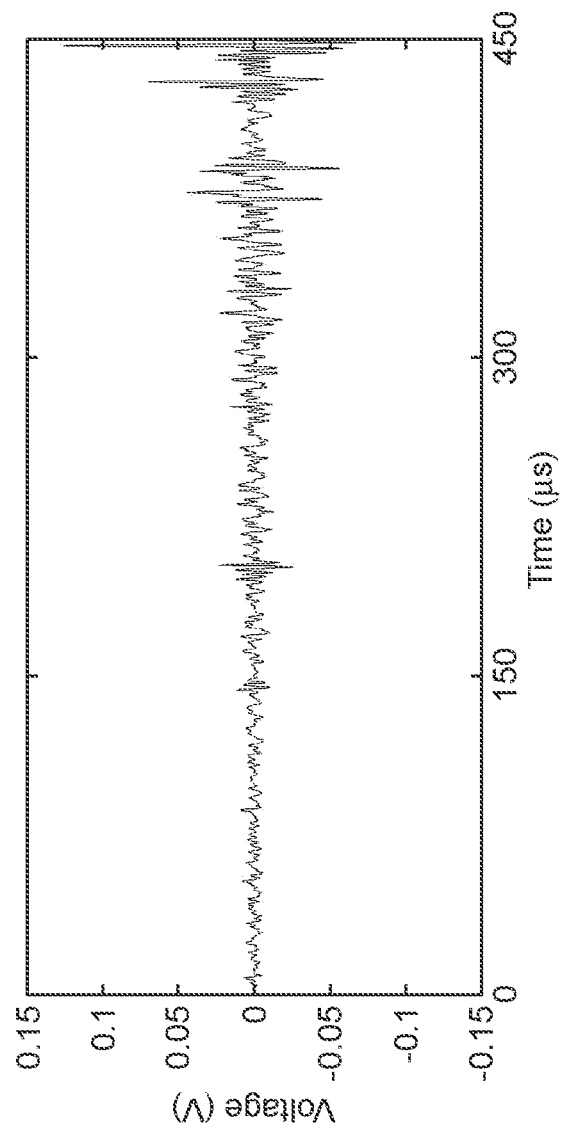
FIG. 28 shows a further inverted signal in 12-bit resolution.
Figure 29:
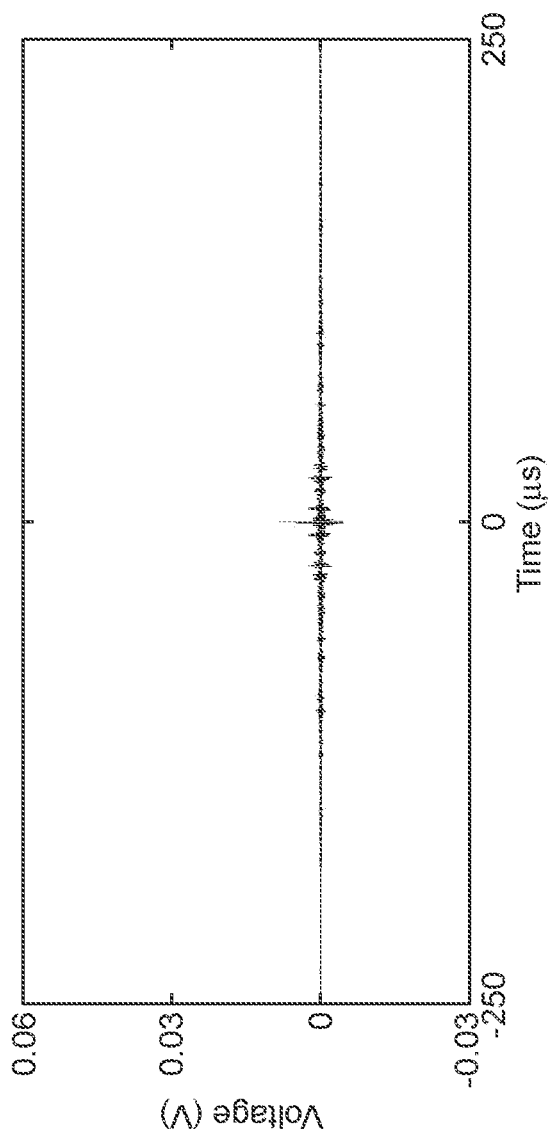
FIG. 29 shows a response of the signal of FIG. 28.
Figure 30:
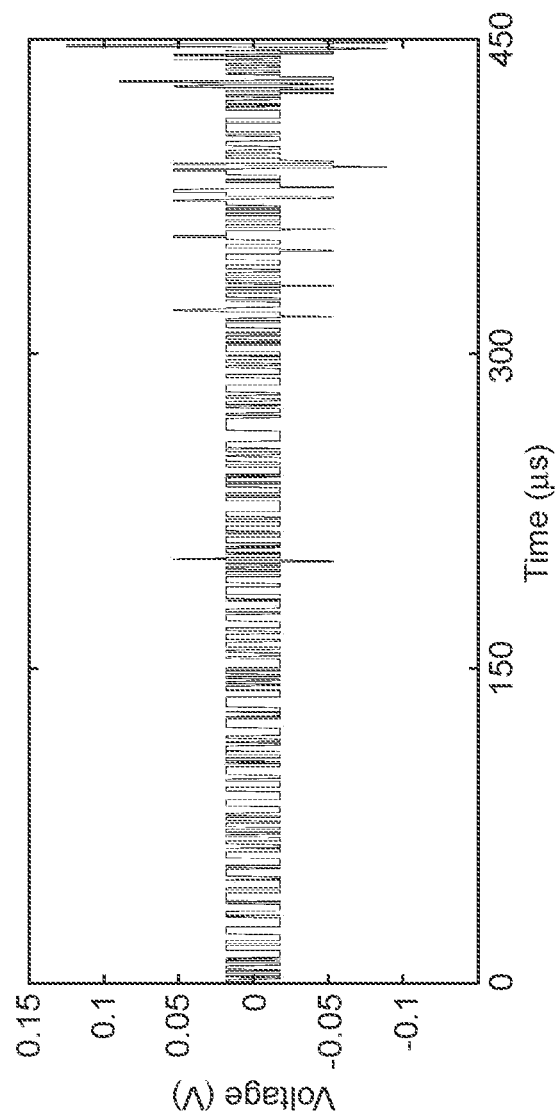
FIG. 30 shows a further inverted signal in 3-bit resolution.
Figure 31:
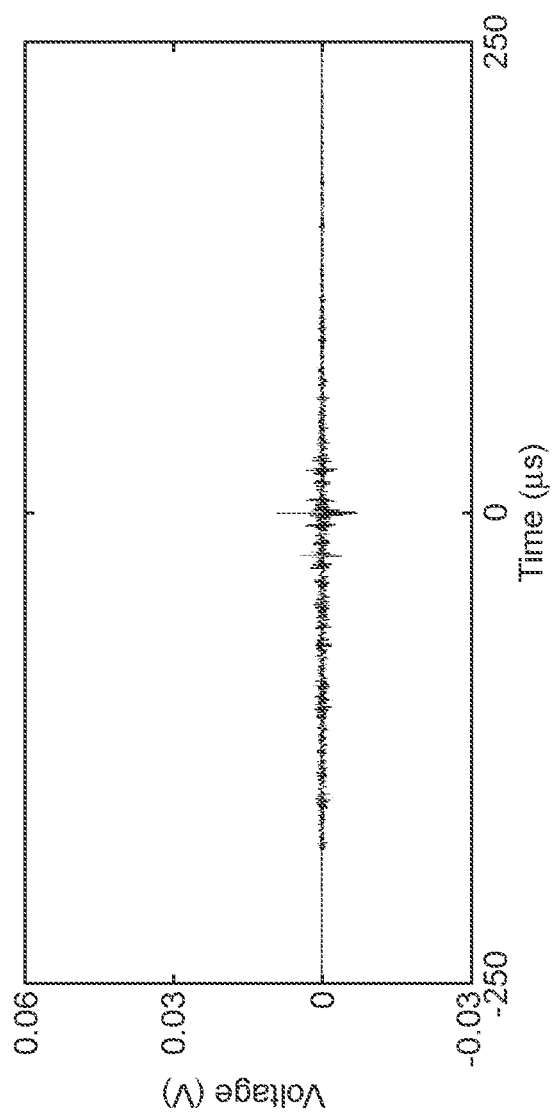
FIG. 31 shows a response of the signal of FIG. 30.
Figure 32:
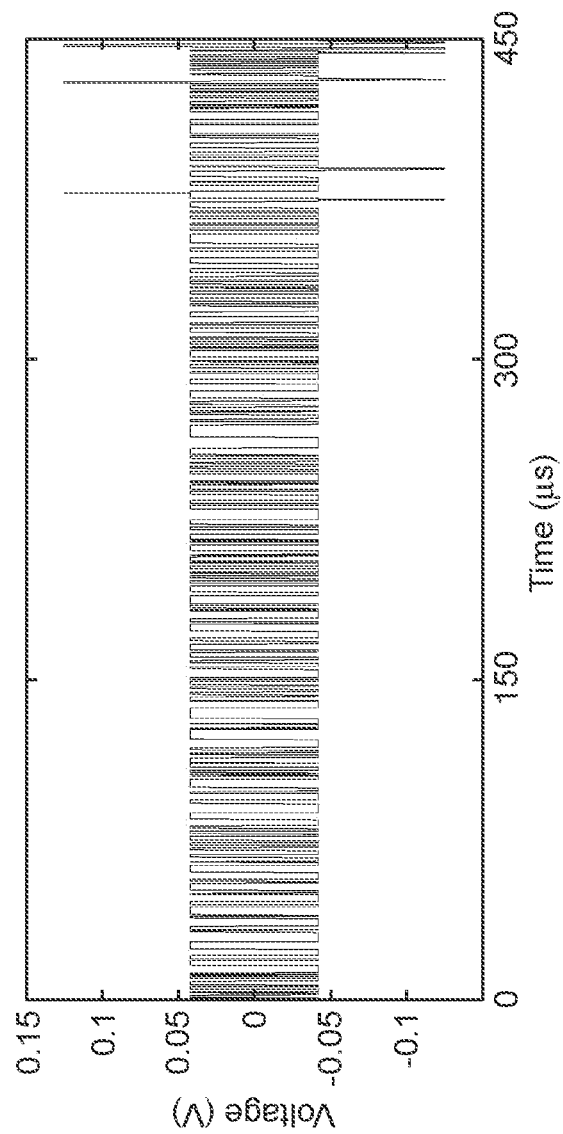
FIG. 32 shows a further inverted signal in 2-bit resolution.
Figure 33:
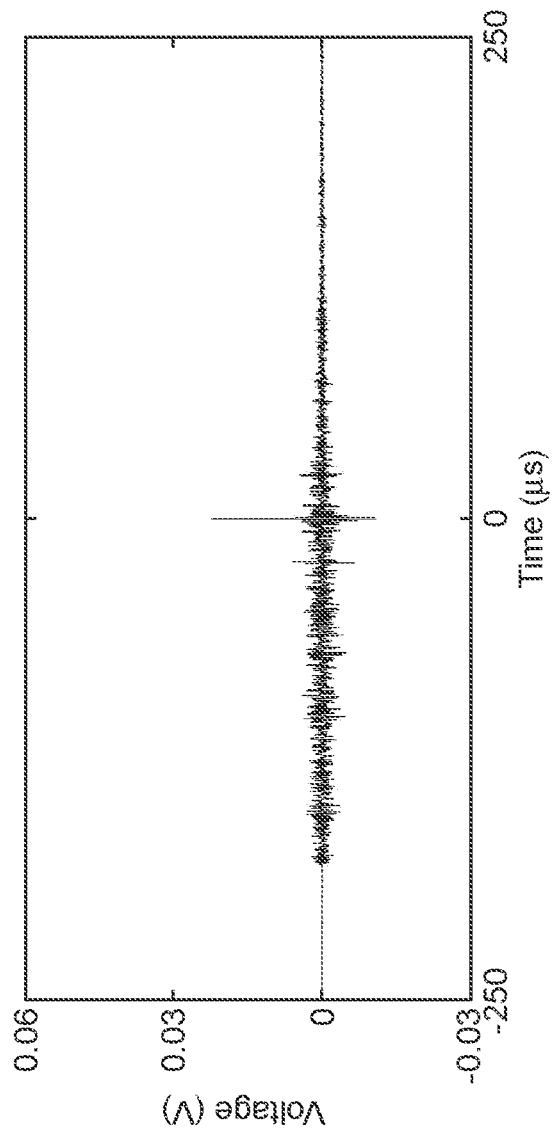
FIG. 33 shows a response of the signal of FIG. 32.
Figure 34:
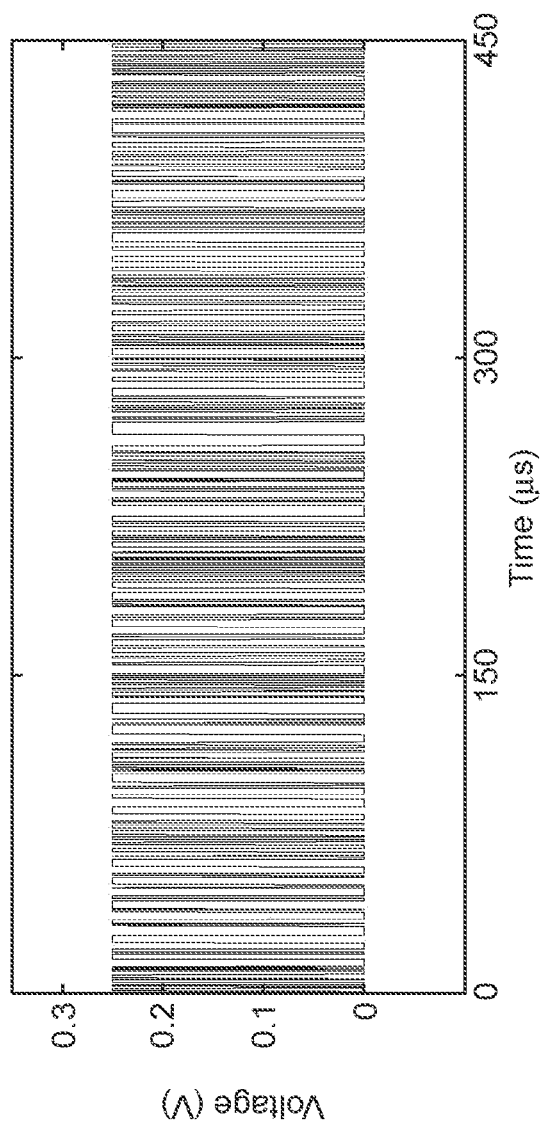
FIG. 34 shows a further inverted signal in 1-bit resolution.
Figure 35:
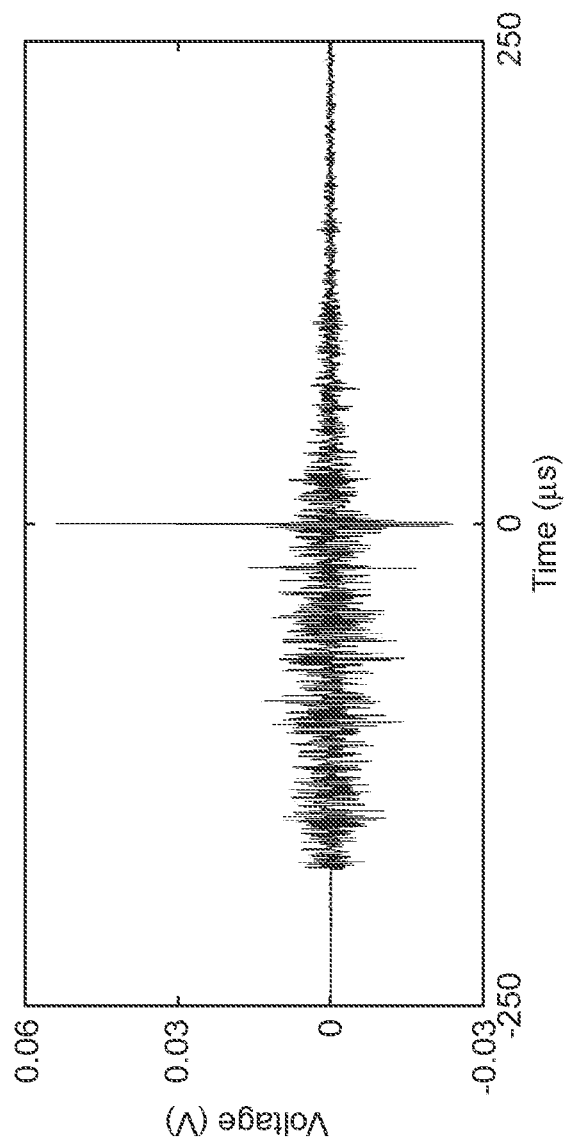
FIG. 35 shows a response of the signal of FIG. 34.

FIG. 1 shows a first flow meter arrangement 10. In the flow meter arrangement, a first piezoelectric element 11 is placed at an outer wall of a pipe 12, which is also referred as a tube 12. A second piezoelectric element 13 is placed at an opposite side of the pipe 12 such that a direct line between the piezoelectric element 11 and the downstream piezoelectric element 13 is oriented at an angle β to the direction 14 of average flow, which is at the same time also the direction of the pipe's 12 symmetry axis. The angle β is chosen to be approximately 45 degrees in the example of FIG. 1 but it may also be steeper, such as for example 60 degrees, or shallower, such as for example 30 degrees.

A piezoelectric element, such as the piezoelectric elements 11, 13 of FIG. 1 may in general be operated as an acoustic transmitter and as an acoustic sensor. An acoustic transmitter and an acoustic sensor may be provided by the same piezoelectric element or by different regions of the same piezoelectric element. In this case, a piezoelectric element or transducer is also referred to as piezoelectric transmitter when it is operated as transmitter or sound source and it is also referred to as acoustic sensor or receiver when it is operated as acoustic sensor.

When a flow direction is as shown in FIG. 1, the first piezoelectric element 11 is also referred to as "upstream" piezoelectric element and the second piezoelectric element 13 is also referred to as "downstream" piezoelectric element. A flow meter according to the present specification works for both directions of flow in essentially the same way and the flow direction of FIG. 1 is only provided by way of example.

FIG. 1 shows a flow of electric signals of FIG. 1 for a configuration in which the upstream piezoelectric element 11 is operated as a piezoelectric transducer and the downstream piezoelectric element 13 is operated as an acoustic sensor. For the purpose of clarity, the application works upstream and downstream, i.e. the position of the piezoelectric elements can be interchanged.

A first computation unit 15 is connected to the upstream piezoelectric element 11 and a second computation unit 16 is connected to the downstream piezoelectric element 13. The first computation unit 15 comprises a first digital signal processor, a first digital analog converter (DAC) and a first analog digital converter (ADC). Likewise, the second computation unit 16 comprises a second digital signal processor, a second digital analog converter (DAC) and a second analog digital converter (ADC). The first computation unit 15 is connected to the second computation unit 16.

The arrangement with two computation units 15, 16 shown in FIG. 1 is only provided by way of example. Other embodiments may have different numbers and arrangements of computation units. For example, there may be only one central computation unit or there may be two AD/DC converters and one central computation unit, or there may be two small-scale computation units at the transducers and one larger central computation unit.

A computation unit or computation units can be provided by microcontrollers or application specific integrated circuits (ASICs), or field programmable gate arrays (FPGAs), for example. Specifically, the synthesis of an electrical signal from a stored digital signal may be provided by a direct digital synthesizer (DDS), which comprises a digital to analog converter (DA, DAC).

A method for generating a measuring signal according to the present specification comprises the following steps.

A pre-determined digital test signal is generated by synthesizing an acoustic signal with the digital signal processor of the first computation unit 15. The digital test signal is sent from the first computation unit 15 to the piezoelectric transducer 11 along signal path 17. The piezoelectric transducer 11 generates a corresponding ultrasound test signal. Units 15 and 16 can also be provided in one single unit.

The test signal is provided as a short pulse, for example by a single 1 MHz oscillation or by 10 such oscillations. In particular, the test signal may be provided by a small number of oscillations with constant amplitude, thereby approximating a rectangular signal. The oscillation or the oscillations may have a sinusoidal shape, a triangular shape, a rectangular shape or also other shapes.

The ultrasound test signal travels through the liquid in the pipe 12 to the piezoelectric sensor 13. In FIG. 1, a direct signal path of the ultrasound signal is indicated by an arrow 18. Likewise, a direct signal path of the ultrasound signal in the reverse direction is indicated by an arrow 19. A response signal is picked up by the piezoelectric sensor 13, sent to the second computation unit 16 along signal path 20, and digitized by the second computation unit 16.

In a further step, a digital measuring signal is derived from the digitized response signal. The derivation of the measurement refers to a reversal of the digitized response signal with respect to time. According to further embodiments, the derivation comprises further steps such as a conversion to a reduced resolution in the amplitude range, a bandwidth filtering of the signal to remove noise, such as low frequency noise and high frequency noise. In particular, the step of bandwidth filtering may be executed before the step of reversing the signal with respect to time.

The signal reversal may be carried out in various ways, for example by reading out a memory area in reverse direction or by reversing the sign of sinus components in a Fourier representation.

In one embodiment, a suitable portion of the digitized response signal is selected that contains the response from the direct signal. The portion of the response signal is then turned around or is inverted with respect to time. In other words, signal portions of the response signal that are received later are sent out earlier in the inverted measuring signal. If a signal is represented by a time ordered sequence of amplitude samples, by way of example, the abovementioned signal inversion amounts to inverting or reversing the order of the amplitude samples.

The resulting signal, in which the direction, or the sign, of time has been inverted, is also referred to as an "inverted signal". The expression "inverted" in this context refers to an inversion with respect to the direction of time, and not to an inversion with respect to a value, such as the amplitude value.

FIGS. 10 to 19 show, by way of example digital signals according to the present specification.

In a flow meter according to one embodiment of the present specification, the same measuring signal is used for both directions 18, 19, the downstream and the upstream direction, providing a simple and efficient arrangement. According to other embodiments, different measuring signals are used for both directions. In particular, the measuring signal may be applied to the original receiver of the test signal. Such arrangements may provide benefits for asymmetric conditions and pipe shapes.

A method of measuring a flow speed of a liquid through a pipe, which uses the abovementioned-inverted signal as a measuring signal, comprises the following steps.

The abovementioned measuring signal is sent from the first computation unit 15 to the piezoelectric transducer 11 along signal path 17. The piezoelectric transducer 11 generates a corresponding ultrasound-measuring signal. Examples for such a measuring signal are provided in FIGS. 10, 12, 14, 16, 18, 20, 22, 24, 26, 28, 30, 32, 34, 37, and 38.

The ultrasound-measuring signal travels through the liquid in the pipe 12 to the piezoelectric sensor 13. A response signal is picked up by the piezoelectric sensor 13, sent to the second computation unit 16 along signal path 20, and digitized by the second computation unit 16.

The second computation unit 16 sends the digitized response signal to the first computation unit 15. The first computation unit 15 determines a time of flight of the received signal, for example by using one of the methods described further below.

A similar process is carried out for a signal travelling in the reverse direction 19, namely the abovementioned measuring signal is applied to the downstream piezoelectric element 13, and a response signal is measured by the upstream piezoelectric element 11 to obtain an upstream time of flight TOF_up in the reverse direction 19. The first computation unit 15 determines a velocity of flow, for example according to the formula $$v = \frac{c^2}{2 \cdot L \cdot \cos \beta} \cdot (TOF_{up} - TOF_{down}),$$

wherein L is the length of the direct path between the piezoelectric elements 11, 13, β is the angle of inclination of the direct path between the piezoelectric elements 11, 13 and the direction of the average flow, and c is the velocity of sound in the liquid under the given pressure and temperature conditions.

The squared velocity of sound c^2 can be approximated to second order by the expression $$c^2 \approx \frac{L^2}{TOF_{up} * TOF_{down}}$$

which leads to the formula $$v = \frac{L}{2 * \cos \beta} \cdot \frac{TOF_{up} - TOF_{down}}{TOF_{up} * TOF_{down}}$$

Thereby, it is not necessary to determine temperature or pressure, which in turn determine the fluid density and the sound velocity, or to measure the sound velocity or the fluid density directly. By contrast, the first order of the error does not cancel out for only one measurement direction.

Instead of using a factor 2·L·cos β, a proportionality constant can be derived from a calibration measurement with a known flow speed. The proportionality constant of the calibration takes into account further effects such as flow profiles and contributions from sound waves that were scattered and did not travel along a straight line.

According to a further embodiment, the process of generating an impulse signal, recording a response signal and deriving an inverted measuring signal from the response signal is simulated in a computer. Relevant parameters, such as the pipe diameter of the pipe 12 and the sensor placements are provided as input parameters to the simulation.

Figure 37:
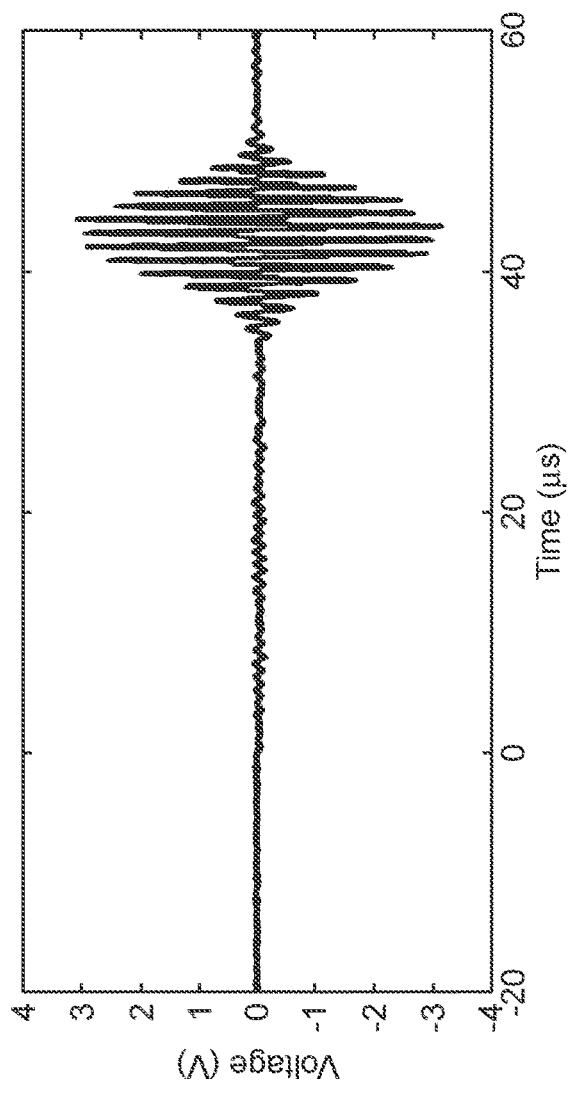
FIG. 37 shows a signal of a piezoelectric element of the flow meter of FIG. 1, which is derived from the inverted response of the signal of FIG. 36.
Figure 38:
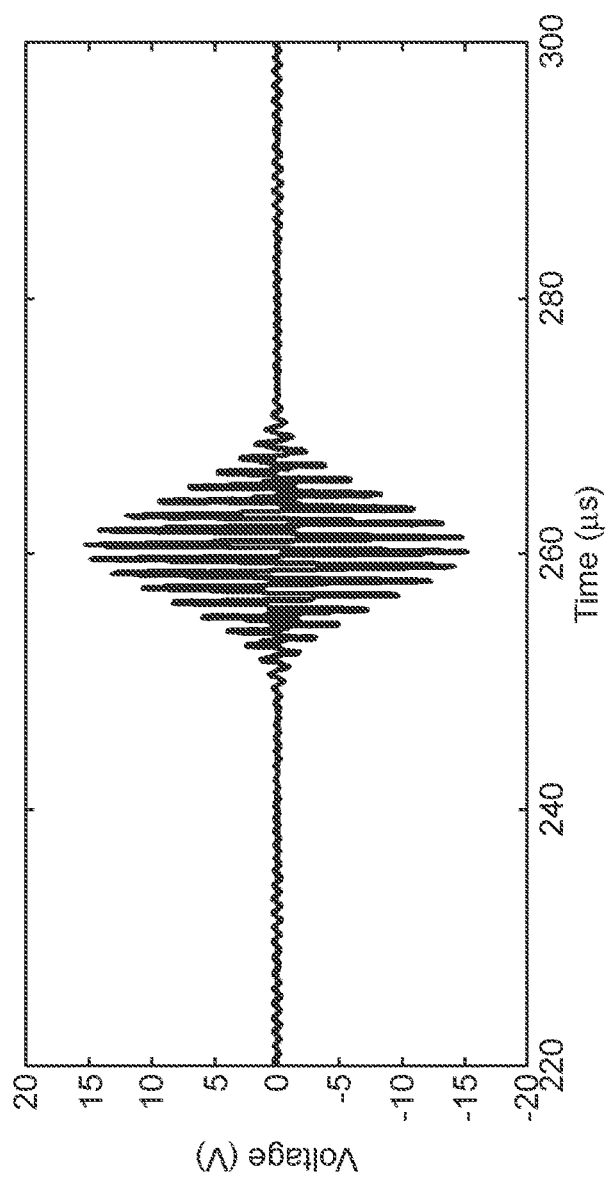
FIG. 38 shows a response of the signal of FIG. 37.

According to yet another embodiment, the measuring signal, which is to be supplied to a transmitting piezoelectric element, is synthesized using a shape of a typical response signal to an impulse signal, such as the signal shapes shown in FIGS. 37 and 38. For example, the measuring signal may be provided by a 1 MHz sinusoidal oscillation, which is amplitude modulated with an envelope according to a Gaussian probability function having a half width of 10 microseconds. The half-width may be chosen as an input parameter, which depends on the actual arrangement, such as the pipe diameter and the sensor placement.

A flow meter according to the present specification may also be provided as a pre-defined flow meter in which the measuring signal is generated during a test run at a factory site, in particular when the flow meter is supplied together with a pipe section.

According to a simple embodiment of the present specification, a time of flight in upstream and in downstream direction is determined by evaluating a time of a peak amplitude of a received signal with respect to a sending time of the measuring signal. To achieve a higher precision, the maximum may be determined using an envelope of the received signal. According to a further embodiment, the measurement is repeated multiple times and an average time of flight is used.

According to a further embodiment of the present specification, the time of flight of a signal is evaluated using a cross-correlation technique. In particular, the respective time shifts can be evaluated by cross correlating the received downstream or upstream signal with the received signal at zero flow speed according to the formula:

$$CCorr(\tau) = \sum_{t=-\infty}^{\infty} Sig_{Flow}(t) \cdot Sig_{NoFlow}(t+\tau),$$

wherein Sig_Flow represents an upstream or downstream signal under measurement conditions, when there is a fluid flow through the pipe, and wherein Sig_NoFlow represents a signal under calibration conditions at zero flow. The infinite sum limits represent a sufficiently large time window [−T1, +T2]. In more general words, −T1 and +T2 do not need to be same and for practical reasons this can be advantageous for the flow meter.

The time shift TOF_up-TOF_down is then obtained by comparing the time of the maximum of the upstream correlation function with the time of the maximum of the downstream correlation function. The envelope of the correlation function may be used to determine the location of the maximum more accurately.

In a further embodiment, a separate evaluation unit is provided between the first computation unit 15 and the second computation unit 16, which performs the calculation of the signal arrival times and the flow speed.

In general, the measured signal of the acoustic sensor results from a superposition of scattered signals and a direct signal. The scattered signals are reflected from the inner and outer walls of the pipe once or multiple times including additional scattering processes within the pipe wall. This is shown, by way of example, in FIG. 2.

The transducer configuration of FIG. 1 is a direct-line or "Z" configuration. Other arrangements, which make use of reflections on an opposite side of the pipe, are possible as well, such as the "V" and the "W" configuration. V and W configuration work based on reflections on the pipe wall, which induce more scatterings than the Z configuration. The subject matter of the application will benefit from these configurations as long as the paths are understood properly.

In a V-configuration, the two transducers are mounted on the same side of the pipe. For recording a 45-degree reflection, they are placed about a pipe diameter apart in the direction of the flow. The W-configuration makes use of three reflections. Similar to the V-configuration, the two transducers are mounted on the same side of the pipe. For recording a signal after two 45-degree reflections, they are placed two pipe diameters apart in the direction of the flow.

FIG. 2 shows, by way of example a first acoustic signal "1", which travels directly from the piezoelectric element 11 to the piezoelectric element 13 and a third signal 3, which is scattered three times at the periphery of the pipe 12.

For simplicity, the scattering events are shown as reflections in FIGS. 2 to 5 but the actual scattering process can be more complicated. In particular, the most relevant scattering occurs typically in the pipe wall or at material that is mounted in front of the piezoelectric transducers. FIG. 3 shows a view of FIG. 2 in flow direction in the viewing direction A-A.

FIGS. 4 and 5 show a second sensor arrangement in which a further piezoelectric element 22 is positioned at a 90-degree angle to the piezoelectric element 11 and a further piezoelectric element 23 is positioned at a 90-degree angle to the piezoelectric element 13.

Furthermore, FIGS. 4 and 5 show direct or straight line, acoustic signal paths for a situation in which the piezoelectric elements 11, 22 are operated as piezo transducers and the piezoelectric elements 13, 23 are operated as acoustic sensors. Piezoelectric element 23, which is on the back of the pipe 12 in the view of FIG. 4 is shown by a dashed line in FIG. 4.

FIGS. 6 to 9 show, in a simplified way, a method of generating a measuring signal from a response of a test signal. In FIGS. 6 to 9, losses due to scattering are indicated by hatched portions of a signal and by arrows.

For the considerations of FIGS. 6 to 9, it is assumed that the acoustic signal only propagates along a straight line path, along a first scattering channel with a time delay of $\Delta t$, and along a second scattering channel with a time delay of $2\Delta t$. Signal attenuation along the paths is not considered.

A test signal in the form of a rectangular spike is applied to the piezoelectric element 11. Due to scattering, a first portion of the signal amplitude is lost due to the first scattering path and appears after a time $\Delta t$, and a second portion of the signal amplitude is lost due to the second scattering path and appears after a time $2\Delta t$. This yields a signal according to the white columns in FIG. 7, which is recorded at the piezoelectric element 13.

A signal processor inverts this recorded signal with respect to time and is applies the inverted signal to the piezoelectric element 11. The same scattering process as explained before now applies to all three-signal components. As a result, a signal according to FIG. 9 is recorded at the piezoelectric element 13, which is approximately symmetric.

In reality, the received signals will be distributed over time and there often is a "ballistic wave", which has travelled through material of the pipe and arrives before the direct signal. This surface wave is discarded by choosing a suitable time window for generating the inverted measuring signal. Likewise, signals that stem from multiple reflections and arrive late can be discarded by limiting the time window and/or by choosing specific parts of the signal.

The following table 1 shows measured time delays for a direct alignment, or, in other words, for a straight-line connection between clamped-on piezoelectric elements on a DN 250 pipe in a plane perpendicular to the longitudinal extension of the DN 250 pipe. The flow rate refers to a flow of water through the DN 250 pipe.

Figure 36:
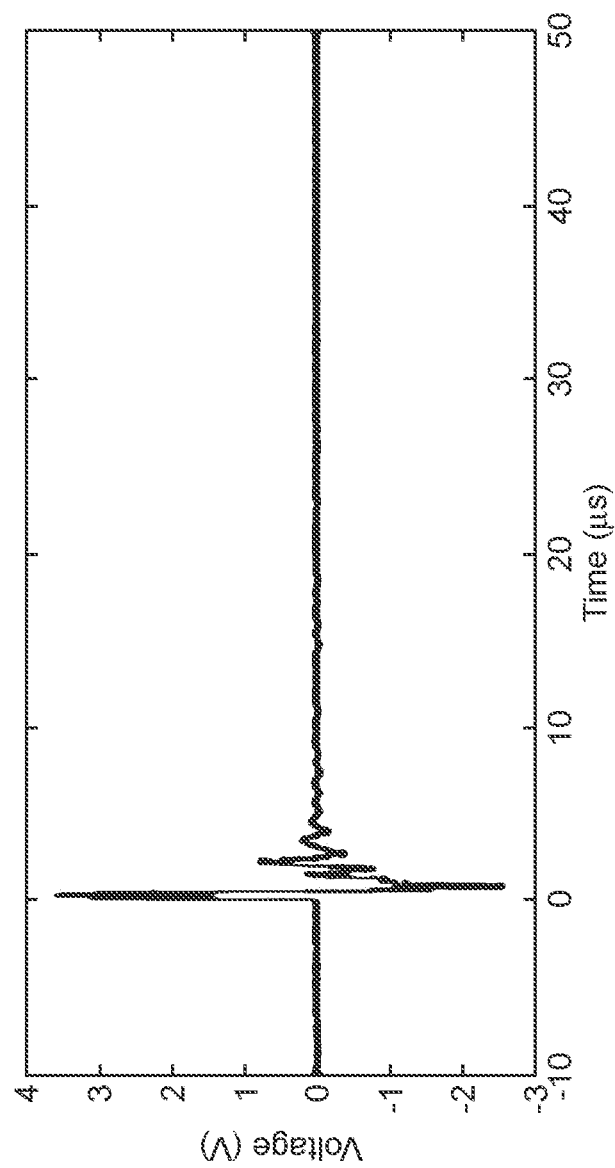
FIG. 36 shows a short impulse at a piezoelectric element of the flow meter of FIG. 1.

Herein "TOF 1 cycle" refers to an impulse such as the one shown in FIG. 36, that is generated by a piezoelectric element, which is excited by an electric signal with 1 oscillation having a 1 µs period. "TOF 10 cycle" refers to a signal that is generated by a piezoelectric element, which is excited by an electric signal with 10 sinusoidal oscillations of constant amplitude having a 1 µs period.

| Flowrate/Method | 21 m³/h | 44 m³/h | 61 m³/h |
| --- | --- | --- | --- |
| TOF 1 cycle | 7 ns | 18 ns | 27 ns |
| TOF 10 cycle | 9 ns | 19 ns | 26 ns |
| Time reversal | 8 ns | 18 ns | 27 ns |

Figure 49:
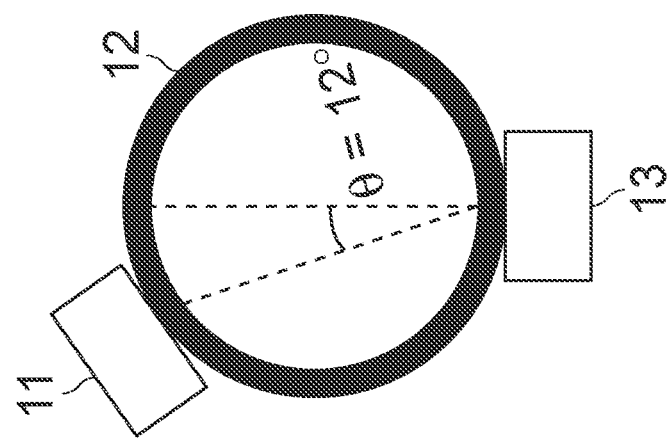
FIG. 49 shows a transverse cross section of the arrangement of FIG. 49.
Figure 48:
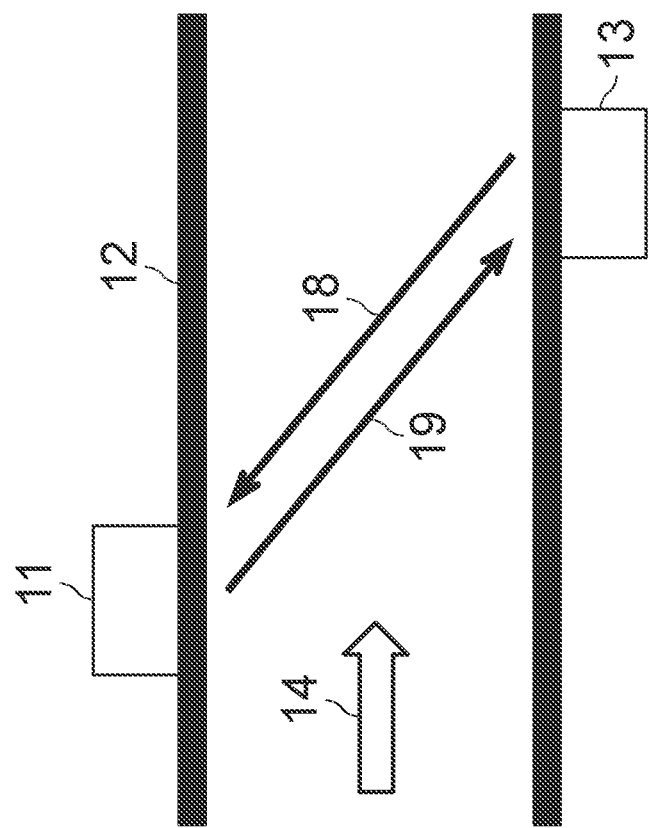
FIG. 48 shows a longitudinal cross section of an asymmetric transducer arrangement.

The following table shows measured time delays for a 12 degree misalignment against a straight line connection between clamped-on piezoelectric elements in a DN 250 pipe in a plane perpendicular to the longitudinal extension of the DN 250 pipe (see also FIGS. 48 & 49).

| Flowrate/Method | 21 m³/h | 44 m³/h | 61 m³/h |
| --- | --- | --- | --- |
| TOF 1 cycle | 10 ns | 21 ns | 28 ns |
| TOF 10 cycle | 9 ns | 17 ns | 26 ns |
| Time reversal | 4 ns | 12 ns | 26 ns |

FIGS. 9-27 show high resolution inverted signals and their respective response signals. The voltage is plotted in arbitrary units over the time in microseconds.

The time axes in the upper Figures show a transmitting time of the inverted signal. The transmitting time is limited to the time window that is used to record the inverted signal. In the example of FIGS. 9-27 the time window starts shortly before the onset of the maximum, which comes from the direct signal and ends 100 microseconds thereafter.

The time axes in the lower Figures are centered around the maximum of the response signals and extend 100 microseconds, which is the size of the time window for the inverted signal, before and after the maximum of the response signals.

FIGS. 28-35 show digitized inverted signals in a high resolution and in 12, 3, 2 and 1 bit resolution in the amplitude range and their respective response signals. The voltage is plotted in Volt over the time in microseconds. The signals of FIG. 28-25 were obtained for a water filled DN 250 pipe.

The length of the time window for the inverted signal is 450 microseconds. Hence, the time window of FIGS. 28-35 is more than four times larger than in the preceding FIGS. 9-27.

In FIGS. 28-35 it can be seen that even a digitization with 1 bit resolution produces a sharp spike. It can be seen that the spike becomes even more pronounced for the lower resolutions. A possible explanation for this effect is that in the example of FIGS. 28-35 the total energy of the input signal is increased by using a coarser digitization in the amplitude range while the response signal remains concentrated in time.

FIG. 36 shows a signal that is generated by a piezoelectric element after receiving an electric pulse that lasts for about 0.56 microseconds, which is equivalent to a frequency of 3.57 MHz. Due to the inertia of the piezoelectric element, the maximum amplitude for the negative voltage is smaller than for the positive voltage and there are multiple reverberations before the piezoelectric element comes to rest.

FIG. 37 shows an electric signal that is applied to a piezoelectric element, such as the upstream piezoelectric element 11 of FIG. 1. The signal of FIG. 37 is derived by forming an average of ten digitized response signals to a signal of the type shown in FIG. 36 and time reversing the signal, wherein the response signals are received by a piezoelectric element such as the downstream piezoelectric element 13 of FIG. 1.

In the example of FIG. 37, the digitized signals are obtained by cutting out a signal portion from the response signal that begins approximately 10 microseconds before the onset of envelope of the response signal and that ends approximately 55 microseconds behind the envelope of the response signal. The envelope shape of the response signal of FIG. 37 is similar to the shape of a Gaussian probability distribution, or, in other words, to a suitable shifted and scaled version of $\exp(-x^2)$.

FIG. 38 shows a portion of a response signal to the signal shown in FIG. 37, wherein the signal of FIG. 37 is applied to a first piezoelectric element, such as the upstream piezoelectric element 11, and is received at a second piezoelectric element, such as the downstream piezoelectric element 13 of FIG. 1.

Figure 39:
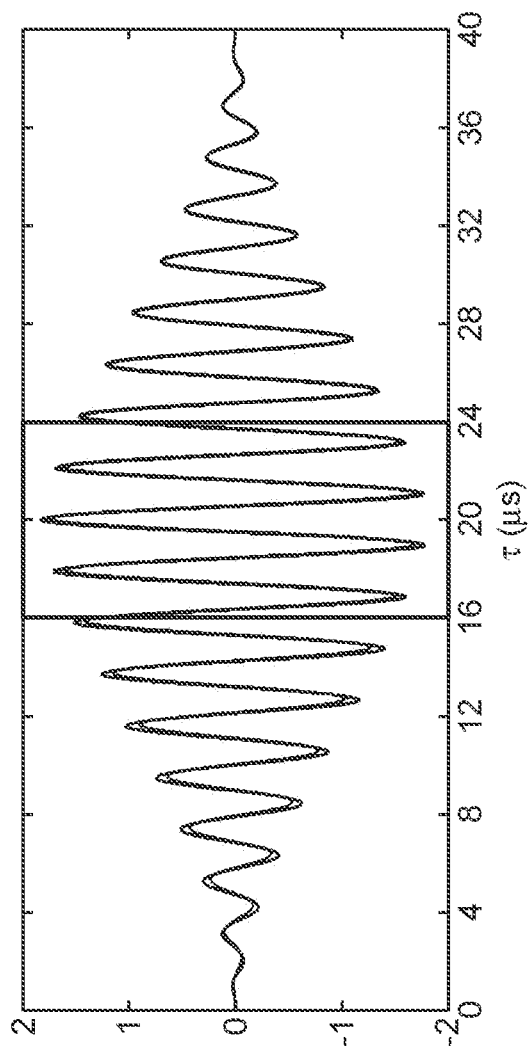
FIG. 39 shows an upstream and a downstream cross correlation function.

FIG. 39 shows a an upstream cross correlation function and a downstream cross correlation function, which are obtained by cross correlating the upstream signal and the downstream signal of the arrangement of FIG. 1 with a signal obtained at zero flow, respectively.

Figure 40:
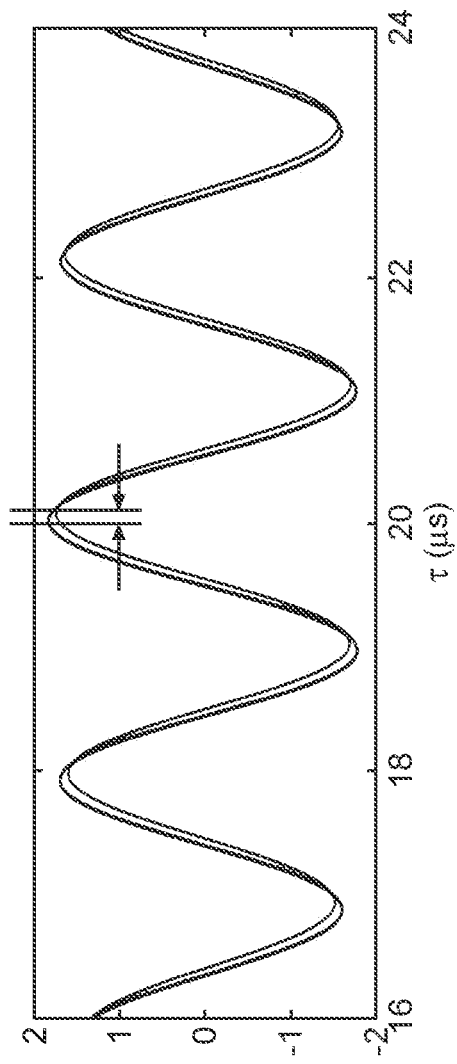
FIG. 40 shows a sectional enlargement of FIG. 39.

FIG. 40 shows a sectional enlargement of FIG. 39. Two position markers indicate the positions of the respective maxima of the upstream and downstream cross correlation function. The time difference between the maxima is a measure for the time difference between the upstream and the downstream signal.

Figure 41:
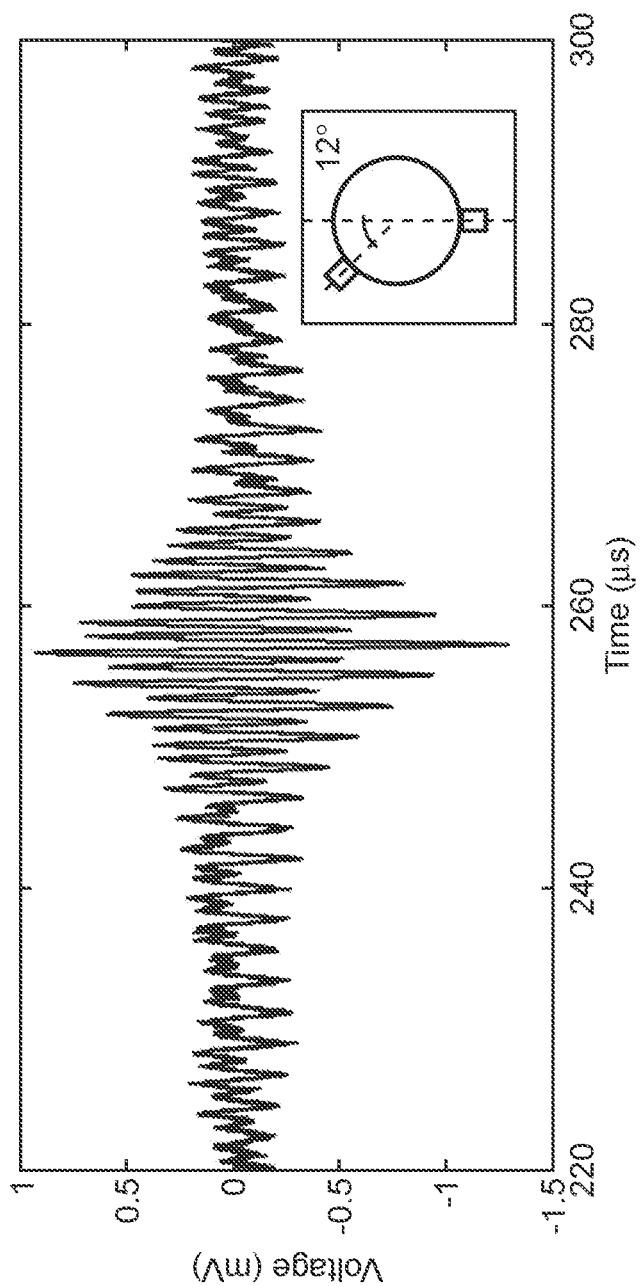
FIG. 41 shows a response signal of an inverted signal for a 12-degree misalignment against an opposite arrangement of piezoelectric elements.

FIG. 41 shows a response signal, which was obtained under similar conditions as for the response signal of FIG. 37. Different from the arrangement of FIG. 37, the piezoelectric elements are misaligned by 12 degrees against a straight-line arrangement along the perimeter of the pipe. This offset is shown in the inset of FIG. 41. FIG. 41 shows that even under misalignment conditions there is a reasonably well defined response signal.

FIGS. 42 to 45 show, by way of example, different arrangements of clamp-on piezoelectric transducers for which a flow measurement according to the present specification can be used. Especially for clamp-on transducers a flow measurement method according to the present specification may lead to an improvement of the signal to noise ratio in the arrangements of FIGS. 42 to 45 or in other, similar transducer arrangements. Furthermore, the flow measurement method may provide energy savings by providing an increased signal amplitude of the response signal for a given sending signal power. Thereby, a signal sending power can be reduced.

FIGS. 42 to 45 are aligned such that a gravity force on a liquid in the pipe 12 points downwards. However, arrangements, which are rotated relative to the arrangements of FIGS. 42 to 45, may also be used. The viewing direction of FIGS. 42 to 45 is along the longitudinal axis of the pipe 12. An upstream or downstream position of a transducer is not indicated in FIGS. 42 to 45.

Figure 42:
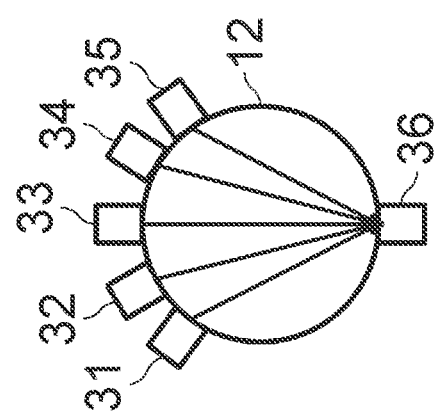
FIG. 42 shows a many-to-one sensor arrangement for a flow measurement according to the present specification.

In the arrangement of FIG. 42, an array of five piezoelectric elements 31-35 is provided in a first location and a further piezoelectric element 36 is placed upstream or downstream of the first location. The array of piezoelectric elements 31-35 may be used to obtain a pre-determined wave front and to achieve an improved focusing of an acoustic wave in a pre-determined direction, when the array of five elements 31-35 is used as a transmitter and the further element 36 is used as a receiver.

Figure 43:
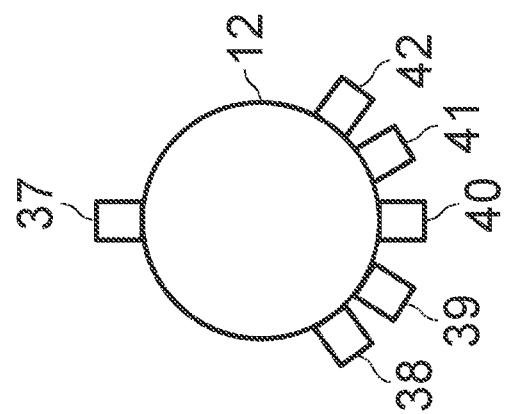
FIG. 43 shows a one-to-many sensor arrangement for a flow measurement according to the present specification.

In the arrangement of FIG. 43, a single piezoelectric element 37 is provided in a first location and an array of five piezoelectric elements 38-42 is placed upstream or downstream of the first location. The array of piezoelectric elements 38-42 may be used to obtain an improved recording of the wave front of the response signal. The improved recording can then be used to obtain an improved flow-measuring signal, which is then applied to the single piezoelectric element 37.

Figure 44:
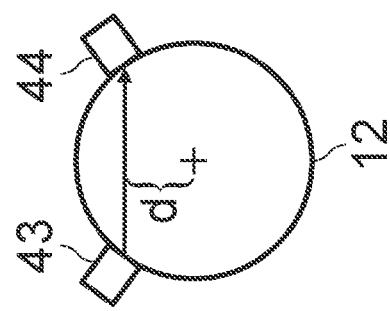
FIG. 44 shows a one-to-one sensor arrangement for a flow measurement in a layer according to the present specification.

FIG. 44 shows an arrangement of two piezoelectric elements 43, 44 wherein one element is placed downstream with respect to the other. A distance d of the connection line between the piezoelectric elements 43, 44 to the symmetry axis of the pipe 12 is about half the radius of the pipe 12, such that a flow layer at a distance d to the central axis of the pipe 12 can be measured.

Especially for clamp-on transducers, such as the piezoelectric elements 43, 44 shown in FIG. 44, the flow measurement according to the present specification provides an improved signal at the receiving piezoelectric element 44, 43 through beam forming.

Figure 45:
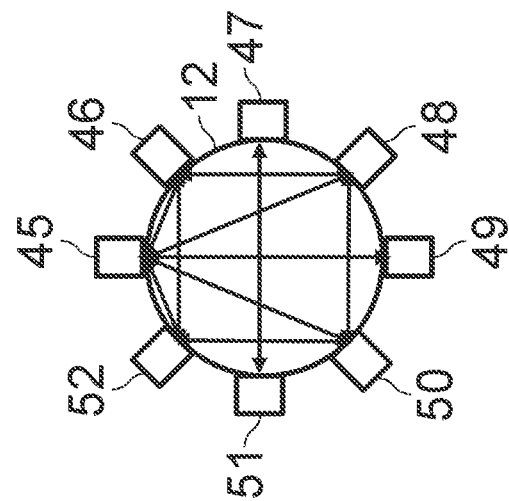
FIG. 45 shows a multi-sensor arrangement for flow measure-ment in multiple layers according to the present specification.

FIG. 45 shows an arrangement of eight piezoelectric elements 45-52, which are spaced at 45 degrees apart. Several arrangements are possible with respect to upstream-downstream placements.

In one arrangement, the sensors locations alternate between upstream and downstream along the perimeter, for example 45, 47, 49, 51 upstream and 46, 48, 50, 52 downstream.

In another arrangement, first four consecutive elements, such as 45-48, along the perimeter are placed upstream or downstream relative to the other four elements, such as 49-52. In a further arrangement with 16 piezoelectric elements, all the piezoelectric elements 45-52 of FIG. 45 are placed in one plane and the arrangement of FIG. 45 is repeated in upstream or downstream direction.

Figure 46:
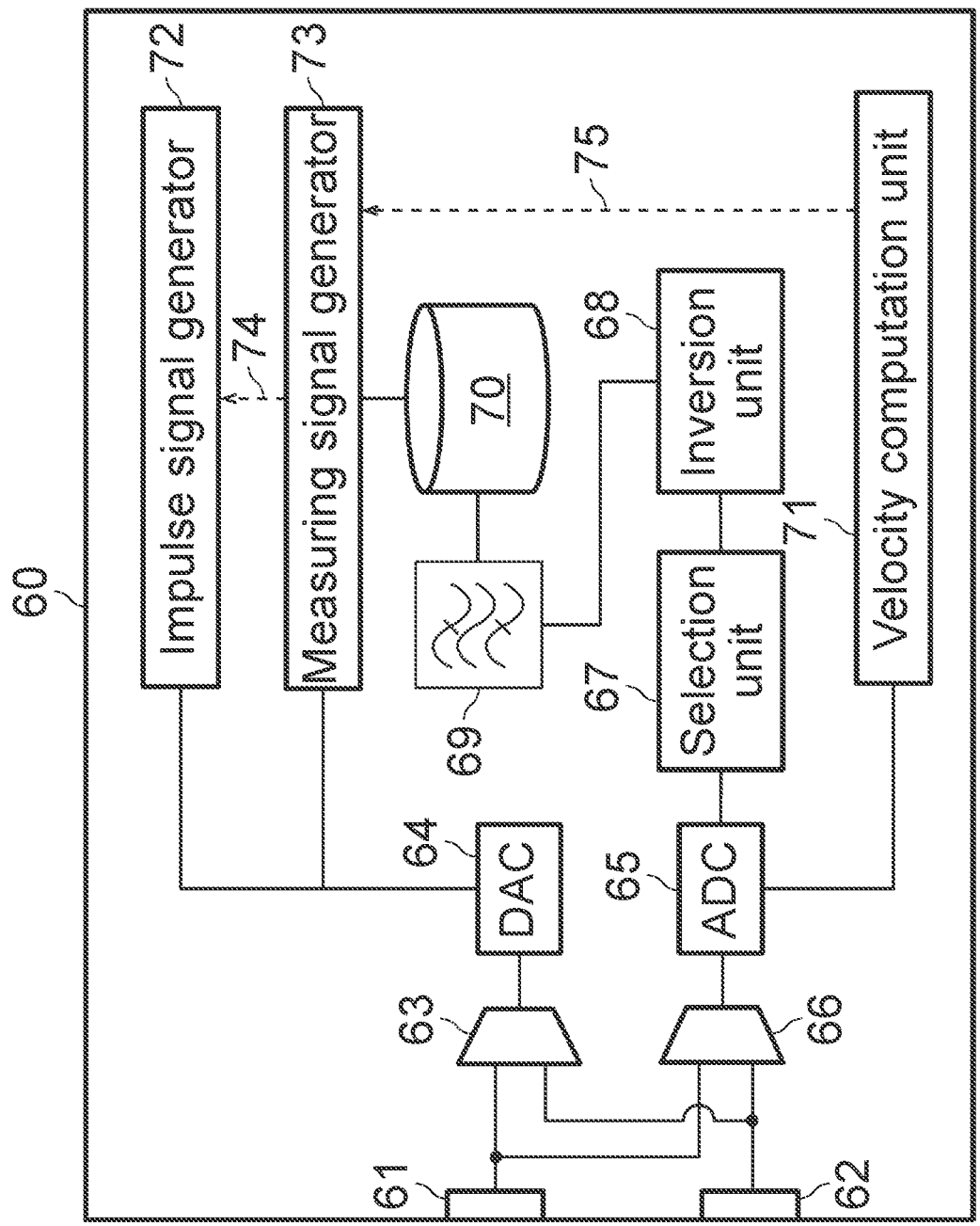
FIG. 46 shows a device for measuring a flow speed according to the present specification.

FIG. 46 shows, by way of example, a flow measurement device 60 for measuring a flow in the arrangement in FIG. 1 or other arrangements according to the specification. In the arrangement of FIG. 1, the flow measurement device 60 is provided by the first and second computation units 15, and 16.

The flow measurement device 60 comprises a first connector 61 for connecting a first piezoelectric transducer and a second connector 62 for connecting a second piezoelectric transducer. The first connector 61 is connected to a digital to analog converter (DAC) 64 over a multiplexer 63. The second connector 62 is connected to an analog to digital converter 65 over a demultiplexer 66.

The ADC 65 is connected to a signal selection unit 67, which is connected to a signal inversion unit 68, which is connected to a band pass filter 69, which is connected to a computer readable memory 70. Furthermore, the ADC 65 is connected to a velocity computation unit 71.

The DAC 64 is connected to an impulse signal generator 72 and a measuring signal generator 73. The measuring signal generator is connected to the impulse generator 72 over a command line 74. The velocity computation unit 71 is connected to the measuring signal generator 73 via a second command line 75.

In general, the impulse signal generator 72 and the measuring signal generator comprise hardware elements, such as an oscillator, and software elements, such as an impulse generator module and a measuring signal generator module. In this case, the command lines 74, 75 may be provided by software interfaces between respective modules.

During a signal-generating phase, the impulse signal generator sends a signal to the DAC 64, the selection unit 67 receives a corresponding incoming signal over the ADC 65 and selects a portion of an incoming signal. The inversion unit 68 inverts the selected signal portion with respect to time, the optional bandpass filter 69 filters out lower and upper frequencies and the resulting measuring signal is stored in the computer memory 70. When the word "signal" is used with reference to a signal manipulation step, it may in particular refer to a representation of a signal in a computer memory.

In particular, a signal representation can be defined by value pairs of digitized amplitudes and associated discrete times. Other representations comprise, among others, Fourier coefficients, wavelet coefficients and an envelope for amplitude modulating a signal.

Figure 47:
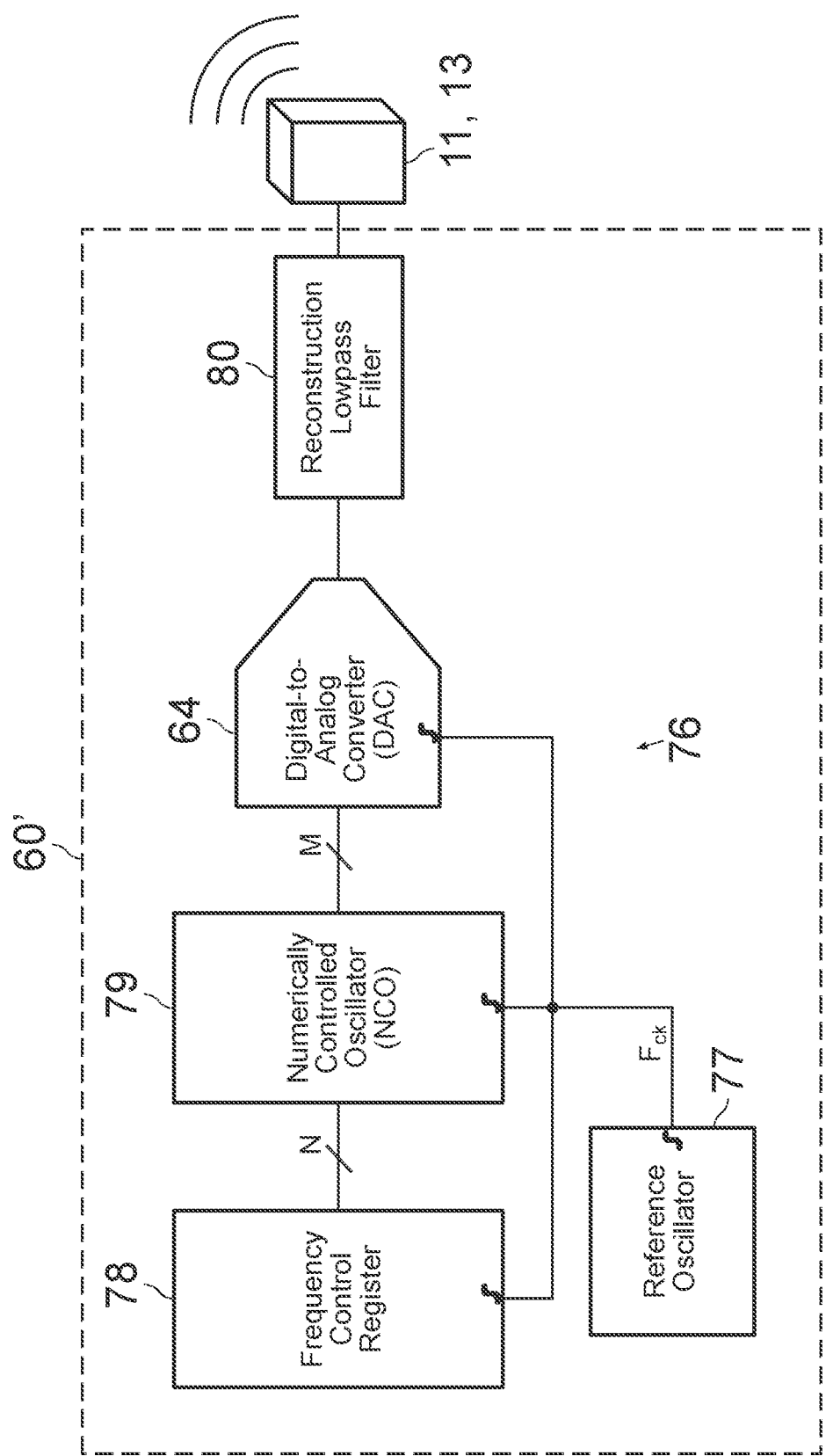
FIG. 47 shows a direct digital synthesizer for use in the device of FIG. 46.

FIG. 47 shows a second embodiment of a flow measurement device 60' for measuring a flow in the arrangement in FIG. 1 or other arrangements according to the specification. The flow measurement device 60' comprises a direct digital synthesizer (DDS) 76. For simplicity, only the components of the DDS 76 are shown. The DDS 76 is also referred to as an arbitrary waveform generator (AWG).

The DDS 76 comprises a reference oscillator 77, which is connected to a frequency controller register 78, a numerically controlled oscillator (NCO) 79 and to the DAC 64. An input of the NCO 79 for N channels is connected to an output of the frequency control register 78. An input of the DAC 64 for M channels is connected to the NCO 79 and an input of a reconstruction low pass filter is connected to the DAC 64. By way of example, a direct numerically controlled oscillator 79 with a clock frequency of 100 MHz may be used to generate an amplitude modulated 1 MHz signal.

An output of the reconstruction low pass filter 80 is connected to the piezoelectric transducers 11, 13 of FIG. 1.

Due to the inertia of an oscillator crystal, it is often advantageous to use an oscillator with a higher frequency than that of a carrier wave in order to obtain a predetermined amplitude modulated signal, for example by using a direct digital synthesizer, as shown in FIG. 47.

In particular, the method steps of storing a digital representation of a signal and performing operations such as selection a signal portion, time reversing a signal and filtering a signal may be interchanged. For example, a signal may be stored in a time inverted form or it may be read out in reverse order to obtain a time inverted signal.

While the present invention is explained with respect to a round DN 250 pipe, it can be readily applied to other pipe sizes or even to other pipe shapes. Although the embodiments are explained with respect to clamp-on transducers, wet transducers, which protrude into a pipe, may be used as well.

FIGS. 48 and 49 show an asymmetric transducer arrangement, wherein a second transducer is offset by 12 degrees with respect to a symmetry axis of the conduit 12.

FIG. 50 shows a one cycle measuring signal of a time of flight measurement, and FIG. 51 shows a ten cycle measuring signal of a time of flight measurement. The signals shown in FIGS. 50 and 51 can be used for a time of flight measurement. Furthermore, the signals can also be used to generate a measurement signal according to the present specification using an inversion with respect to time of a received response signal, such as the response signals of FIGS. 52 and 53.

Figure 52:
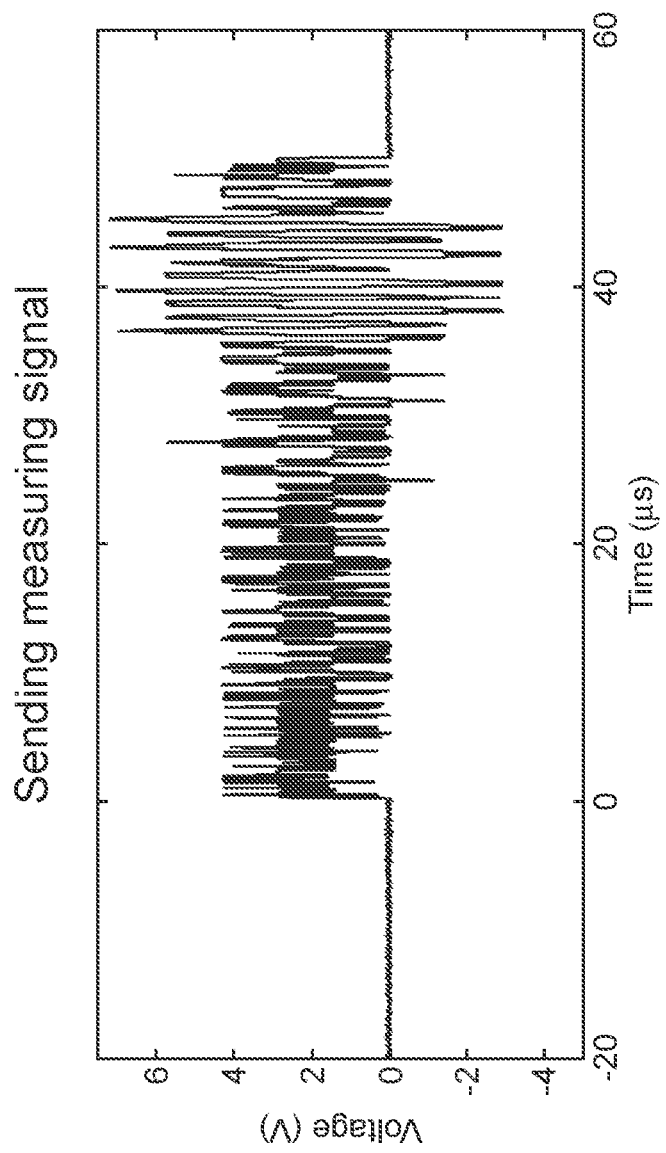

FIG. 52 shows an example of a measuring signal that is derived from a time-reversed signal, which is stored at a low resolution.

Figures 53, 54:
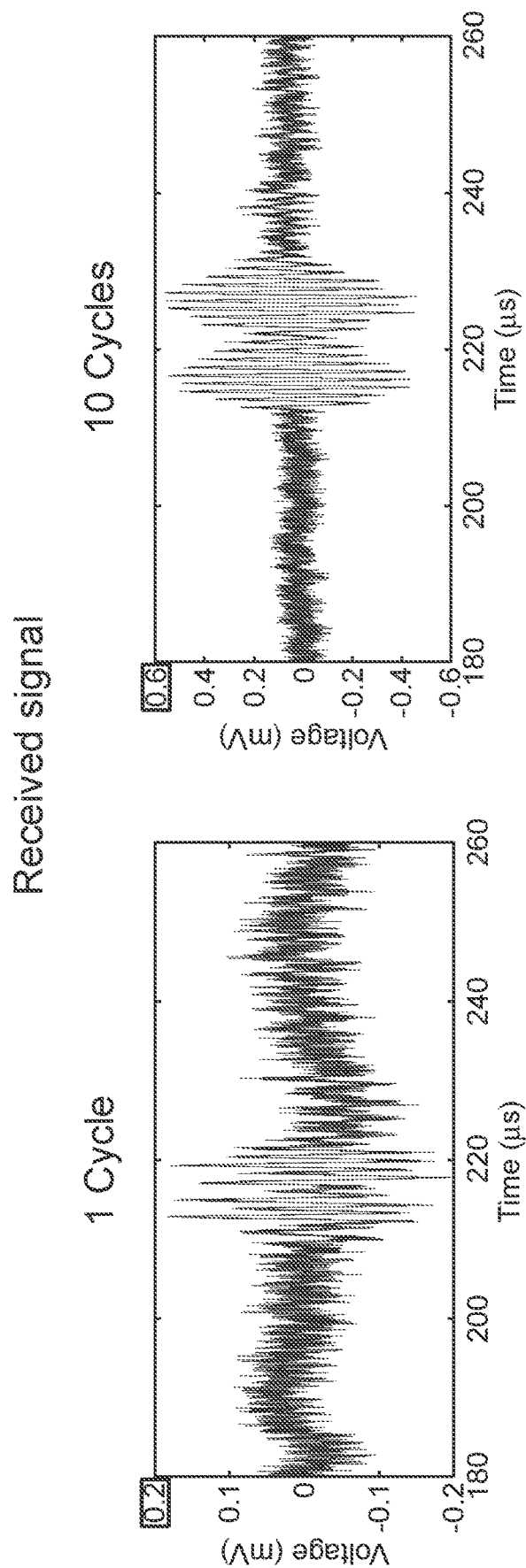
FIG. 53 shows a response signal of the signal of FIG. 50, wherein the transmission channel is provided by the asymmetric arrangement of FIGS. 48 and 49.
FIG. 54 shows a response signal of the signal of FIG. 51 for the arrangement of FIGS. 48 and 49.
Figure 55:
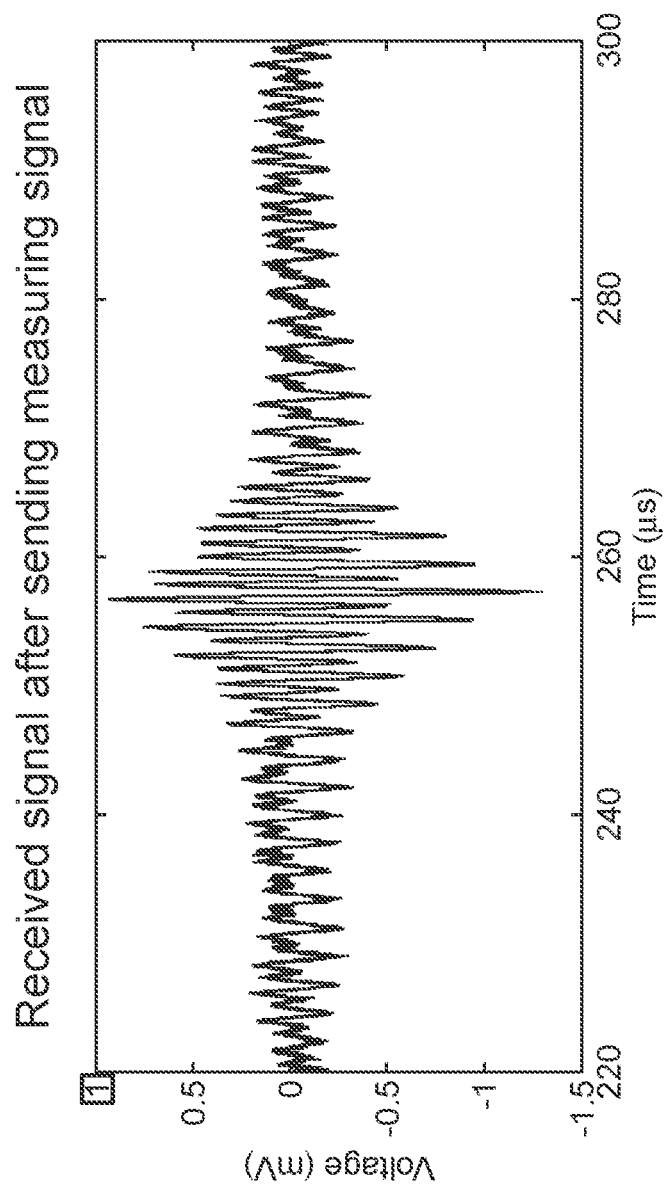
FIG. 55 shows a response signal of the Signal of FIG. 52 for the arrangement of FIGS. 48 and 49.

FIGS. 53 to 55 show response signals to the respective signals of FIGS. 50 to 52. The response signal is picked up by a receiving transducer 11, 13 of the asymmetric arrangement of FIGS. 48, 49 in response to a signal of a sending transducer, which is excited by the signal of FIG. 50.

In particular, FIG. 53 shows a response signal of the signal of FIG. 50, FIG. 54 shows a response signal of the signal of FIG. 51 for the arrangement of FIGS. 48 and 49 and FIG. 55 shows a response signal of the Signal of FIG. 52 for the arrangement of FIGS. 48 and 49. In the examples shown, the response signal is more concentrated in time, has a higher amplitude and has a more well-defined envelope as compared to the signals of FIGS. 52 and 53.

The result of FIG. 55 demonstrates that the benefits of inversion of the impulse response with respect to time, which allow, among others, to use smaller energy signals, can be retained for coarse-grained resolution and asymmetric transducer arrangements.

The results of FIG. 55 demonstrate that using an inverted signal with respect to time according to the present specification is able to provide short time delays as compared with conventional time of flight Doppler shift measurements using a signal with 1 or 10 oscillation cycles. FIG. 55 as a result of the arrangement shown in FIG. 48 and FIG. 49 furthermore shows that a measuring signal according to the present specification can be used for beam shaping purposes.

Table 2 shows results time delays for the asymmetric arrangement shown in FIGS. 48, 49 and for respective flow rates of 21, 44, and 61 cubic metres per hour.

| | Flowrate | | |
|---|---|---|---|
| Methods | 21 m³/h | 44 m³/h | 61 m³/h |
| TOF 1 cycle | 10 ns | 21 ns | 28 ns |
| TOF 10 cycle | 9 ns | 17 ns | 26 ns |
| inverted signal | 4 ns | 12 ns | 26 ns |

The FIGS. 56 to 59 illustrate further examples of beam shaping applications. In general, there are $\Sigma_{i=1}^{N-1} i = N*(N-1)/2$ direct transmission channels between N transducers not considering reflections at the pipe walls, which are provided on a conduit. These transmission channels have in general different properties and lead to different response signals.

In the event that all of the N transducers are mounted at different heights with respect to a flow direction or a longitudinal direction of the conduit, all of these transmission channels can be used for flow measurements. A signal propagation between transducers that is perpendicular to the mean flow is in general not useful for capturing flow velocity components but can still be used to determine contaminations and material changes of the conduit and changes in the properties of the transducers and their coupling to the conduit.

A TOF flow measurement comprises a measurement in both directions with respect to a given transmission channel between two of the transducers. A TOF flow measurement that involves transmission channels between a first transducer and N−1 other transducers requires at least N consecutive measurements: a first measurement with a measurement signal applied to the first transducer and N−1 consecutive measurements with measurement signals applied to each one of the N−1 other transducers.

In general, the required measurement signals are different for each transmission channel and separate forward and a backward measurements are needed for each transmission channel. Thus, 2×(N−1) measurements are required. For example, max 2×(3−1)=4 measurements are possible, but not necessarily required, in the example of FIG. 57.

The signals of FIGS. 41 and 55 are produced by transducers, which radiate mainly in a preferred direction, with a maximum angle of about 12 degrees to both sides of the preferred direction. The directionality of the transducers is achieved, among others, by adjusting the form of the transducers and their attachment to the conduit. Depending on the angle between the transducers, not all paths may yield a sufficiently strong signal at a receiver side, especially if the sender has a high directionality. Applying the common known techniques only results as shown in FIG. 53 and FIG. 54 can be achieved with are typically too noisy for establishing flow measurements. However with the proposed method using inverted measurements signals, sufficiently good signals like those shown in FIG. 55 can be achieved.

The use of a measuring signal according to the application, which uses a reversion with respect to time makes it possible to provide transducers with less directionality. The measuring signal focuses the signal energy at the receiver and the received signal is still strong enough.

Similar to a measurement using just two transducers or just one transmission channel, the flow measurement can be performed using a pre-determined measuring signal or a signal that is obtained by a prior calibration. During the calibration step, the measuring signals are derived from response signals to the impulse signals. According to one example, an impulse signal is applied to a transducer to obtain one or more response signals at the other transducers. The measurement signals are derived by applying an inversion with respect to time to the response signals or a portion thereof.

In one example, in which there are four measurement paths, consecutive measurements are taken along the first path, the second path, the third path and the fourth path. The consecutive measurements are used to derive an overall flow and/or flows in at a predetermined layer or position.

One or more flow speeds can then be derived by comparing the measurements with a pre-determined flow profile. By way of example, the pre-determined flow profile can be obtained by a simulation. In another embodiment, a flow speed for a specific layer or position is estimated by using results from one or more measuring signals and known methods to calculate the flow profile. In one embodiment, an overall volume flow is derived by applying a calculated or simulated flow profile to a cross section area of the conduit.

Figure 56:
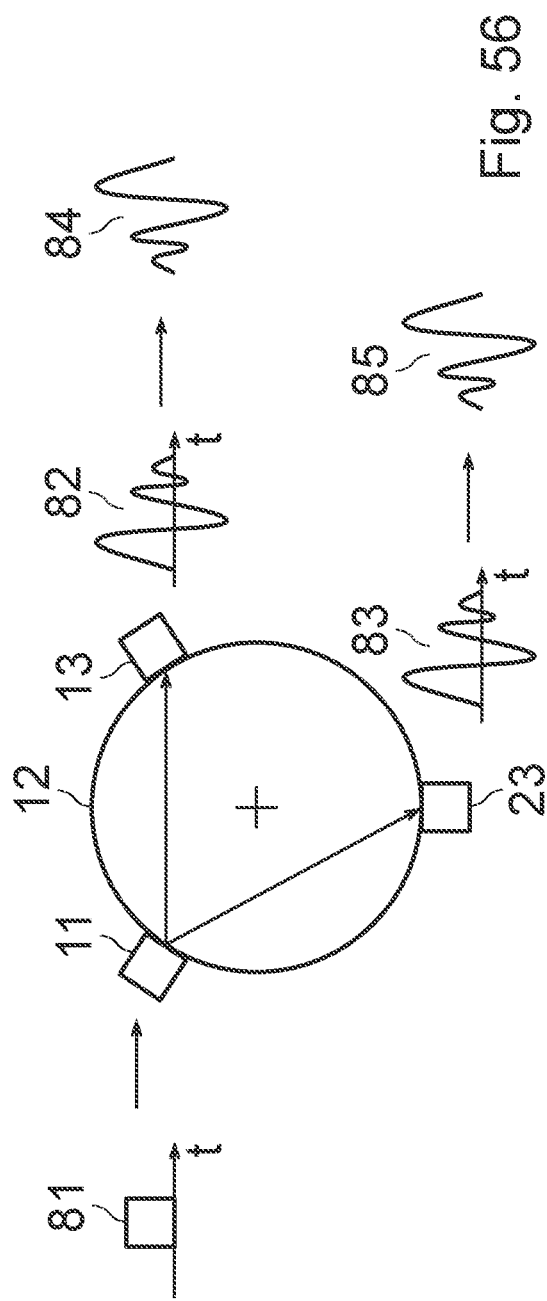
FIG. 56 shows a procedure for obtaining measuring signals corresponding to two signal paths in a three transducer arrangement.
Figure 57:
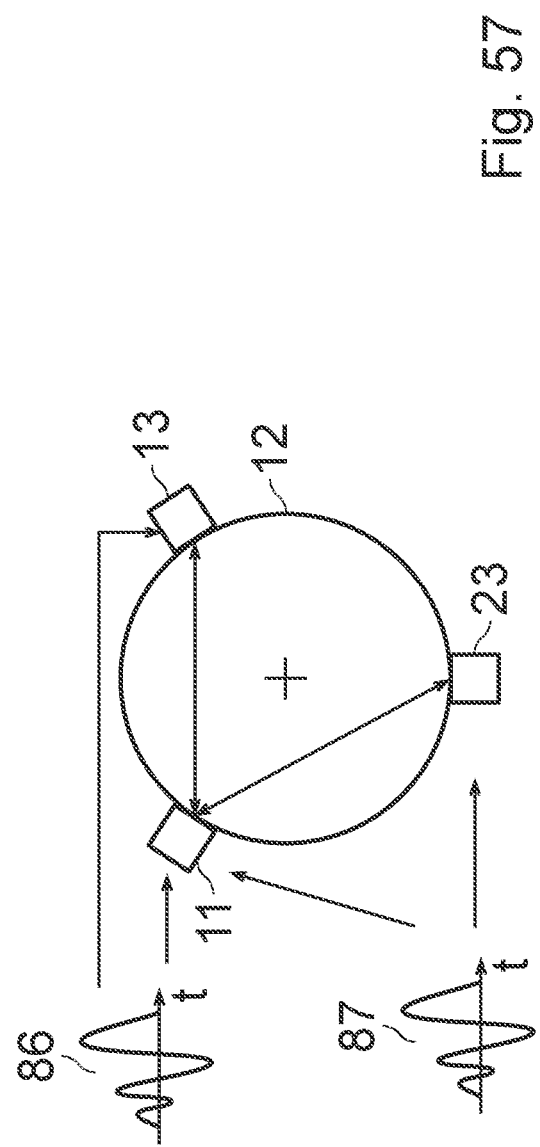
FIG. 57 shows a TOF flow measurement using the measuring signals obtained in the method of FIG. 56.

FIGS. 56 and 57 illustrate a time of flight flow measurement using three transducers and two transmission paths.

FIGS. 58 and 59 show a pressure measurement in a two-transducer arrangement. The pressure scale of FIG. 59 is displayed in arbitrary units (a.u.).

A measurement signal according to the present application is applied to the first transducer 11 and the resulting pressure distribution is measured at the periphery of the conduit 12. The transducers 11, 13 are offset in the longitudinal direction, similar to the arrangement of FIG. 1.

In a first example, a measuring signal which adapted to the signal path between the transducer 11 and the transducer 13 is sent from the transducer 11 to the opposite transducer 13 and the resulting pressure distribution is measured. This yields a curve similar to the pressure distribution 90 of FIG. 59, which has a peak at the position of the transducer 13.

In a second example, a measuring signal which adapted to the signal path between the transducer 11 and the transducer 13 is sent from the transducer 11 to transducer 13' and the resulting pressure distribution is measured. Different from the first arrangement, the transducer 13' is offset by an angle of 45 degrees with respect to a connection line through the first transducer and the center of the conduit 12. Even in this situation, the resulting pressure distribution is peaked around the position of the transducer 13' and consequently the energy of the signal is concentrated around the position of the transducer 13'

Thus, a measuring signal according to the application, which is obtaining using a reversal with respect to time of a signal between the respective transducers, leads to a pressure signal that is not only concentrated in time, as shown in the respective second Figure of the Figure sets 10-35, but the resulting pressure distribution is also concentrated in space.

By using a standard signal, such as an impulse signal, a concentration in space can still be achieved, but only at a fixed location close to the opposite side of the sending transducer. However, by using a signal according to the present specification, which comprises a time reversed portion the peak of the pressure concentration can be moved.

The ultrasonic transducers 11, 13, 23 of FIGS. 56-59 can be provided by mounted transducers, which are mounted to the outside of the conduit, or wet by transducers, which are protruding into the interior of the conduit 12 from outside of the conduit 12.

Figure 60:
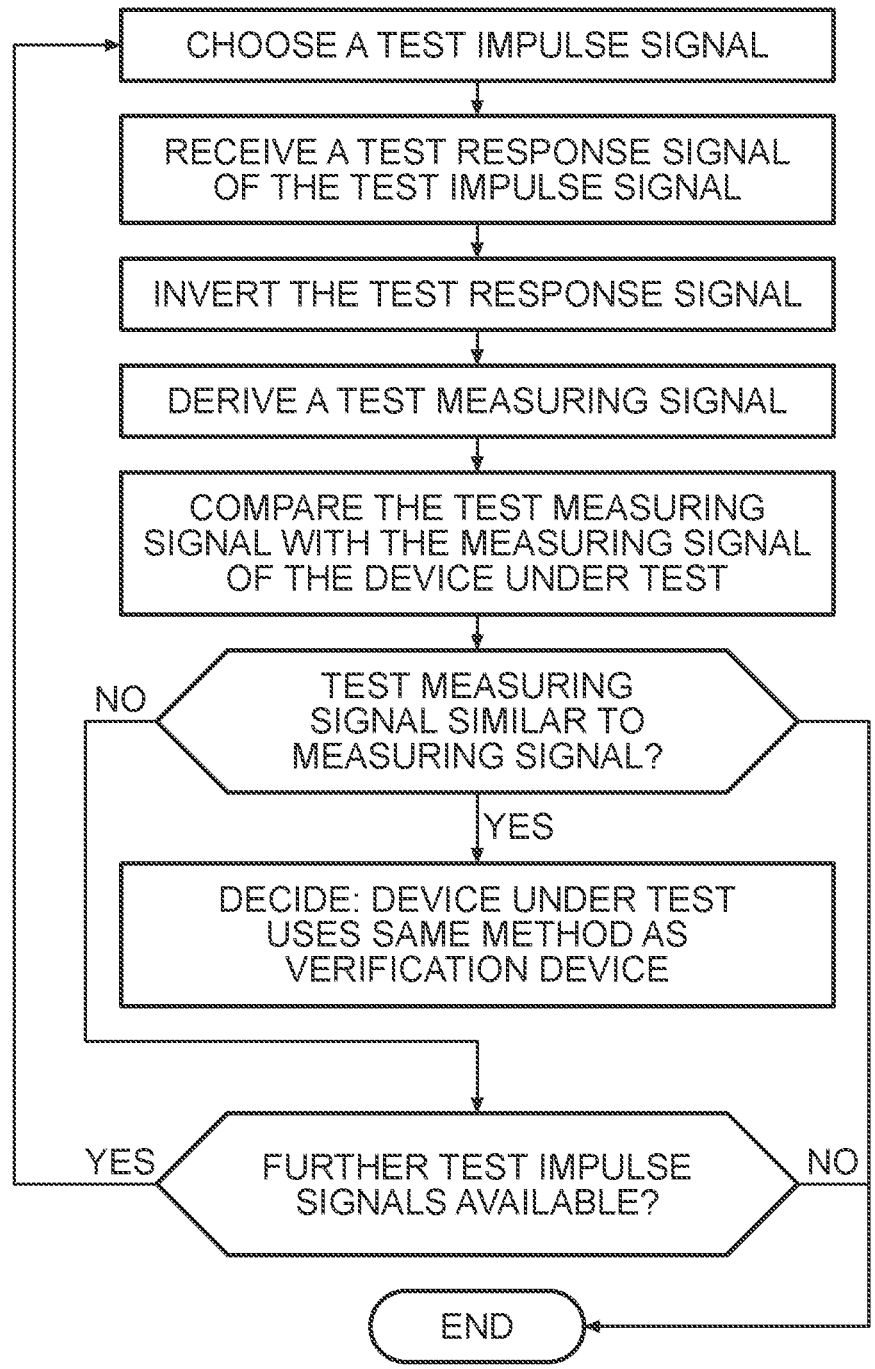
FIG. 60 illustrates an example of determining whether a device under test uses the same method of flow measurement as a verification device.

FIG. 60 show an example of determining whether a test device uses the same method of flow measurement as a verification device. In a first step, the verification device selects a test impulse signal. For example, this may comprise the selection of a signal shape for performing an amplitude modulation of a sine wave out of a set of stored signal shapes, such as rectangular shape, a sinusoidal shape, a saw tooth shape etc.

In a further step, the test impulse signal is applied to a first transducer. In a further step, a corresponding test response signal is received at the second transducer. In further steps, the test response signal, or a portion of it, is inverted and a test measuring signal is derived. The transducers to which the verification device is connected are preferably the transducers of the test device.

In a further step, the test measuring signal is compared with the actual measuring signal of the test device. If the test measuring signal is similar to the measuring signal of the test device, it is decided that the test device uses the same method as the verification device. Alternatively or in addition, the verification device can apply the test measuring signal to a transducer, receive a corresponding test response signal and compare this test response signal with the response signal to the measuring signal of the test device.

The verification device may receive or measure the signals of the test device as electric signals via tapping a wire connection of the test device to the transducers or, alternatively, the signals can be measured by placing a microphone in the conduit and receiving a signal of the microphone.

If the signals are not similar, the same process is repeated with further available test impulse signals to see whether one of the test impulse signals leads to a test measuring signal and/or a response signal to it which resembles the measuring signal and/or the response signal to it. In the event that an impulse signal of the test device is available, the verification device may choose the available impulse signal or a similar impulse signal instead of testing various test impulse signals or it may narrow down the selection of test impulse signals.

For a test device which uses several signal paths and/or combinations of pairs of sending and receiving transducers for the flow measurement, the verification device repeats the method of FIG. 60 for the multiple signal paths and/or for the multiple transducer combinations and the respective measuring signals and/or response signals to the measuring signals are compared.

Although the above description contains much specificity, these should not be construed as limiting the scope of the embodiments but merely providing illustration of the foreseeable embodiments. The method steps may be performed in different order than in the provided embodiments, and the subdivision of the measurement device into processing units and their respective interconnections may be different from the provided embodiments.

Especially, the above stated advantages of the embodiments should not be construed as limiting the scope of the embodiments but merely to explain possible achievements if the described embodiments are put into practice. Thus, the scope of the embodiments should be determined by the claims and their equivalents, rather than by the examples given.

The embodiments of the present specification can also be described with the following lists of elements being organized into items. The respective combinations of features which are disclosed in the item list are regarded as independent subject matter, respectively, that can also be combined with other features of the application.

Embodiment 1

A method for determining a flow speed of a fluid in a fluid conduit comprising:
  providing the fluid conduit with a fluid that has a predetermined velocity with respect to the fluid conduit,
  providing the fluid conduit with a first ultrasonic transducer, a second ultrasonic transducer and a third ultrasonic transducer,
    wherein respective connection lines between the first ultrasonic transducer, the second ultrasonic transducer and the third ultrasonic transducer extend outside of a symmetry axis of the fluid conduit,
  applying a first measuring signal to the first ultrasonic transducer, and
  measuring a first response signal of the first measuring signal at the second ultrasonic transducer,
  applying a second measuring signal to the first ultrasonic transducer,
  measuring a second response signal of the second measuring signal at the third ultrasonic transducer,
    wherein the first measuring signal and the second measuring signal respectively comprise a reversed signal portion with respect to time of a response signal of a corresponding impulse signal or of a signal derived therefrom,
  deriving a flow speed of the fluid from at least one of the first response signal and the second response signal.

Embodiment 2

The method according to embodiment 1, comprising:
  applying a first reverse direction measuring signal to the second ultrasonic transducer, and
  measuring a first reverse direction response signal of the first reverse direction measuring signal at the second ultrasonic transducer,
  applying a second reverse direction measuring signal to the third ultrasonic transducer,
  measuring a second reverse direction response signal of the second reverse direction measuring signal at the first ultrasonic transducer,
    wherein the first reverse direction measuring signal and the second reverse direction measuring signal respectively comprise a reversed signal portion with respect to time of a response signal of a corresponding impulse signal or of a signal derived therefrom,
  deriving a flow speed of the fluid from at least one of the first response signal, the first reverse direction response signal, the second response signal and the second reverse direction response signal.

Embodiment 3

The method according to embodiment 1 or embodiment 2, comprising:
applying a third measuring signal to the second ultrasonic transducer,
measuring a third response signal of the second measuring signal at the third ultrasonic transducer,
  wherein the third measuring signal comprises a reversed signal portion with respect to time of a response signal of a corresponding impulse signal or of a signal derived therefrom
deriving at least one flow speed of the fluid from the third response signal.

Embodiment 4

The method according to embodiment 3, comprising:
applying a third reverse direction measuring signal to the third ultrasonic transducer,
measuring a third reverse direction response signal of the third reverse direction measuring signal at the second ultrasonic transducer,
  wherein the third reverse direction measuring signal comprises a reversed signal portion with respect to time of a response signal of a corresponding impulse signal or of a signal derived therefrom
deriving at least one flow speed of the fluid from the third response signal and the third reverse direction response signal.

Embodiment 5

A method for determining a flow speed of a fluid in a fluid conduit comprising:
providing the fluid conduit with a fluid that has a predetermined velocity with respect to the fluid conduit,
providing the fluid conduit with a first ultrasonic clamp-on transducer and a second ultrasonic clamp-on transducer,
  wherein a connection line between the first ultrasonic clamp-on transducer and the second ultrasonic clamp-on transducer extends outside of a symmetry axis of the fluid conduit,
applying a measuring signal to the first ultrasonic clamp-on transducer,
measuring a response signal of the measuring signal at the second ultrasonic clamp-on transducer,
  wherein the measuring signal comprises a reversed signal portion with respect to time of a response signal of a corresponding impulse signal or of a signal derived therefrom,
deriving a flow speed of the fluid from the response signal.

Embodiment 6

The method according to embodiment 5, comprising:
applying a reverse direction measuring signal to the second ultrasonic clamp-on transducer,
measuring a reverse direction response signal of the measuring signal at the first ultrasonic clamp-on transducer,
  wherein the measuring signal comprises a reversed signal portion with respect to time of a response signal of a corresponding impulse signal or of a signal derived therefrom,
deriving a flow speed of the fluid from the response signal.

Embodiment 7

The method according to one of the preceding embodiments, wherein the signal portion that is used to derive the respective measuring signals comprises a first portion around a maximum amplitude of a response signal and a trailing signal portion, the trailing signal portion extending in time behind the arrival time of the maximum amplitude.

Embodiment 8

The method according to one of the preceding embodiments, comprising processing of at least one of the response signals for determining a change in the wall thickness of the conduit or for determining material characteristics of the conduit walls by determining longitudinal and transversal sound wave characteristics.

Embodiment 9

The method according to embodiment 1, comprising:
providing the fluid conduit with a fluid,
providing a first impulse signal to one of the first or the second ultrasonic transducer,
receiving a first response signal of the first impulse signal at the other one of the first or the second ultrasonic transducer,
providing a second impulse signal to one of the first or the third ultrasonic transducer,
receiving a second response signal of the second impulse signal at the other one of the first or the third ultrasonic transducer,
deriving the first measuring signal from the first response signal,
deriving the second measuring signal from the second response signal,
  the derivation of the respective first and second measuring signals comprising selecting a signal portion of the respective first and second response signals or of a signal derived therefrom and reversing the signal portion with respect to time,
storing the first measuring signal and the second measuring signal for later use.

Embodiment 10

The method according to embodiment 5, comprising:
providing the fluid conduit with a fluid,
providing an impulse signal to one of the first ultrasonic clamp-on transducer and the second ultrasonic clamp-on transducer,
receiving a response signal of the impulse signal at the other one of the first ultrasonic clamp-on transducer and the second ultrasonic clamp-on transducer,
deriving the measuring signal from the response signal,
  the derivation of the measuring signal comprising selecting a signal portion of the respective response signal or of a signal derived therefrom and reversing the signal portion with respect to time,
storing the measuring signal for later use.

Embodiment 11

The method according to embodiment 9 or embodiment 10, comprising
repeating the steps of applying an impulse signal and receiving a corresponding response signal multiple times, thereby obtaining a plurality of response signals, deriving the respective measuring signal from an average of the received response signals.

Embodiment 12

The method according to one of the embodiments 9 to 11, wherein the derivation of the respective measuring signal comprises digitizing the corresponding response signal or a signal derived therefrom with respect to amplitude.

Embodiment 13

The method according to embodiment 12, comprising increasing the bit-resolution of the digitized signal for increasing an amplitude of a response signal to the respective measuring signal.

Embodiment 14

The method according to embodiment 12, comprising decreasing the bit-resolution of the digitized signal for increasing an amplitude of a response signal to the respective measuring signal.

Embodiment 15

The method according to embodiment 12, wherein the bit resolution of the digitized signal with respect to the amplitude is a low bit resolution.

Embodiment 16

A computer readable program code comprising computer readable instructions for executing the method according to one of embodiments 1 to 15.

Embodiment 17

A computer readable memory, the computer readable memory comprising the computer readable program code of embodiment 16.

Embodiment 18

An application specific electronic component, which is operable to execute the method according to one of the embodiments 1 to 15.

Embodiment 19

A device for measuring a flow speed of a fluid in a conduit with a travel time ultrasonic flow meter, comprising
a first connector for connecting a first ultrasonic element,
a second connector for connecting a second ultrasonic element,
a third connector for connecting a third ultrasonic element,
a transmitting unit for sending impulse signals and for sending measuring signals,
a receiving unit for receiving response signals,
a processing unit for deriving a first measuring signal from a first inverted signal, for deriving a second measuring signal from a second inverted signal and for storing the first measuring signal and the second measuring signal,
wherein the derivation of the first inverted signal and of the second inverted signal comprises reversing a signal portion of a response signal of a corresponding impulse signal or of a signal derived therefrom with respect to time,
and wherein the processing unit, the transmitting unit and the receiving unit are operative to apply the first measuring signal to the first connector, and
to receive a first response signal of the first measuring signal at the second connector,
to apply a second measuring signal to the first connector,
to receive a second response signal of the second measuring signal at the third connector,
and to derive a flow speed of the fluid from at least one of the first response signal and the second response signal.

Embodiment 20

A device for measuring a flow speed of a fluid in a conduit with a travel time ultrasonic flow meter, comprising
a first connector,
a first ultrasonic clamp-on transducer which is connected to the first connector,
a second connector,
a second ultrasonic clamp-on transducer which is connected to the second connector,
a portion of a conduit, the first ultrasonic clamp-on transducer being mounted to the conduit portion at a first location,
and the second ultrasonic clamp-on transducer being mounted to the conduit portion at a location,
wherein respective connection lines between the first ultrasonic clamp-on transducer and the second clamp-on ultrasonic transducer extend outside of a symmetry axis of the fluid conduit,
a transmitting unit for sending impulse signals and for sending measuring signals,
a receiving unit for receiving response signals,
a processing unit for deriving a measuring signal from an inverted signal, wherein the derivation of the inverted signal comprises reversing a signal portion of a response signal of a corresponding impulse signal or of a signal derived therefrom with respect to time,
and wherein the processing unit, the transmitting unit and the receiving unit are operative
to apply the measuring signal to the first connector,
to receive a response signal of the first measuring signal at the second connector,
and to derive a flow speed of the fluid from the response signal.

Embodiment 21

The device of embodiment 20, further comprising:
a D/A converter, the D/A converter being connected to the first connector,
an A/D converter, the A/D converter being connected to the second connector, a computer readable memory for storing the measuring signal.

Embodiment 22

The device of embodiment 20, further comprising a selection unit, the selection unit being operative to select a portion of a received response signal to the impulse signal or a signal derived therefrom, and an inverting unit, the inverting unit being operative to invert the selected portion of the received response signal with respect to time to obtain the inverted signal.

Embodiment 23

The device according to embodiment 20, the device comprising
a direct digital signal synthesizer, the direct digital signal synthesizer comprising the ADC,
a frequency control register, a reference oscillator, a numerically controlled oscillator and a reconstruction low pass filter, the ADC being connectable to the first and the second connector over the reconstruction low pass filter.

Embodiment 24

The device according to embodiment 20, comprising a portion of a conduit, the first ultrasonic transducer being mounted to the conduit portion at a first location,
and the second ultrasonic transducer being mounted to the conduit portion at a second location.

Embodiment 25

A method for determining whether a test device is measuring a flow speed of a fluid in a fluid conduit according to one of the embodiments 1 to 5, comprising:
providing the fluid conduit with a fluid that has a predetermined velocity with respect to the fluid conduit,
providing the fluid conduit with a first ultrasonic transducer and a second ultrasonic transducer,
applying a test impulse signal to the first ultrasonic transducer of the test device,
receiving a test response signal of the test impulse signal at the second ultrasonic transducer of the test device,
deriving a test measuring signal from the test response signal the derivation of the test measuring signal comprising reversing the respective first or second response signal, or a portion thereof, with respect to time,
comparing the first test measuring signal with a first measuring signal that is emitted at a transducer of the test device,
wherein it is determined that the test device is using a method to determine a flow speed of a fluid in a fluid conduit according to one of the items 1 to 5, if the first test measuring signal and the first measuring signal are similar.

Embodiment 26

Method according to embodiment 25, comprising:
providing the fluid conduit with a third ultrasonic transducer,
applying a test impulse signal to the first ultrasonic transducer of the test device or to the second ultrasonic transducer of the test device,
receiving a second test response signal of the test impulse signal at the at the third ultrasonic transducer of the test device,
deriving a second test measuring signal from the second test response signal,
comparing the second test measuring signal with a second measuring signal that is emitted at a transducer of the test device, wherein it is determined that the test device is using a method to determine a flow speed of a fluid in a fluid conduit according to item 1, if the first test measuring signal and the first measuring signal are similar.

REFERENCE 10 flow meter arrangement
11 upstream piezoelectric element
12 pipe
13 downstream piezoelec-tric element
14 direction of average flow
15 first computation unit
16 second computation unit
17 signal path
20 signal path
22 piezoelectric element
23 piezoelectric element
31-52 piezoelectric ele-ments
60, 60' flow measurement de-vice
61 first connector
62 second connector
63 multiplexer
64 DAC
65 ADC
66 demultiplexer
67 signal selection unit
68 signal inversion unit
69 bandpass filter
70 memory
71 velocity computation unit
72 impulse signal genera-tor
73 measuring signal gener-ator
74 command line
75 command line
76 DDS
77 reference oscillator
78 frequency controller register
79 numerically controlled oscillator
80 low pass filter

The invention claimed is:

1. A method for determining a flow speed of a fluid in a fluid conduit comprising:
providing the fluid conduit with a fluid that has a predetermined velocity with respect to the fluid conduit,
providing the fluid conduit with a first ultrasonic wet transducer, a second ultrasonic wet transducer and a third ultrasonic wet transducer,
wherein respective connection lines between the first ultrasonic wet transducer, the second ultrasonic wet transducer and the third ultrasonic wet transducer extend outside of a direction of average flow within the fluid conduit,
applying a first measuring signal to the first ultrasonic wet transducer, and
measuring a first response signal of the first measuring signal at the second ultrasonic wet transducer,
applying a second measuring signal to the first ultrasonic wet transducer, measuring a second response signal of the second measuring signal at the third ultrasonic wet transducer, wherein the first measuring signal and the second measuring signal respectively comprise a reversed signal portion with respect to time of a response signal of a corresponding impulse signal or of a signal derived therefrom, deriving a flow speed of the fluid from at least one of the first response signal and the second response signal.

2. The method according to claim 1, comprising:

applying a first reverse direction measuring signal to the second ultrasonic wet transducer, and measuring a first reverse direction response signal of the first reverse direction measuring signal at the first ultrasonic wet transducer, applying a second reverse direction measuring signal to the third ultrasonic wet transducer, measuring a second reverse direction response signal of the second reverse direction measuring signal at the first ultrasonic wet transducer, wherein the first reverse direction measuring signal and the second reverse direction measuring signal respectively comprise a reversed signal portion with respect to time of a response signal of a corresponding impulse signal or of a signal derived therefrom, deriving a flow speed of the fluid from at least one of the first response signal, the first reverse direction response signal, the second response signal and the second reverse direction response signal.

3. The method according to claim 1, comprising:

applying a third measuring signal to the second ultrasonic wet transducer, measuring a third response signal of the second measuring signal at the third ultrasonic wet transducer, wherein the third measuring signal comprises a reversed signal portion with respect to time of a response signal of a corresponding impulse signal or of a signal derived therefrom, deriving at least one flow speed of the fluid from the third response signal.

4. The method according to claim 3, comprising:

applying a third reverse direction measuring signal to the third ultrasonic wet transducer, measuring a third reverse direction response signal of the third reverse direction measuring signal at the second ultrasonic wet transducer, wherein the third reverse direction measuring signal comprises a reversed signal portion with respect to time of a response signal of a corresponding impulse signal or of a signal derived therefrom deriving at least one flow speed of the fluid from the third response signal and the third reverse direction response signal.

5. The method according to claim 1, wherein the signal portion that is used to derive the respective measuring signals comprises a first portion around a maximum amplitude of a response signal and a trailing signal portion, the trailing signal portion extending in time behind the arrival time of the maximum amplitude.

6. The method according to claim 1, comprising processing of at least one of the response signals for determining a change in the wall thickness of the conduit or for determining material characteristics of the conduit walls by determining longitudinal and transversal sound wave characteristics.

7. The method according to claim 1, comprising providing the fluid conduit with a fluid, providing a first impulse signal to one of the first or the second ultrasonic wet transducer, receiving a first response signal of the first impulse signal at the other one of the first or the second ultrasonic wet transducer, receiving a second response signal of the second impulse signal at the other one of the first or the third ultrasonic wet transducer, deriving the first measuring signal from the first response signal, deriving the second measuring signal from the second response signal, the derivation of the respective first and second measuring signals comprising selecting a signal portion of the respective first and second response signals or of a signal derived therefrom and reversing the signal portion with respect to time, storing the first measuring signal and the second measuring signal for later use.

8. The method according to claim 7, comprising repeating the steps of applying an impulse signal and receiving a corresponding response signal multiple times, thereby obtaining a plurality of response signals, deriving the respective measuring signal from an average of the received response signals.

9. The method according to claim 7, wherein the derivation of the respective measuring signal comprises digitizing the corresponding response signal or a signal derived therefrom with respect to amplitude.

10. The method according to claim 9, comprising increasing the bit-resolution of the digitized signal for increasing an amplitude of a response signal to the respective measuring signal.

11. The method according to claim 9, comprising decreasing the bit-resolution of the digitized signal for increasing an amplitude of a response signal to the respective measuring signal.

12. The method according to claim 9, wherein the bit resolution of the digitized signal with respect to the amplitude is a low bit resolution.

13. A computer readable program code comprising computer readable instructions for executing the method according to claim 1.

14. A computer readable memory, the computer readable memory comprising the computer readable program code of claim 13.

15. An application specific electronic component, which is operable to execute the method according to claim 1.

16. A method for determining whether a test device is measuring a flow speed of a fluid in a fluid conduit according to the method for determining a flow speed of a fluid in a fluid conduit of claim 1, comprising:

providing the fluid conduit with a fluid that has a predetermined velocity with respect to the fluid conduit, providing the fluid conduit with a first testing ultrasonic wet transducer and a second testing ultrasonic wet transducer, applying a test impulse signal to the first testing ultrasonic wet transducer of the test device, receiving a test response signal of the test impulse signal at the second testing ultrasonic wet transducer of the test device, deriving a test measuring signal from the test response signal, the derivation of the test measuring signal comprising reversing the respective first or second response signal, or a portion thereof, with respect to time, comparing the first test measuring signal with a first measuring signal that is emitted at an ultrasonic wet transducer of the test device, wherein it is determined that the test device is using the method to determine a flow speed of a fluid in a fluid conduit, if the first test measuring signal and the first measuring signal are similar.

17. The method according to claim 16, comprising:

providing the fluid conduit with a third testing ultrasonic wet transducer, applying a test impulse signal to the first testing ultrasonic wet transducer of the test device or to the second testing ultrasonic wet transducer of the test device, receiving a second test response signal of the test impulse signal at the at the third testing ultrasonic wet transducer of the test device, deriving a second test measuring signal from the second test response signal, comparing the second test measuring signal with a second measuring signal that is emitted at the ultrasonic wet transducer of the test device, wherein it is determined that the test device is using the method for determining a flow speed of a fluid in a fluid conduit if the first test measuring signal and the first measuring signal are similar.

18. The method of claim 16, wherein each of the first testing ultrasonic wet transducer, the second testing ultrasonic wet transducer correspond to one of the first ultrasonic wet transducer, the second ultrasonic wet transducer, and the third ultrasonic wet transducer.

19. A device for measuring a flow speed of a fluid in a conduit with a travel time ultrasonic flow meter, comprising:

a first connector for connecting a first ultrasonic wet transducer, a second connector for connecting a second ultrasonic wet transducer, a third connector for connecting a third ultrasonic wet transducer, a transmitting unit for sending impulse signals and for sending measuring signals, a receiving unit for receiving response signals, a processing unit for deriving a first measuring signal from a first inverted signal, for deriving a second measuring signal from a second inverted signal and for storing the first measuring signal and the second measuring signal, wherein the derivation of the first inverted signal and of the second inverted signal comprises reversing a signal portion of a response signal of a corresponding impulse signal or of a signal derived therefrom with respect to time, and wherein the transmitting unit is further operative to apply the first measuring signal to the first connector, and to apply the second measuring signal to the first connector, the receiving unit is further operative to receive a first response signal of the first measuring signal at the second connector, and to receive a second response signal of the second measuring signal at the third connector, and the processing unit is further operative to derive a flow speed of the fluid from at least one of the first response signal and the second response signal.

* * * * *